(12) United States Patent
Xue et al.

(10) Patent No.: US 11,696,345 B2
(45) Date of Patent: Jul. 4, 2023

(54) ASYNCHRONOUS CHANNEL ACCESS CONTROL OF A WIRELESS SYSTEM

(71) Applicant: QUALCOMM Incorporated, San Diego, CA (US)

(72) Inventors: Qi Xue, San Diego, CA (US); Srinivas Katar, Fremont, CA (US); Chao Zou, San Jose, CA (US); Naveen Gangadharan, San Jose, CA (US); Neelakantan Nurani Krishnan, San Jose, CA (US); Sandip Homchaudhuri, San Jose, CA (US); Xiaolong Huang, San Jose, CA (US); Anish Ashok, Union City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 17/188,165

(22) Filed: Mar. 1, 2021

(65) Prior Publication Data

US 2022/0279601 A1    Sep. 1, 2022

(51) Int. Cl.
*H04W 74/08* (2009.01)

(52) U.S. Cl.
CPC ... *H04W 74/0883* (2013.01); *H04W 74/0816* (2013.01)

(58) Field of Classification Search
CPC ............. G06Q 10/00; H04W 74/0816; H04W 74/0883; H04W 84/12
See application file for complete search history.

(56) References Cited

U.S. PATENT DOCUMENTS

| 10,791,516 | B1 | 9/2020 | Chu et al. |
| 11,457,439 | B2* | 9/2022 | Kim ..................... H04W 80/02 |
| 2019/0215884 | A1* | 7/2019 | Patil ................. H04W 52/0219 |
| 2019/0246354 | A1 | 8/2019 | Huang et al. |

(Continued)

FOREIGN PATENT DOCUMENTS

WO    WO-2020033381 A1    2/2020

OTHER PUBLICATIONS

International Search Report and Written Opinion—PCT/US2022/014528—ISA/EPO—dated Nov. 7, 2022.

(Continued)

*Primary Examiner* — Liton Miah
(74) *Attorney, Agent, or Firm* — Holland & Hart LLP/Qualcomm

(57) ABSTRACT

This disclosure provides systems, methods and apparatus for asynchronous channel access control of a wireless system. In some aspects, a device may adjust the priority of one or more PPDUs and may perform other operations to ensure control of a wireless medium at certain times while still allowing for other devices to communicate on the wireless medium. For example, the device may adjust a backoff counter or one or more EDCA parameters to ensure obtaining control of the wireless medium to transmit a first PPDU of an application file. For one or more subsequent PPDUs of the application file, the device may again adjust a backoff counter or one or more EDCA parameters to allow other devices to obtain control of the wireless medium in certain scenarios (such as a second device to provide information back to the device or to otherwise transmit using the shared wireless medium).

30 Claims, 23 Drawing Sheets

(56) References Cited

U.S. PATENT DOCUMENTS

2019/0306835 A1* 10/2019 Hoang .............. H04W 72/0493
2020/0084102 A1*  3/2020 Choi ................. H04W 72/0446
2020/0275485 A1   8/2020 Babaei et al.
2021/0034870 A1   2/2021 Ha
2021/0243749 A1*  8/2021 Hoang ................ H04W 74/085
2021/0266878 A1*  8/2021 Madhavan ............ H04W 72/02
2022/0279602 A1   9/2022 Xue et al.

OTHER PUBLICATIONS

Partial International Search Report—PCT/US2022/014528—ISA/EPO—dated May 20, 2022.

* cited by examiner

900

902
Obtain a first PPDU of an application file from a second device over a wireless medium.

904
The second device obtains control of the wireless medium.

906
Control of the wireless medium is associated with a first priority of transmitting the first PPDU over the wireless medium.

908
The first priority is different than a second priority of transmitting data from the device to the second device over the wireless medium.

910
Obtain one or more subsequent PPDUs of the application file from the second device.

912
The action of obtaining the one or more subsequent PPDUs is associated with a third priority of transmitting the one or more subsequent PPDUs over the wireless medium.

1102
Obtain UL data from a second device over a wireless medium.

1104
Provide, to the second device, DL data including PPDUs over the wireless medium.

1106
Provide one or more PPDUs to the second device during a current TWT window.

1108
A beginning of the current TWT window is associated with one of when a first PPDU of the one or more PPDUs is provided to the second device or when the first PPDU is provided from an application layer to a MAC of the device.

*Figure 11*

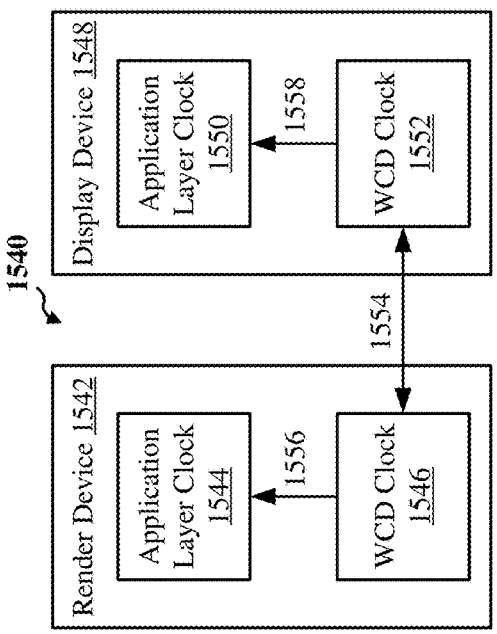
*Figure 15A*
*Figure 15B*
*Figure 15C*

1700

1702
Obtain, from a second device, one or more PPDUs associated with a video frame.

1704
The second device renders a plurality of video frames to be provided to the device.

1706
The second device splits each video frame of the plurality of video frames into a plurality of video slices.

1708
For each video slice, the second device generates a plurality of PPDUs to include the video slice.

1710
Each PPDU includes one or more MSDUs associated with the video slice.

1712
The video slice is identified by a port number and a DSCP value.

1714
For each video slice, the second device queues the MSDUs for transmission to the device.

*Figure 17*

ASYNCHRONOUS CHANNEL ACCESS CONTROL OF A WIRELESS SYSTEM

TECHNICAL FIELD

This disclosure relates generally to wireless communications, and more specifically, to asynchronous channel access control of a wireless system.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices may be associated with low-latency traffic (such as gaming or extended reality (XR) traffic) having strict end-to-end latency, packet loss, and throughput requirements. It is desirable for WLANs to ensure that such low-latency traffic can be handled without violating their respective latency and packet loss requirements.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. In some implementations, the method may be performed by a wireless communication device, and may include obtaining control of a wireless medium. Control of the wireless medium is associated with a first priority of transmitting, over the wireless medium, a first physical layer protocol data unit (PPDU) of an application file from the wireless communication device to a second device, and the first priority is different than a second priority of transmitting data from the second device to the wireless communication device over the wireless medium. The method also may include providing the first PPDU to the second device. The method also may include providing one or more subsequent PPDUs of the application file to the second device. Providing the one or more subsequent PPDUs is associated with a third priority of transmitting the one or more subsequent PPDUs over the wireless medium.

Another innovative aspect of the subject matter described in this disclosure can be implemented in a wireless communication device. The wireless communication device includes a processing system and an interface. The interface is configured to obtain control of a wireless medium. Control of the wireless medium is associated with a first priority of transmitting, over the wireless medium, a first PPDU of an application file from the wireless communication device to a second device, and the first priority is different than a second priority of transmitting data from the second device to the wireless communication device over the wireless medium. The interface also is configured to provide the first PPDU to the second device and provide one or more subsequent PPDUs of the application file to the second device. Providing the one or more subsequent PPDUs is associated with a third priority of transmitting the one or more subsequent PPDUs over the wireless medium.

Another innovative aspect of the subject matter described in this disclosure can be implemented as another method for wireless communication. In some implementations, the method may be performed by a wireless communication device, and may include obtaining a first PPDU of an application file from an AP over a wireless medium. The AP obtains control of the wireless medium. Control of the wireless medium is associated with a first priority of transmitting the first PPDU over the wireless medium, and the first priority is different than a second priority of transmitting data from the wireless communication device to the AP over the wireless medium. The method also may include obtaining one or more subsequent PPDUs of the application file from the AP. Obtaining the one or more subsequent PPDUs is associated with a third priority of transmitting the one or more subsequent PPDUs over the wireless medium.

Another innovative aspect of the subject matter described in this disclosure can be implemented in another wireless communication device. The wireless communication device includes a processing system and an interface. The interface is configured to obtain a first PPDU of an application file from an AP over a wireless medium. The AP obtains control of the wireless medium. Control of the wireless medium is associated with a first priority of transmitting the first PPDU over the wireless medium, and the first priority is different than a second priority of transmitting data from the wireless communication device to the AP over the wireless medium. The interface also is configured to obtain one or more subsequent PPDUs of the application file from the AP. Obtaining the one or more subsequent PPDUs is associated with a third priority of transmitting the one or more subsequent PPDUs over the wireless medium.

Another innovative aspect of the subject matter described in this disclosure can be implemented as another method for wireless communication. In some implementations, the method may be performed by a device, and may include obtaining, from a second device, uplink (UL) data over a wireless medium and providing, to the second device, downlink (DL) data including PPDUs over the wireless medium. One or more PPDUs are provided to the second device during a current target wake time (TWT) window, and a beginning of the current TWT window is associated with one of: when a first PPDU of the one or more PPDUs is provided to the second device; or when the first PPDU is provided from an application layer to a media access control layer (MAC) of the device.

Another innovative aspect of the subject matter described in this disclosure can be implemented in a device. The device includes a processing system and an interface. The interface is configured to obtain, from a second device, UL data over a wireless medium and provide, to the second device, DL data including PPDUs over the wireless medium. One or more PPDUs are provided to the second device during a current TWT window, and a beginning of the current TWT window is associated with one of: when a first PPDU of the one or more PPDUs is provided to the second device; or when the first PPDU is provided from an application layer to a MAC of the device.

Another innovative aspect of the subject matter described in this disclosure can be implemented as another method for wireless communication. In some implementations, the method may be performed by a device, and may include providing UL data to a second device over a wireless medium and obtaining, from the second device, DL data including PPDUs over the wireless medium. One or more PPDUs are obtained from the second device during a current TWT window, and a beginning of the current TWT window is associated with one of: when a first PPDU of the one or more PPDUs is provided by the second device; or when the first PPDU is provided from an application layer to a MAC of the second device.

Another innovative aspect of the subject matter described in this disclosure can be implemented in a device. The device includes a processing system and an interface. The interface is configured to provide UL data to a second device over a wireless medium and obtain, from the second device, DL data including PPDUs over the wireless medium. One or more PPDUs are obtained from the second device during a current TWT window, and a beginning of the current TWT window is associated with one of: when a first PPDU of the one or more PPDUs is provided by the second device; or when the first PPDU is provided from an application layer to a MAC of the second device.

Another innovative aspect of the subject matter described in this disclosure can be implemented as another method for wireless communication. In some implementations, the method may be performed by a device, and may include rendering a plurality of video frames to be provided to a second device, splitting each video frame of the plurality of video frames into a plurality of video slices, and, for each video slice of the plurality of video slices, generating a plurality of PPDUs to include the video slice. Each PPDU includes one or more media access control layer (MAC) service data units (MSDUs) associated with the video slice, and the video slice is identified by a port number and a differentiated services field codepoint (DSCP) value included in each MSDU of the plurality of PPDU. The method also includes, for each video slice of the plurality of video slices, queuing the MSDUs for transmission to the second device.

Another innovative aspect of the subject matter described in this disclosure can be implemented in a device. The device includes a processing system and an interface. The processing system is configured to render a plurality of video frames to be provided to a second device, split each video frame of the plurality of video frames into a plurality of video slices, and, for each video slice of the plurality of video slices, generate a plurality of PPDUs to include the video slice. Each PPDU includes one or more MSDUs associated with the video slice, and the video slice is identified by a port number and a DSCP value included in each MSDU of the plurality of PPDU. The processing system also is configured to, for each video slice of the plurality of video slices, queue the MSDUs for transmission to the second device.

Another innovative aspect of the subject matter described in this disclosure can be implemented as another method for wireless communication. In some implementations, the method may be performed by a device, and may include obtaining, from a second device, one or more PPDUs associated with a video frame. The second device renders a plurality of video frames to be provided to the device, and the second device splits each video frame of the plurality of video frames into a plurality of video slices. For each video slice of the plurality of video slices, the second device generates a plurality of PPDUs to include the video slice. Each PPDU includes one or more MSDUs associated with the video slice, and the video slice is identified by a port number and a DSCP value included in each MSDU of the plurality of PPDU. For each video slice of the plurality of video slices, the second device queues the MSDUs for transmission to the device.

Another innovative aspect of the subject matter described in this disclosure can be implemented in a device. The device includes a processing system and an interface. The interface is configured to obtain, from a second device, one or more PPDUs associated with a video frame. The second device renders a plurality of video frames to be provided to the device, and the second device splits each video frame of the plurality of video frames into a plurality of video slices. For each video slice of the plurality of video slices, the second device generates a plurality of PPDUs to include the video slice. Each PPDU includes one or more MSDUs associated with the video slice, and the video slice is identified by a port number and a DSCP value included in each MSDU of the plurality of PPDU. For each video slice of the plurality of video slices, the second device queues the MSDUs for transmission to the device.

Another innovative aspect of the subject matter described in this disclosure can be implemented as another method for wireless communication. In some implementations, the method may be performed by a device, and may include attempting to provide a plurality of PPDUs associated with one or more video frames of an XR experience to a second device and measuring one or more of a PPDU transmission latency associated with attempting to provide the plurality of PPDUs or a PPDU transmission drop associated with attempting to provide the plurality of PPDUs. One or more parameters of the XR experience are adjusted and associated with one or more of the measurements.

Another innovative aspect of the subject matter described in this disclosure can be implemented in a device. The device includes a processing system and an interface. The interface is configured to attempt to provide a plurality of PPDUs associated with one or more video frames of the XR experience to a second device. The processing system is configured to measure one or more of a PPDU transmission latency associated with attempting to provide the plurality of PPDUs or a PPDU transmission drop associated with attempting to provide the plurality of PPDUs. One or more parameters of the XR experience are adjusted and associated with one or more of the measurements.

Another innovative aspect of the subject matter described in this disclosure can be implemented as another method for wireless communication. In some implementations, the method may be performed by a device, and may include attempting to provide a plurality of pose data frames associated with one or more video frames of an XR experience to a second device and measuring one or more of a pose data frame transmission latency associated with attempting to provide the plurality of pose data frames or a pose data frame transmission drop associated with attempting to provide the plurality of pose data frames. One or more parameters of the XR experience are adjusted and associated with one or more of the measurements.

Another innovative aspect of the subject matter described in this disclosure can be implemented in a device. The device includes a processing system and an interface. The interface is configured to attempt to provide a plurality of pose data frames associated with one or more video frames of an XR experience to a second device. Processing system is configured to measure one or more of a pose data frame transmission latency associated with attempting to provide the plurality of pose data frames or a pose data frame transmission drop associated with attempting to provide the plurality of pose data frames. One or more parameters of the XR experience are adjusted and associated with one or more of the measurements.

Another innovative aspect of the subject matter described in this disclosure can be implemented as another method for wireless communication. In some implementations, the method may be performed by a wireless communication device, and may include communicating with a first device over a first wireless link and communicating with a second device over a second wireless link. The wireless communication device communicates concurrently with the first device and the second device using one of multi-link operation (MLO) techniques or a TWT mode, and the wireless communication device is configured to give preference to communications on the second wireless link versus communications on the first wireless link.

Another innovative aspect of the subject matter described in this disclosure can be implemented in a wireless communication device. The wireless communication device includes a processing system and an interface. The interface is configured to communicate with a first device over a first wireless link and communicate with a second device over a second wireless link. The wireless communication device communicates concurrently with the first device and the second device using one of MLO techniques or a TWT mode, and the wireless communication device is configured to give preference to communications on the second wireless link versus communications on the first wireless link.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 9 shows a flowchart illustrating an example process for asynchronous channel access control according to some implementations.

FIG. 11 shows a flowchart illustrating an example process for synchronous channel access control based on a target wake time (TWT) session according to some implementations.

FIG. 15A shows a block diagram illustrating an example of synchronizing the clocks of the render device and the display device.

FIG. 15B shows a block diagram illustrating an example of synchronizing the clocks of the render device and the display device.

FIG. 15C shows a block diagram illustrating an example of synchronizing the clocks of the render device and the display device.

FIG. 17 shows a flowchart illustrating an example process for managing data for transmission according to some implementations.

Like reference numbers and designations in the various drawings indicate like elements.

DETAILED DESCRIPTION

Figure 1A:
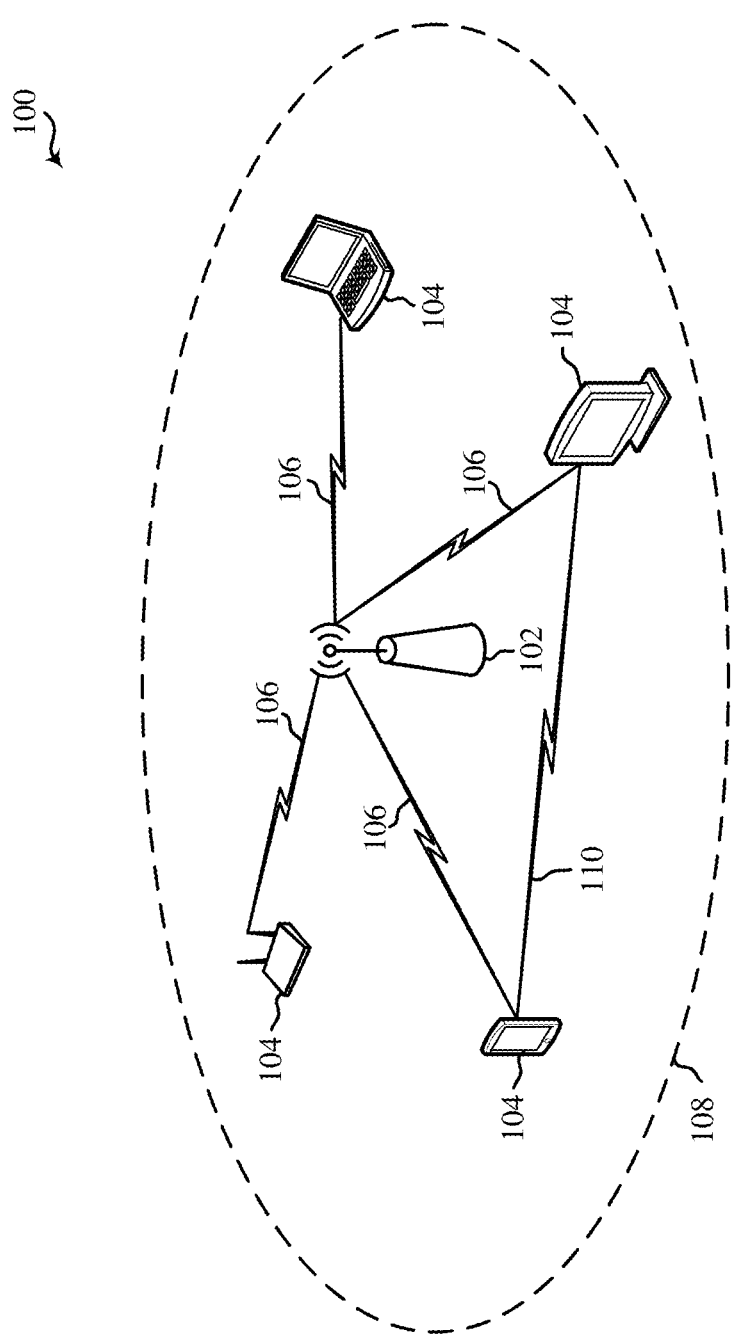
FIG. 1A shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to an architecture to provide an extended reality (XR) experience to a user. Wireless data associated with an XR experience generally have strict latency and packet loss restrictions to prevent reduction of the user experience. For example, packets for video frames or other data (including audio, haptic commands, and so on) must be rendered, delivered to a displaying device (such as a head mounted display (HMD), a wearables display, or other such wireless or wired display devices), and displayed at near real time. In addition, sensor information from the displaying device or other device on the user (such as measurements from an inertial measurement unit (IMU)) is used for rendering, which further complicates the latency requirements. Typical wireless systems are not designed under such restrictions for rendering, delivery, and displaying of data to ensure a minimum frame rate and to prevent synchronization issues, studder, or lag for an XR experience.

Some implementations more specifically relate to asynchronous channel access control of a wireless system for devices providing an XR experience. In accordance with some aspects of the present disclosure, a device may adjust the priority of one or more physical layer (PHY) convergence protocol (PLCP) data units (PPDUs) and may perform other operations to ensure control of the wireless medium at certain times while still allowing for other devices to communicate on the wireless medium. For example, the device may adjust a backoff counter or adjust one or more enhanced distributed channel access (EDCA) parameters to ensure obtaining control of the wireless medium to transmit a first PPDU of an application file. For one or more subsequent PPDUs of the application file, the device may again adjust a backoff counter or adjust one or more EDCA parameters to allow other devices to obtain control of the wireless medium in certain scenarios (such as for a display device to provide information back to the device or for another device to transmit using the shared wireless medium).

Particular implementations can be implemented to realize one or more of the following potential advantages. The render device ensuring control of the wireless medium may allow the render device to meet the latency requirements for the XR experience. The render device allowing others to transmit on the wireless medium may allow the wireless medium to be shared in an environment with multiple devices in a basic service set (BSS) or with multiple overlapping basic service sets (OBSSs). The render device also may be configured to allow the display device to provide sensor measurement and other information to the render device for rendering to meet latency and other requirements for the XR experience.

Some implementations more specifically relate to synchronous channel access control of a wireless system for devices providing an XR experience. In accordance with some aspects of the present disclosure, a render device may use a target wake time (TWT) session to communicate with the display device during one or more TWT service periods (also referred to as windows). The TWT session may be configured and managed to ensure control of the wireless medium to meet latency requirements or other requirements for the XR experience. Use of TWT windows allows other devices to use the wireless medium outside of the TWT windows.

Particular implementations can be implemented to realize one or more of the following potential advantages. The render device ensuring control of the wireless medium via use of TWT may allow the render device to meet the latency requirements for the XR experience. The render device allowing others to transmit on the wireless medium may allow the wireless medium to be shared in an environment with multiple devices.

Some implementations more specifically relate to application based data transport mechanisms for wireless communications in a synchronous channel control wireless system for an XR experience. In accordance with some aspects of the present disclosure, a render device may manage application data to be transmitted, and the display device may manage application data received to ensure that latency requirements of the XR experience are met. Management of the data includes generating, queuing, and identifying MSDUs for different video slices to be transmitted, flushing queues when appropriate, and indicating flushing to the display device. Management at the display device may be flushing a reorder (REO) queue or otherwise managing the REO queue receiving the MSDUs from the render device.

Particular implementations can be implemented to realize one or more of the following potential advantages. Management of the queues (including generating and flushing the queues) may ensure that latency requirements of the XR experience are met. Management of the queues also may ensure the removal of stale data that may increase a communication latency between the render device and the display device.

Some implementations more specifically relate to providing feedback and adapting an XR experience based on the feedback. In accordance with some aspects of the present disclosure, a render device may attempt to transmit PPDUs to the display device and measure a latency or a packet drop associated with transmitting the PPDUs. A display device may attempt to transmit pose data frames or tracking frames and measure a latency or a packet drop associated with transmitting the frames. The render device and the display device may perform other measurements associated with the XR experience, and the measurements may indicate when the XR experience is being impacted (such as measuring an increase in latency or packet drop). One or more parameters of the XR experience may be adjusted, and the measurements or the adjustments may be indicated to the other device.

Particular implementations can be implemented to realize one or more of the following potential advantages. Generating and providing feedback may allow the render device and the display device to determine when to adjust the XR experience to meet latency requirements or other requirements.

Some implementations more specifically relate to support of concurrent wireless links by one or more wireless communication devices. In accordance with some aspects of the present disclosure, a render or relay device include concurrent links to an AP or STA and to a display device. The render device or a relay device is to support the concurrent links while giving preference to communications with the display device (which may be associated with an XR experience having latency and other requirements). The render or relay device may use an enhanced set of multi-link operation (MLO) techniques or TWT mode techniques to support the concurrent links and meet the latency and other requirements of the XR experience. If a relay device supports concurrent links with an AP and a display device, rendering of video frames for an XR experience may be performed at the AP or a cloud server behind the AP. The video frames may be sent from the AP to the relay device using a first link and sent from the relay device to the display device using a second link concurrent with the first link.

Particular implementations can be implemented to realize one or more of the following potential advantages. Support of the concurrent links may allow the render or relay device to continue communicating with an AP or another STA while still supporting an XR experience. In this manner, the render or relay device and the display device may be included in a BSS, mesh network, or other environment in which devices communicate with multiple other devices while still supporting the XR experience.

FIG. 1A shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, HMDs, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1A additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload. A PPDU also may be referred to as a physical layer protocol data unit or a PHY protocol data unit.

As noted above, devices (such as STAs 104) may communicate directly with one another. For an XR experience, a render device may communicate directly with a display device. For example, video frame data, audio data, and sensor information may be communicated between the devices providing the XR experience to allow rendering and displaying video (or providing audio or other data) synchronized with movements of the display device.

As used herein, an XR experience refers to one or more of a virtual reality (VR, in which a user may be isolated from the real world), augmented reality (AR, in which a virtual world or virtual information may be overlaid on real world objects in a display), or mixed reality (MR, in which virtual objects and real world objects may be integrated into a display that may appear seamless to the user) experience that may be provided to a user. For example, the user may have a HMD (or other display device), audio device, or a haptic feedback device (such as haptic gloves or vest) that is synchronized to provide information to the user based on the user's movements.

Figure 1B:
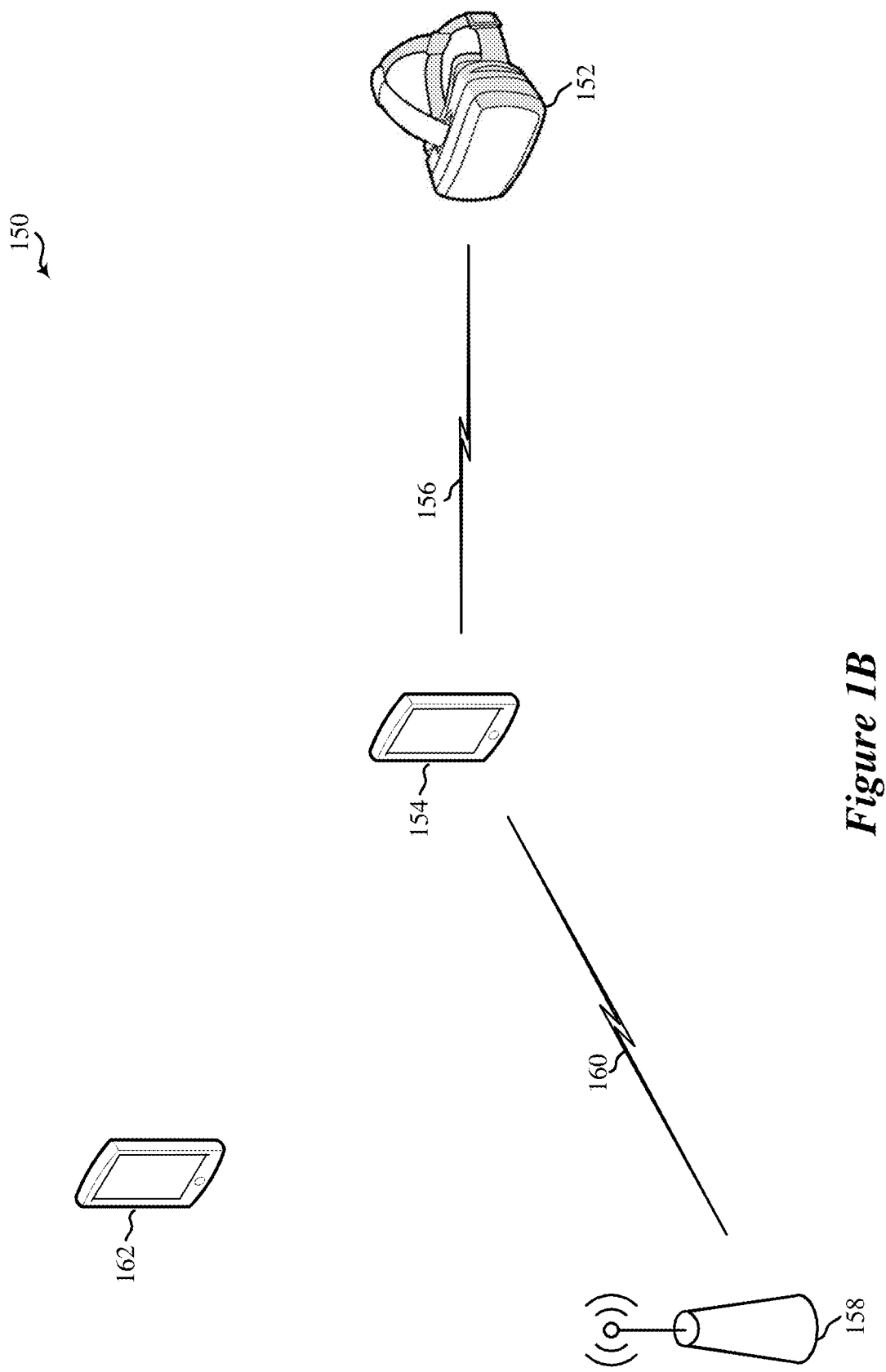
FIG. 1B shows a pictorial diagram of a group of example devices to provide an extended reality (XR) experience.

FIG. 1B shows a pictorial diagram of a group 150 of example devices to provide an XR experience. The device 152 is a display device to display video frames of the XR experience. While the device 152 is depicted as an HMD, the device 152 may be any suitable display device, such as a tablet or smartphone or eyeglasses. The device 154 is a device to provide the video frames to the display device 152 over wireless communication link 156. The device 154 may be an example implementation of a STA 104 in FIG. 1A. The device 154 may be configured as a software enabled AP (soft AP or SAP) for the display device 152. In some implementations, the device 154 is a render device configured to render the video frames. In some implementations, the device 154 is a bridge device to obtain video frames rendered by a cloud server behind an AP 158 or the AP 158 itself over a wireless communication link 160 and provide the video frames to the device 152. While the device 154 is depicted as a smartphone, the device 154 may be any suitable device for rendering or providing frames, such as a desktop computer, laptop computer, or tablet. While the device 154 is depicted as communicating with the AP 158, in some implementations, the device 154 communicates with another STA in a peer-to-peer (P2P) mode. In the provided examples, an AP may refer to a STA communicably coupled to the device 154 in the P2P mode.

In some implementations, the device 152 or the device 154 is within wireless communication range (also referred to as within range) of one or more other devices. For example, one or more of the devices 152 or 154 may be within range of device 162. The device 162 may be in the BSS of the AP 158 or may be in an other BSS (OBSS) associated with a different AP. The device 162 is configured to communicate on the same wireless medium as the device 154 (such as in the same frequency band, on the same channel, or on an overlapping channel). In this manner, the devices 154 and 162 share the wireless medium to communicate with other devices.

Many of the examples below describe devices generating, providing, or obtaining PPDUs associated with video frames and video slices of video frames. Aspects of the disclosure also apply to other types of data provided. For example, an application file may be a smallest segment of data that is recognizable by a receiving device at an application layer. A receiving device is unable to process any portion of the application file at an application layer unless all portions of the application file are obtained and joined to generate the entire application file. An example application file includes a video slice of a video frame. As used herein, a video slice also may be referred to as a video frame slice or a slice. In processing video, each frame may be divided into a plurality of slices (such as a group of pixel columns, pixel rows, macroblocks, or other portions of a video frame), and each video slice may be packaged into one or more PPDUs. While the below examples may be with reference to an application file referring to a video slice, an application file may refer to other portions (such as a video frame) or may include other data (such as audio, haptic information, a document, application scripts, and so on). In this manner, the device 152 may be other than a display device (such as an audio device or haptic feedback device). As such, the present disclosure is not limited to the management and transport of video data and devices specific to such.

As noted above, many devices (including devices 152 and 154) may provide and obtain PPDUs between one another.

For example, the AP 158 may provide and obtain PPDUs to and from the device 154. In another example, the device 154 may provide PPDUs to the device 152. FIGS. 2A-4 depict various example PPDUs. While the figures are described as PPDUs communicated between the AP 102 and one or more STAs 104, the PPDUs may be communicated between the device 154 and the device 152 (with the device 154 as a SAP and the device 152 as a STA of the SAP).

Figure 2A:
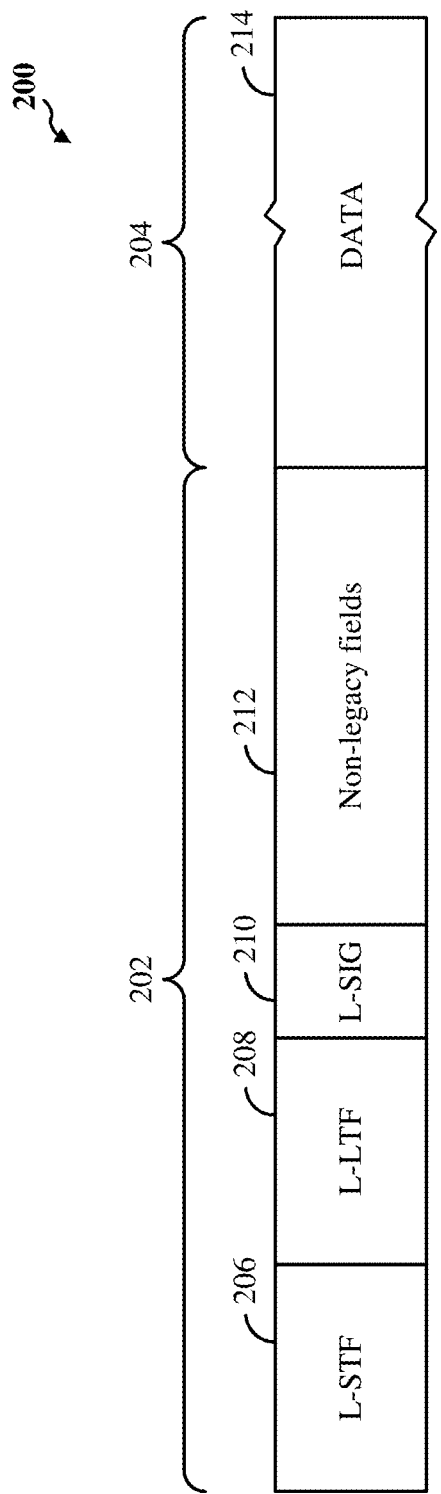
FIG. 2A shows an example protocol data unit (PDU) usable for communications between wireless communication devices.

FIG. 2A shows an example protocol data unit (PDU) 200 usable for communications between wireless communication devices. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 also may include a non-legacy portion (non-legacy fields 212). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 includes data 214. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
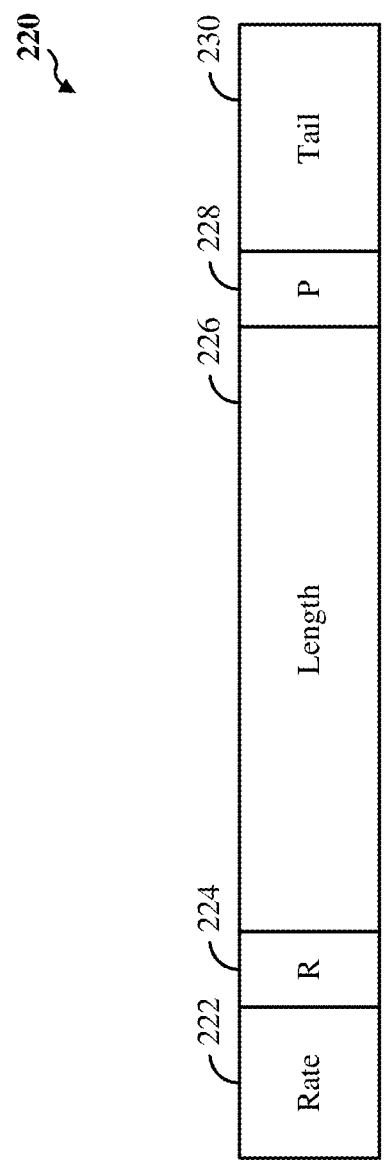
FIG. 2B shows an example field in the PDU of FIG. 2A.

FIG. 2B shows an example L-SIG field 220 in the PDU of FIG. 2A. The L-SIG 220 includes a data rate field 222, a reserved bit 224, a length field 226, a parity bit 228, and a tail field 220. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 230 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (μs).

Figure 3A:
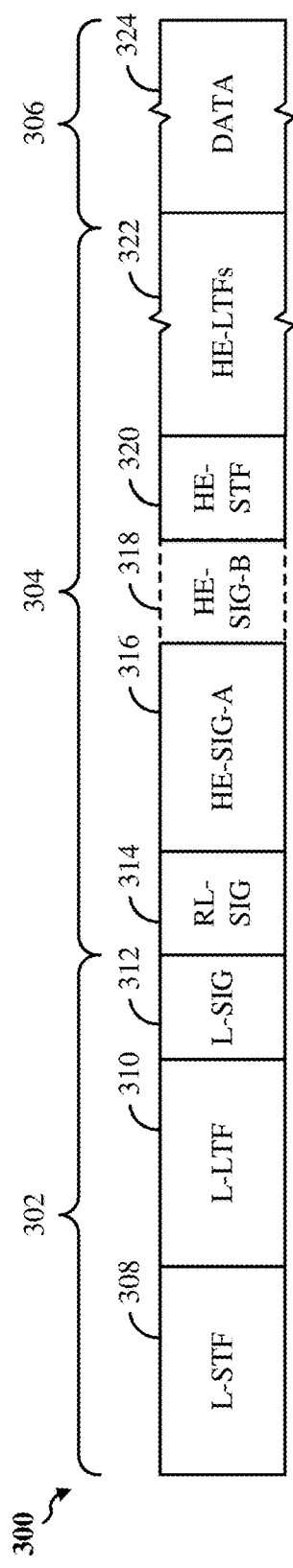
FIG. 3A shows another example PDU usable for communications between wireless communication devices.

FIG. 3A shows another example PDU 300 usable for wireless communication between wireless communication devices. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communicate on protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
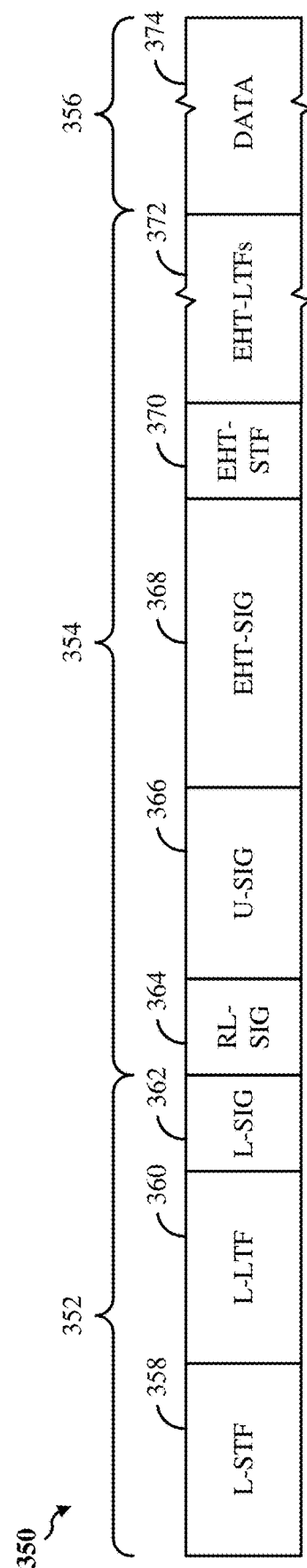
FIG. 3B shows another example PDU usable for communications between wireless communication devices.

FIG. 3B shows another example PPDU 350 usable for wireless communication between wireless communication devices. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
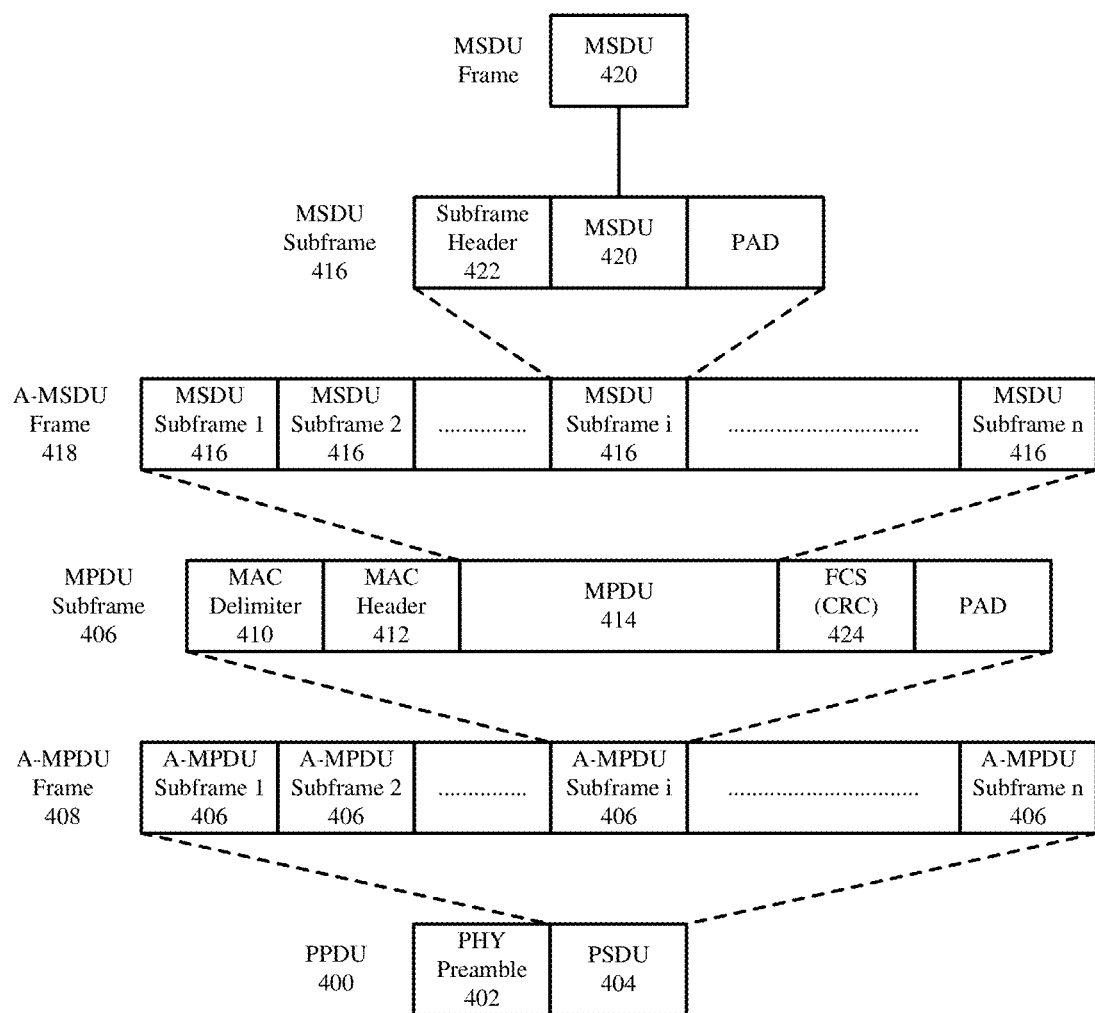
FIG. 4 shows an example physical layer convergence protocol (PLCP) protocol data unit (PPDU) usable for communications between wireless communication devices.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which includes the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address, or a destination address. The MAC header 412 may include a frame control field containing control information. The frame control field specifies the frame type, for example, a data frame, a control frame, or a management frame. The MAC header 412 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 also may include a frame check sequence (FCS) field 424 for error detection. For example, the FCS field 424 may include a cyclic redundancy check (CRC).

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs for which unscheduled STAs 104 may contend.

Figure 5:
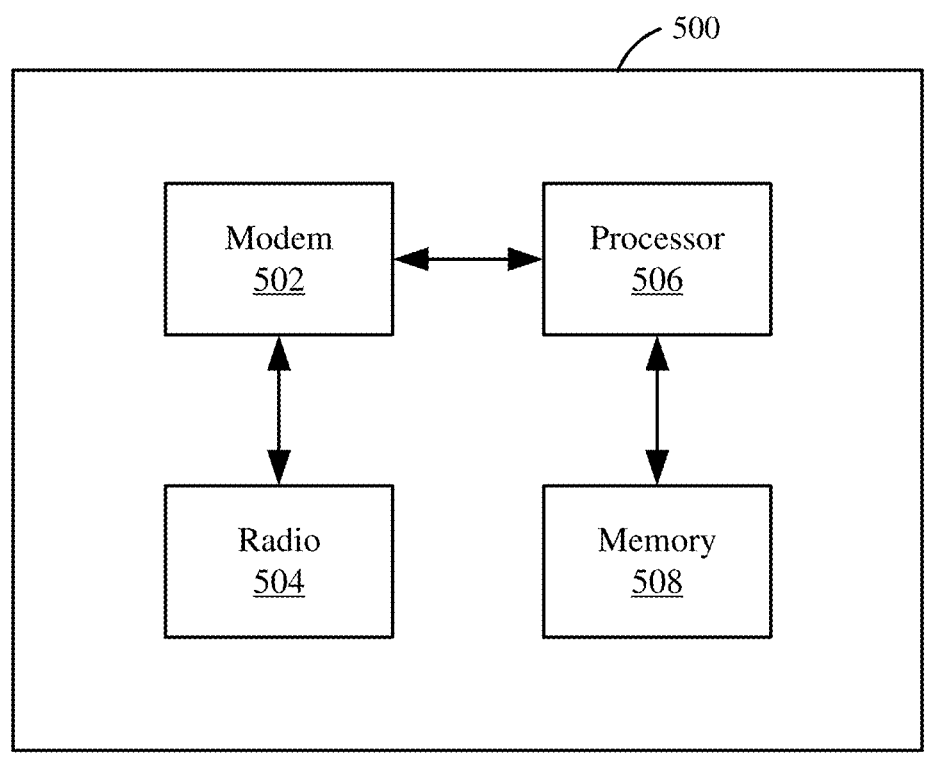
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1A or one or both of the devices 152 or 154 with reference to FIG. 1B. In some implementations, the wireless communication device 500 can be an example of a device for use in an AP such as the AP 102 described above with reference to FIG. 1A. The wireless communication device 500 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506"), and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which transmits the symbols via the coupled antennas. Similarly, symbols received via the antennas are obtained by the radio 504, which provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
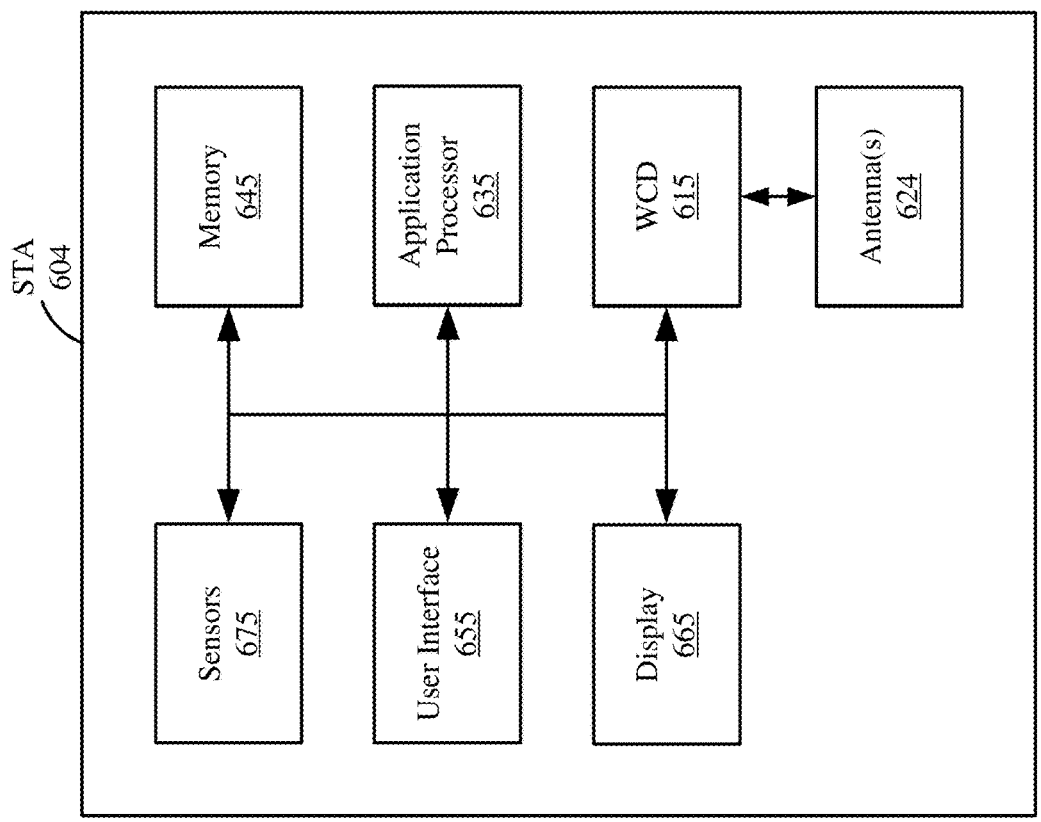
FIG. 6B shows a block diagram of an example station (STA).
Figure 6A:
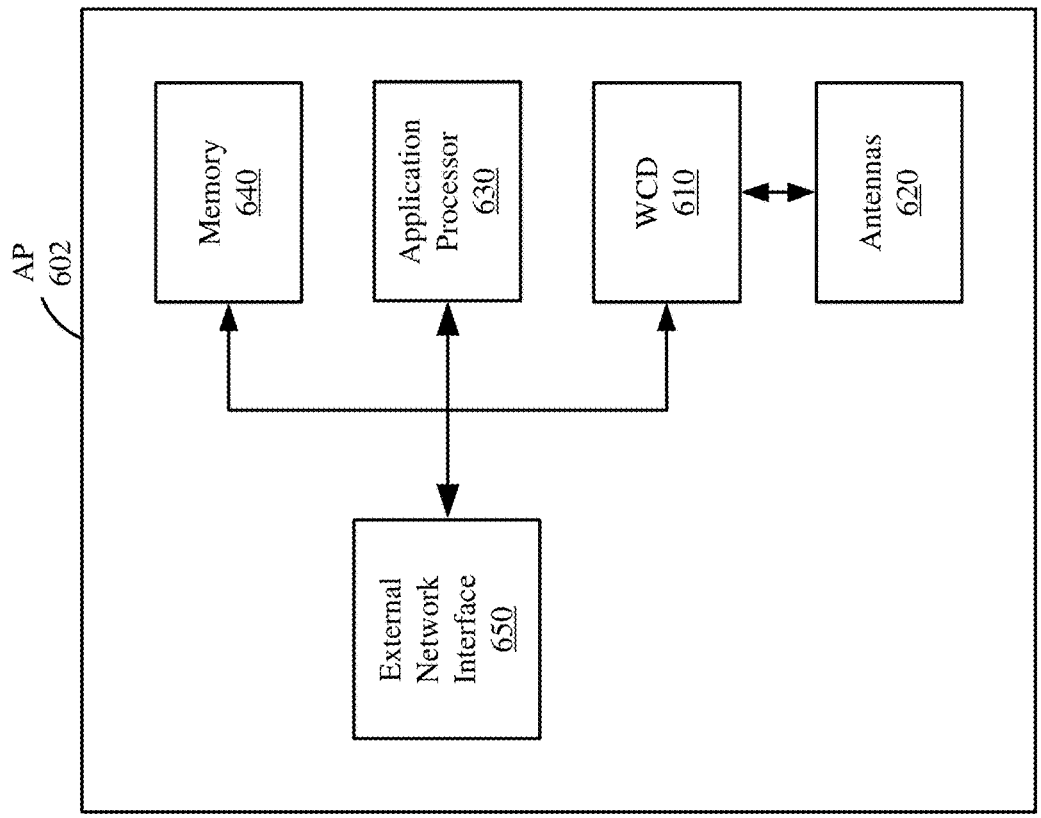
FIG. 6A shows a block diagram of an example access point (AP).

FIG. 6A shows a block diagram of an example AP 602. For example, the AP 602 can be an example implementation of the AP 102 described with reference to FIG. 1A or the AP 158 described with reference to FIG. 1B. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1A or one or more of the devices 152 or 154 described with reference to FIG. 1B. The STA 604 includes a wireless communication device 615. For example, the wireless communication device 615 may be an example implementation of the wireless communication device 500 described with reference to FIG. 5. The STA 604 also includes one or more antennas 624 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 624, UI 655, and display 665.

In some implementations of a device 152, the STA 604 may be, may include, or may be coupled to a HMD or other device used to provide an XR experience to a user (such as an audio device (including headphones), haptic gloves, a haptic vest, and so on). If the STA 604 includes a HMD, the display 665 may be integrated into glasses, a monocle, or other head mounted unit. In this manner, the STA 604 may be a display device for an XR experience. The sensors 675 may include an inertial measurement unit (IMU), which may include a gyroscope, an accelerometer, or other sensors to determine an orientation or motion of the STA 604. For example, the IMU may be included in an HMD to measure the orientation or motion of the HMD as a user moves his or her head. The orientation information (and, optionally, the motion information) of the device may be referred to as pose information. The IMU measures the pose information at a defined interval (such as every 100 microseconds (μs)).

In some implementations, the display device (such as a HMD) includes one or more cameras in its sensors 675. The one or more cameras may be used by the display device to generate tracking frames or other tracking information to be used by the render device in generating video frames. The tracking information may include markers or points in the user's field of view (FOV) in the HMD used to determine locations of information or objects in the video frames. For example, markers indicating a location of a building door may be used to render a video frame to overlay a name of a business, open hours, and so on near the door in the user's FOV. In this manner, the UL traffic from the display device to the render device may include pose data frames (also referred to as pose frames) and tracking frames. While rendering is described in the examples as being based on a pose frame, rendering also may be based on one or more tracking frames from the display device.

In some implementations of a device 154, the STA 604 may be configured as a SAP to the device 152. The software to cause the STA 604 to act as a SAP may be stored in memory 645 (or another suitable memory of the STA 604) and executed by the application processor 635. In this manner, the STA 604 (acting as a SAP) may perform some functionalities of the AP 602.

The render device for an XR experience may be the device 154 (which may be a STA 604 acting as a SAP), the AP 158 (with the device 154 acting as a bridge device), or a combination of both. The AP 602 may be referred to in the examples herein as describing a render device for an XR experience only for clarity and simplicity in explaining aspects of the present disclosure. The display device for an XR experience is the device 152. The STA 604 may be referred to in the examples herein in describing a display device for an XR experience. In some implementations, the render device and the display device may communicate over a 6 GHz frequency band (such as to transmit PPDUs or pose packets between the devices). However, any suitable frequency band may be used (such as 5 GHz or other frequency bands defined in the IEEE 802.11 standard). The downlink (DL) transmission rate from the render device to the display device may be at least 50 megabits per second (Mbps) to 120 Mbps to support 45 to 60 frames per second (fps), and the uplink (UL) transmission rate from the display device to the render device may be a minimum of 0.5 Mbps to 20 Mbps. The devices may be configured such that one way latency (such as on the DL or on the UL) is less than 10 ms.

The application processor 630 or 635 may be configured to execute one or more host layers of the open systems interconnection (OSI) model, including the application layer. As used herein, the application layer of the render device may refer to the application processor 630 or other components performing operations at the application layer. The application layer for an XR experience at the render device may include rendering for an XR application executed by the render device. As used herein, the application layer of the display device may refer to the application processor 635 or other components performing operations at the application layer. The application layer for an XR experience at the display device may include displaying a video for an XR application executed by the display device.

The WCD 610 or 615 may be configured to execute one or more layers of the OSI model, such as the network layer, the media access control layer (MAC), or the physical layer (PHY). One or more of the layers may be referred to as a wireless layer or a Wi-Fi layer. As used herein, the wireless layer of the render device may refer to the WCD 610 performing operations at the wireless layer. As used herein, the wireless layer of the display device may refer to the WCD 615 performing operations at the wireless layer.

The process from measuring pose information to render a video frame based on the pose information may be referred to as motion-to-render (M2R). The process from rendering the video frame to displaying the video frame may be referred to as render-to-photon (R2P). The overall process from measuring pose information to rendering a video frame using the pose information to displaying the video frame may be referred to as motion-to-render-to-photon (M2R2P). In some implementations, the render device and the display device are configured such that M2R2P is less than 70 ms (such as between 50 and 70 ms).

Figure 7:
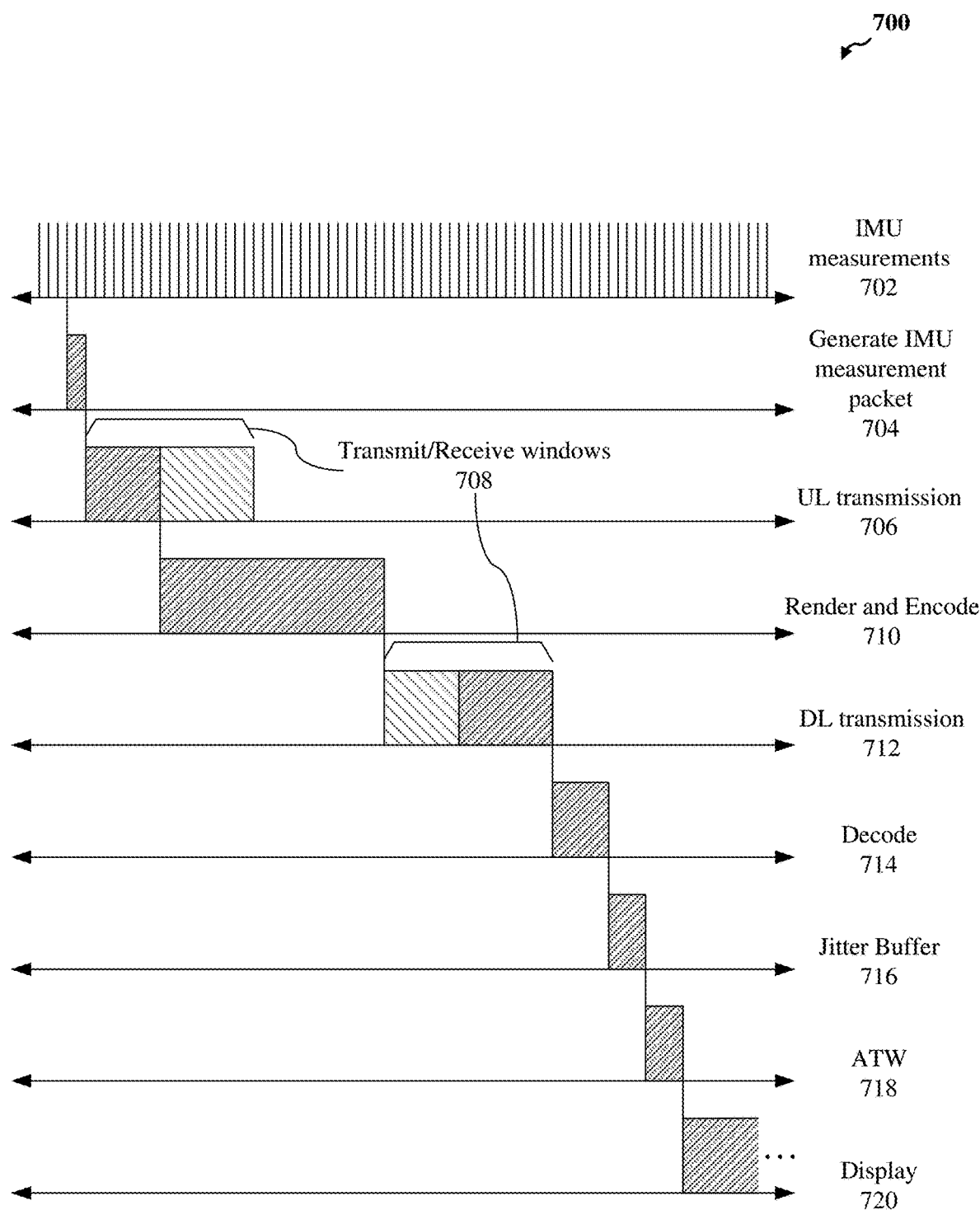
FIG. 7 shows a sequence diagram illustrating example motion-to-render-to-photon (M2R2P) operations.

FIG. 7 shows a sequence diagram 700 illustrating example M2R2P operations. The example M2R2P operations are with reference to one video frame, and the M2R2P operations may be repeated for each video frame. The timings of operations are not drawn to scale, and some operations may be slightly later than previous operations or may take a longer or shorter amount of time than as depicted. The IMU of the display device generates a plurality of IMU measurements (702). Each line indicates an IMU measurement. As depicted, the IMU measurements may be periodic without reference to when video frames are to be rendered or displayed. For a video frame to be rendered and displayed, the display device generates an IMU measurement packet (704) from one of the IMU measurements. The IMU measurement that is selected may be the current IMU measurement when a request for the packet is obtained from the render device or when the packet is to be generated based on a defined periodicity for the packets. After generating the IMU measurement packet, the display device may transmit the packet to the render device during an UL transmission 706 of a transmit/receive window 708. The render device may render and encode the video frame (710) based on the pose information (or other information) obtained in the IMU measurement packet. The render device may generate one or more PPDUs to include the encoded video frame data and transmit the one or more PPDUs to the display device during a DL transmission 712 of a transmit/receive window 708. The timing of the UL and DL transmissions 706 and 712 include over the air (OTA) time and processing time at the wireless layer. The display device may decode the video frame (714). In some implementations, the display device may use a jitter buffer (716) to capture decoded frame information and smooth video frame generation times to prevent jitter in the video. For example, the jitter buffer is used to ensure a fixed playback schedule of video frames by removing variations in decoding times. In some implementations, the display device may perform asynchronous time warping (ATW) on one or more video frames (718) to increase the perceived frame rate of the displayed video or compensate for latency between when the IMU measurement occurs and when the video frame is displayed. The display device displays the video frame (720), which is a video frame based on the selected IMU measurement at 702.

As used herein, an IMU measurement may be referred to as pose information, and an IMU measurement packet may be referred to as a pose packet or pose data packet. Pose information may include an orientation of the device with reference to the azimuth, a movement of the device, a location of the device, or other characteristics of a particular position of the device used to generate appropriate video frames to be displayed by the device. In FIG. 7, the pose packet is depicted as being generated once for each video frame. In some implementations, the pose packet may be generated at a higher frequency than once for each video frame. For example, a 60 fps video corresponds to 16.67 ms per video frame, and the display device may generate a pose packet every 2 ms. In this manner, at least 8 pose packets may be generated during display of one video frame. The display device may select the most recent pose packet when a pose packet is to be provided to the render device. The render device may generate a video frame based on the obtained pose packet. In some implementations, a most recent pose packet may not be obtained by the render device because of a DL transmission from the render device to the display device. The render device may use the last obtained pose packet to generate a video frame. To reduce the latency between the pose packet and rendering the video frame, the display device may provide a plurality of pose packets during rendering and encoding a previous video frame. In some other implementations, sending of the pose packets is synchronized with rendering and encoding. In this manner, timing of sending the pose packet is ensured so that the render device obtains the pose packet to render a next video frame.

Regarding access to the wireless medium, M2R2P latency requirements of an XR experience may cause the wireless system to provide preference to the render device and the display device to obtain control of the wireless medium. Preference to the render device and the display device may be with reference to other devices in the same BSS or one or more devices from OBSSs within range of the render device or the display device. Obtaining control of the wireless medium may refer to a device (such as the render device) obtaining control of one or more wireless channels for transmission or reception. Access to one or more wireless channels may be asynchronous (in which devices contend for the wireless medium during contention windows) or synchronous (in which one or more APs coordinate access to the wireless medium between devices). As described in the examples below, providing preference may include adjusting one or more contention parameters (such as a backoff timer value or one or more EDCA parameters) or coordinating transmission/reception windows between the render device and the display device to prevent interference by one or more other devices transmitting on the wireless medium. Asynchronous control of the wireless medium may be referred to as asynchronous channel access control. Synchronous control of the wireless medium may be referred to as synchronous channel access control. The wireless system also may be configured to prevent collisions between DL and UL traffic between the render device and the display device, prevent interference between links between the render device and an AP and the render device and the display device, or allow power saving at the render device or the display device based on channel access control.

Figure 8:
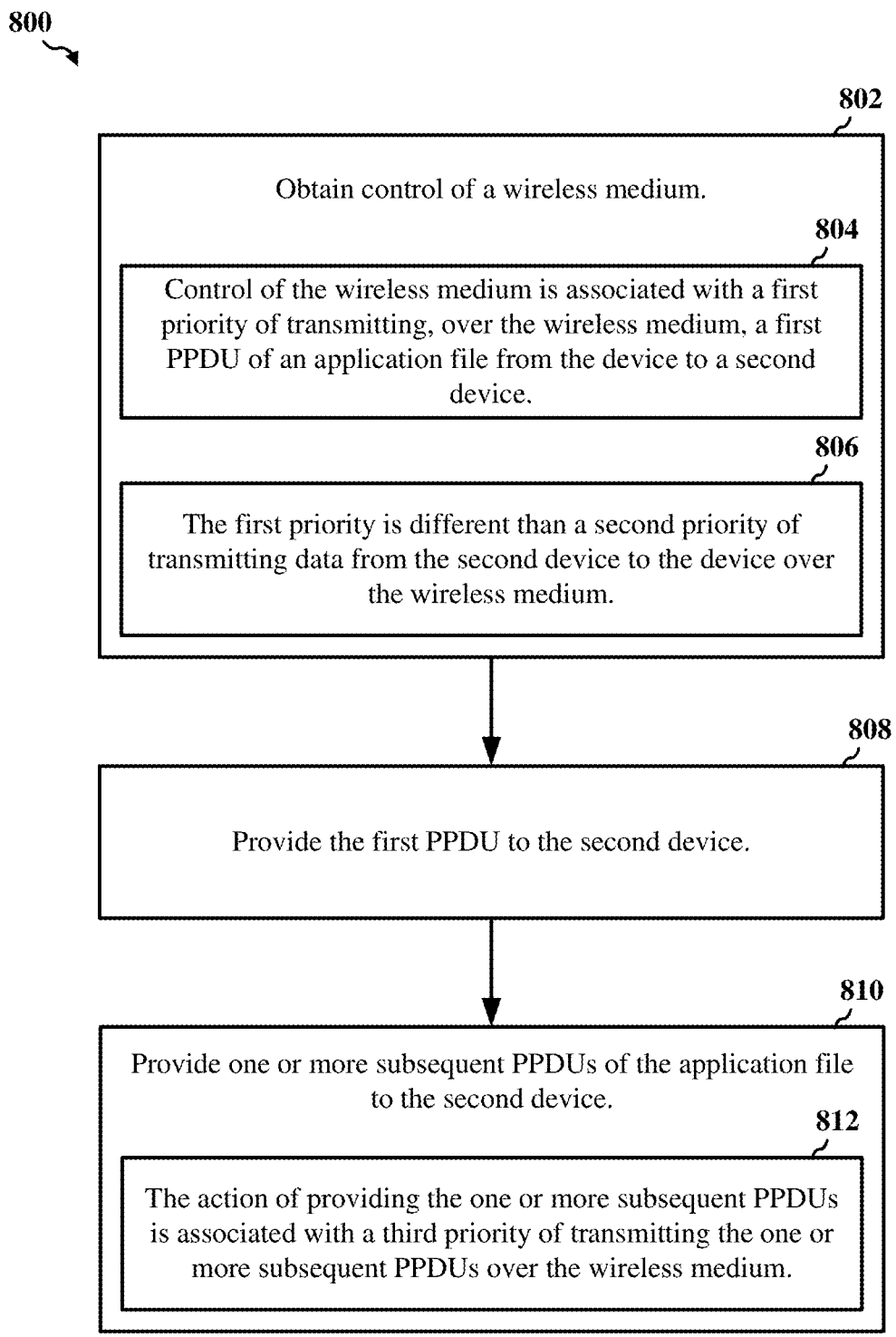
FIG. 8 shows a flowchart illustrating an example process for asynchronous channel access control according to some implementations.

FIG. 8 shows a flowchart illustrating an example process 800 for asynchronous channel access control according to some implementations. Control of the wireless medium and other operations in the example process may be performed by a device (such as the device 154 in FIG. 1B) or a wireless communication device implemented in the device (such as the WCD 615 in FIG. 6B). The device performing the operations may be a render device of an XR experience.

At 802, the device obtains control of a wireless medium. Control of the wireless medium is associated with a first priority of transmitting, over the wireless medium, a first PPDU of an application file from the device to a second device (804). The first priority is different than a second priority of transmitting data from the second device to the device over the wireless medium (806). As noted above, an application file may be a smallest portion of data that is whole (without missing portions) that can be processed by a device.

At 808, the device provides the first PPDU to the second device.

At 810, the device provides one or more subsequent PPDUs of the application file to the second device. In some implementations, the second device is a display device, and the application file is associated with a video frame (such as including a video slice of a video frame). In this manner, a plurality of PPDUs (including the first PPDU and the one or more subsequent PPDUs) may be associated with a video frame. The action of providing the one or more subsequent PPDUs is associated with a third priority of transmitting the one or more subsequent PPDUs over the wireless medium (812).

The first priority may be associated with a first set of EDCA parameters, the second priority may be associated with a second set of EDCA parameters, and the third priority may be associated with a third set of EDCA parameters. EDCA parameters may include one or more of an arbitration interframe spacing number (AIFSN), a minimum contention window (CWmin), or a maximum contention window (CWmax) used by the render device or the display device to determine when to transmit to the other device (such as based on CW mechanisms defined in the IEEE 802.11 standards). For example, the first priority may be associated with aggressive EDCA parameters to obtain control of the wireless medium over all other devices to contend for the wireless medium. In a specific example, the CWmin and the CWmax for the first priority are a first length that is less than other CWs used by the other devices. In addition or to the alternative, the AIFSN for the first priority is a lower number than other AIFSNs used by the other devices. For example, lower numbers may indicate a priority of the traffic based on a classification of the packets to be transmitted (such as high priority, best effort, and so on). A lower priority or a higher priority may refer to a higher or lower AIFSN, respectively. The AIFSN may be 1 for the first priority to indicate highest priority traffic to be transmitted, and the AIFSN may be 3 for the third priority to indicate traffic with a lower priority than the first priority. The AIFSN may be 2 for the second priority to indicate traffic with a higher priority than the third priority and a lower priority than the first priority. In some implementations, the render device may reserve the CW for both the render device and the display device. In this manner, the CWmin and CWmax may be set to 0 for the display device.

The first priority also may be associated with a first backoff counter value for contention of the wireless medium, the second priority also may be associated with a second backoff counter value for contention of the wireless medium, and the third priority also may be associated with a third backoff counter value for contention of the wireless medium. A backoff counter is set to the backoff counter value, and the backoff counter counts down until 0 for a transmit opportunity (TXOP) on the wireless medium. When the backoff counter reaches 0, the device attempts to transmit on the wireless medium (such as performing carrier sense to determine if the wireless medium is unoccupied and transmitting on the wireless medium based on the carrier sense). A shorter backoff counter value corresponds to a device attempting to transmit on the wireless medium sooner. In some implementations, the first backoff counter value is less than the second backoff counter value, and the second backoff counter value is less than the third backoff counter value. In this manner, a first PPDU (such as for a video frame) from a render device may be attempted to be transmitted sooner than data (such as a pose packet) from the display device, and the data from the display device may be attempted to be transmitted sooner than the one or more subsequent PPDUs (such as for the video frame) from the render device. In some implementations, the first backoff counter value may be 0, the second backoff counter value may indicate a time period greater than a short interframe spacing (SIFS), and the third backoff counter value may indicate a time period greater than indicated by the second backoff counter value.

The render device provides the first PPDU associated with the first priority and the one or more subsequent PPDUs associated with the third priority. The render device may configure itself to adjust the one or more EDCA parameters from the first set of parameters to the third set of parameters after transmitting the first PPDU. The render device also may adjust the backoff counter value from the first value to the third value (such as by setting the backoff counter to the third value for the subsequent PPDUs) after transmitting the first PPDU. Using different sets of EDCA parameters and backoff counter values, the render device has a higher probability of transmitting the first PPDU relative to other devices (including the display device and other devices in OBSSs). Conversely, the display device may transmit data (such as pose packets) to the render device before the one or more subsequent PPDUs are transmitted to the display device.

In some implementations, the render device uses a request to send (RTS)/clear to send (CTS) mechanism to obtain control of and reserve the wireless medium. For example, the render device may provide (such as broadcast) a first RTS frame to obtain control of the wireless medium. The RTS frame may be transmitted based on the first backoff counter value. The first RTS frame includes an indication of a network allocation vector (NAV) to maintain control of the wireless medium for a first time period. The NAV indicates the time period that the wireless medium is reserved by the device. In this manner, other devices within range of the render device receive the RTS frame, process the RTS frame, and set their NAV to the indicated amount of time to prevent transmitting on the wireless medium for the amount of time indicated. The example RTS/CTS mechanism and transmission of data between the render device and display device is described in more detail below with reference to FIG. 10.

FIG. 8 depicts an example process from the render device perspective. FIG. 9 depicts the example process from the display device perspective.

FIG. 9 shows a flowchart illustrating an example process 900 for asynchronous channel access control according to some implementations. Operations in the example process may be performed by a device (such as the device 152 in FIG. 1B) or a wireless communication device implemented in the device (such as the WCD 615 in FIG. 6B). The device performing the operations may be a display device of an XR experience.

At 902, the device obtains a first PPDU of an application file from a second device over a wireless medium. For an XR experience, the device may be a display device, and the second device may be a render device. The second device may refer to an infrastructure AP, an SAP (such as the device 154 in FIG. 1B acting as an SAP) or another device to provide the PPDUs of the application file to the device (the second device may be referred to as an AP or a render device in the below examples with reference to FIGS. 9 and 10). In some implementations, the application file includes one or more video slices of a video frame.

The second device obtains control of the wireless medium to provide the first PPDU (904), and control of the wireless medium is associated with a first priority of transmitting the first PPDU over the wireless medium (906). The first priority is different than a second priority of transmitting data from the device to the second device over the wireless medium (908).

At 910, the device obtains one or more subsequent PPDUs of the application file from the second device. The action of obtaining the one or more subsequent PPDUs is associated with a third priority of transmitting the one or more subsequent PPDUs over the wireless medium (912). As noted above, the priorities may be associated with one or more of a backoff counter value or sets of EDCA parameters.

Figure 10:
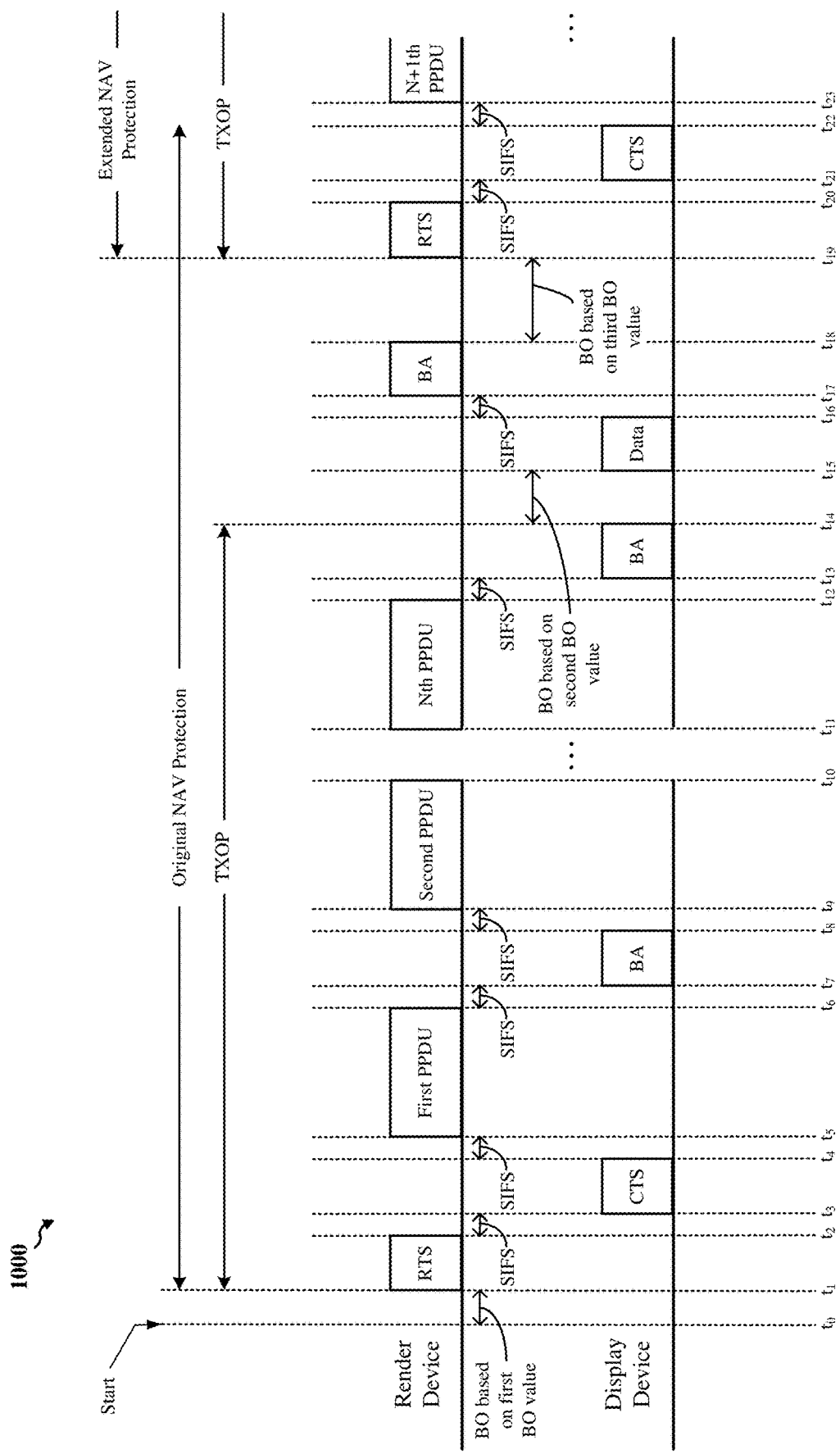
FIG. 10 shows a sequence diagram illustrating example transmissions between devices for an XR experience.

FIG. 10 shows a sequence diagram 1000 illustrating example transmissions between devices for an XR experience. The devices are depicted as a render device and a display device for explanation purposes, but the concepts described may be extended to other types of devices. Start time to may indicate the beginning of a CW or other moment when the render device is to begin its backoff (BO) counter (such as when one or more PPDUs are ready for transmission at the render device). The BO counter of the render device is set to the first backoff counter value (first BO value) associated with the first PPDU of an application file (such as of a video frame). If the display device is to begin its BO counter, the BO counter of the display device is set to the second backoff counter value (second BO value) associated with the data to be transmitted from the display device to the render device.

After a BO time period based on the first BO value (time $t_1$), the render device may send a RTS frame. The end of the RTS frame on the wireless medium is at time $t_2$. The display device sends a CTS frame to the render device a SIFS duration after time $t_2$ (time $t_3$). Sending the CTS frame may be based on the display device obtaining the RTS frame (which may indicate that the wireless medium is free) and that the display device is ready to obtain data from the render device. The end of the CTS frame on the wireless medium is at time $t_4$. The render device sends a first PPDU of an application file (such as of a video frame) to the display device a SIFS duration after time $t_4$ (time $t_5$).

While not depicted, if the CTS frame is not obtained by the render device, the render device may again wait the BO time period and attempt to resend the RTS frame to the display device. In some implementations, the render device is configured to retry sending the RTS frame five times before indicating that sending the RTS frame failed. In some implementations, the RTS/CTS mechanism before reserving the wireless medium is associated with a video frame. If sending the RTS fails (and the render device is unable to obtain control of the wireless medium), the render device may prevent providing the associated frame to the display device and attempt to obtain control of the wireless medium to provide the next frame to the display device. If a video frame is skipped, the display device may repeat the previously displayed video frame or not display a video frame at the time the missed video frame is to be displayed. In some implementations, if a video frame is skipped, one or more parameters of the DL communications (such as a modulation and coding scheme (MCS), a frame rate, forward error correction (FEC), and so on) may be adjusted to attempt to reduce the bandwidth requirements and attempt to increase the probability of delivering video frames to the display device.

Referring back to FIG. 10, the end of the first PPDU on the wireless medium is at time $t_6$. The display device sends a block acknowledgement (BA) to the render device a SIFS duration after time $t_6$ (time $t_7$). The BA indicates that the display device obtained the first PPDU. The BA also may indicate if any portions (such as one or more MPDUs) were corrupted or missing (such as by indicating which MPDUs (which include one or more MSDUs) were obtained in the first PPDU). If the render device does not obtain a BA, the render device may attempt to resend the first PPDU to the display device.

The end of the BA on the wireless medium is at time $t_8$. The render device sends a second PPDU to the display device a SIFS duration after time $t_8$ (time $t_9$), with the end of the second PPDU on the wireless medium at time $t_{10}$. The process may repeat for one or more PPDUs to be transmitted from the render device to the display device during the TXOP. For example, the render device may send an Nth PPDU at time $t_{11}$ (for N greater than or equal to 1). The end of the Nth PPDU on the wireless medium is at time $t_{12}$. The display device sends a BA to the render device a SIFS duration after time $t_{12}$ (time $t_{13}$), with the end of the BA on the wireless medium at time $t_{14}$.

Referring back to the RTS frame, the RTS frame indicates a NAV value to reserve the wireless medium for a duration of time greater than the TXOP (such as the original NAV protection duration indicated). For example, a TXOP may be configurable by the render device for up to a 2.5 ms duration. The RTS frame indicates a NAV value an amount equal to or greater than 2.5 ms in case the render device is to extend the NAV protection. Setting the NAV may refer to the render device indicating a value to set each receiving device's NAV to prevent the receiving device from transmitting for the amount of time. Extending the NAV may refer to the render device indicating a NAV padding value or new NAV value to increase or set each receiving device's NAV to extend the amount of time the receiving device is to prevent transmitting. The NAV duration and the TXOP may begin at the start time of the RTS frame. In some implementations, the render device indicates the NAV duration as set to the TXOP duration (such as 2.5 ms). The render device also may indicate in each PPDU (such as the first PPDU up through the Nth PPDU) a minimum NAV value to ensure the remaining NAV is a minimum duration or to extend the NAV (such as indicating a NAV padding of 1 ms following the PPDU transmission).

The display device may run its BO counter (set to the second BO value) at the end of the TXOP (such as at time $t_{14}$). During the BO time, the display device listens to the wireless medium for incoming traffic. If the wireless medium remains clear by the time the BO counter reaches 0 (such as at time $t_{15}$), the display device may send data to the render device. The data from the display device may include pose information or any other suitable UL data for the XR experience.

The end of the data on the wireless medium is at time $t_{16}$. The render device sends a BA to the display device a SIFS duration after time $t_{16}$ (time $t_{17}$), with the end of the BA on the wireless medium at time $t_{18}$. The render device may have one or more subsequent PPDUs of the application file to send to the display device. For example, sending a video frame may not be completed during a first TXOP, and the remainder of the video frame is to be sent during one or more subsequent TXOPs. As depicted, the original NAV protection indicates that the wireless medium is still reserved by the render device after time $t_{18}$.

As noted above, the one or more subsequent PPDUs are associated with a third priority (which is associated with a third backoff counter value (third BO value) or a third set of EDCA parameters). In this manner, the BO counter of the render device may be set to the third BO value (and the render device may be configured for the third set of EDCA parameters), and the BO counter begins to count down to 0 at the end of the BA on the wireless medium (time $t_{18}$). The BO counter reaches 0 at time $t_{19}$, and the render device provides a new RTS frame at time $t_{19}$. As depicted, time $t_{19}$ is still in the original NAV protection duration. The new RTS may indicate a new NAV value indicating an extended NAV protection (which may be similar in duration to the original NAV protection). In this manner, each receiving device's NAV is reset to the indicated NAV value, effectively extending the reservation of the NAV by the render device. The new RTS frame also may indicate a new TXOP.

The end of the RTS frame on the wireless medium is at time $t_{20}$. The display device sends a CTS frame to the render device a SIFS duration after time $t_{20}$ (time $t_{21}$), with the end of the CTS frame on the wireless medium at time $t_{22}$. The render device sends an N+1th PPDU to the display device a SIFS duration after time $t_{22}$ (time $t_{23}$). The process may be repeated similar to the first TXOP for one or more additional TXOPs.

In some implementations, the RTS/CTS mechanism may be enabled by the render device for the first PPDU of each video frame and disabled for other PPDUs of the video frame. In this manner, the N+1th PPDU may be sent without the RTS/CTS mechanism (such as to indicate a new TXOP to the display device). The NAV duration may be extended using the NAV padding indicated in each PPDU. In some implementations, the RTS/CTS mechanism may be enabled by the render device for PPDUs other than the first PPDU (such as for the one or more subsequent PPDUs, as depicted in FIG. 10, to indicate a new TXOP).

The render device may include a video queue to receive MSDUs The MSDUs include descriptors to indicate a specific video frame to which the MSDU is associated. In some implementations, the render device provides the MSDUs (in one or more PPDUs) to the display device, and the one or more obtained BAs indicate the MSDUs received by the display device. The render device removes the identified MSDUs from the video queue until all MSDUs are provided to the display device. In some implementations, an MSDU associated with a next video frame may be received at the video queue before all MSDUs associated with a current video frame are successfully provided to the display device. In some implementations, the render device may flush the video queue (skipping the remainder of the current video frame) to begin sending MSDUs of the next video frame. In some implementations, the render device may provide the remaining MSDUs of the current video frame.

As noted above, the render device may configure itself for a first priority of a first PPDU of a video frame. In some implementations, the render device may adjust one or more of the EDCA parameters (and the BO value), whether the RTS/CTS mechanism is enabled, or the number of retries for RTS/CTS. For example, if the video queue is empty and receives a first MSDU associated with a second video frame, the render device may configure itself for the first set of EDCA parameters (which may be associated with a first PPDU of a video frame) and set the BO counter to the first BO value. If RTS/CTS is enabled for only the first PPDU of a video frame, the render device may enable RTS/CTS (with the first MSDU to be included in the first PPDU of the video frame). In addition or to the alternative, the render device may set the number of retries for RTS/CTS to a defined number (such as five retries). The render device may adjust the EDCA parameters (and the BO value) to those associated with the third priority after transmission of the RTS is completed (such as based on obtaining the CTS) or after the defined number of retries. In some implementations, the render device may disable RTS/CTS or adjust the number of retries for RTS/CTS after transmission of the RTS is completed (such as based on obtaining the CTS) or after the defined number of retries.

The first MSDU may include metadata identifying the first MSDU in the first PPDU of a video frame (such as in a subframe header 422 of an MSDU subframe 416 as depicted in FIG. 4). The display device obtaining and processing the first PPDU may determine that the PPDU includes MSDUs (including the first MSDU) associated with a new video frame based on the metadata. In some implementations, the last MSDU may include metadata identifying the last MSDU in a last PPDU of a video frame (such as in a subframe header 422 of an MSDU subframe 416 as depicted in FIG. 4). The display device obtaining and processing the PPDU may determine that the PPDU includes the last MSDU associated with a video frame based on the metadata. The render device may prevent including an indication of NAV padding in the last PPDU or otherwise use the last PPDU to extend the NAV. In this manner, the render device may release control of the wireless medium at the end of the present NAV. In addition or to the alternative, the render device may send a contention free (CF)-End beacon after providing the last MSDU to indicate to receiving devices to clear their NAVs. In this manner, the render device may release control of the wireless medium before the end of the present NAV.

In some implementations, the render device may shorten one or more TXOPs (such as the first TXOP) from a maximum duration. The render device may shorten the TXOP to ensure that the display device may provide UL data to the render device at a sufficient frequency for the XR experience. Shortening the TXOP also may allow the display device to conserve power by placing one or more components of the WCD into a lower power mode for times outside of the TXOP.

A device (such as the render device) and a second device (such as the display device) may be in a first BSS. While not shown in FIG. 10, a device from an OBSS may share the wireless medium with the render device and the display device. Based on the first, second, and third priorities, the OBSS device may be prevented from obtaining control of the wireless medium to transmit some types of data. For example, the OBSS device may classify its traffic as best effort, high priority, and so on. The data to be transmitted by the OBSS device is associated with a fourth priority (which may be associated with a fourth set of EDCA parameters or a fourth BO value for the OBSS device based on the classification of the traffic). The OBSS device may contend for the wireless medium to transmit the data associated with the fourth priority.

The render device always may obtain control to transmit the first PPDU based on the first priority. For example, the first set of EDCA parameters (associated with the first priority) causes the render device to have preference over the display device and the OBSS device in obtaining control of the wireless medium. If the data associated with the fourth priority is classified as best effort data, the render device (to transmit subsequent PPDUs associated with a third priority) and the display device (to transmit data associated with a second priority) may have preference over the OBSS device. For example, the EDCA parameters associated with the fourth priority may prevent the OBSS device from transmitting the best effort classified data.

In some implementations, the third set of EDCA parameters may be configured so that a device is able to transmit high importance classified data (which may be associated with a set of EDCA parameters to allow transmission before transmission of one or more subsequent PPDUs from the render device). For example, referring back to FIG. 10, if a device that did not receive the RTS is to transmit high importance classified data (such as based on a differentiated services code point (DSCP) value), the device may be able (based on its EDCA parameters associated with the DSCP value) to transmit the data after time $t_{18}$ and before the render device is to send the next RTS (which is associated with the third set of EDCA parameters). If the device is to transmit best effort classified data (such as based on the DSCP value), the EDCA parameters of the device associated with the DSCP value may prevent the device from preempting the render device from sending the RTS associated with the third set of EDCA parameters. The device may attempt to transmit such data (or high importance classified data) at the end of the NAV time.

The above examples depict operations of a render device and a display device for asynchronous channel access control. In some implementations, the wireless system may be configured for synchronous channel access control. Example aspects for synchronous channel access control are described below. In some implementations, synchronous channel access control is based on target wake time (TWT) sessions defined by one or more APs (such as by one or more 802.11ax enabled or later APs, including IEEE 802.11be and other IEEE standards subsequent to IEEE 802.11ax). In some implementations, synchronous channel access control may be based on synchronized transmission/reception windows (which may not conform to TWT sessions defined in the IEEE 802.11ax standard) coordinated by one or more APs (such as a pre-802.11ax AP (which also may be referred to as a legacy AP)).

A TWT session may be between the display device (which may be referred to as a STA regarding the TWT session characteristics) and the render device (which may be referred to as a AP regarding the TWT session characteristics). The TWT session includes one or more TWT service periods (SPs) during which the display device is to remain awake unless determined that no further traffic is to be communicated during the SP. A TWT SP may be referred to herein as a TWT window or a window.

A TWT session (also referred to as a TWT) may include a plurality of characteristics. The characteristics include:
 whether an individual TWT (between two specific devices) or a broadcast TWT (between more than two devices or devices that may change during the TWT);
 whether a solicited TWT (STA initiates the TWT with the AP, which the AP may accept, reject, or provide an alternative) or an unsolicited TWT (AP sends unsolicited TWT responses based on a known cycle when the STA is listening to the wireless medium);
 whether an announced TWT (STA indicates when awake in a TWT SP (such as via a power save (PS)-Poll or an automatic power save delivery (APSD) trigger frame) before the AP can send DL traffic) or an unannounced TWT (AP can send DL traffic without waiting for an indication from the STA during the TWT SP);
 whether a trigger-enabled TWT (AP sends a trigger frame to STA before STA can send UL traffic) or a non-trigger-enabled TWT (STA can send UL traffic without waiting for a trigger frame); and
 whether an implicit TWT (STA calculates a next TWT SP start time a fixed amount of time from a current TWT SP start time) or an explicit TWT (STA requests the next TWT SP start time from the AP).

A TWT for synchronous channel access control between a render device and a display device (such as for an XR experience) may be an individual TWT, solicited TWT, announced TWT, non-trigger-enabled TWT, and implicit TWT. In some implementations, the TWT is an unsolicited TWT. The TWT may include such characteristics to protect XR activity of the render device and the display device. For example, an individual TWT ensures that the TWT window is set up exclusively for the render device and the display device to communicate DL traffic (and UL traffic) between each other, a solicited TWT and an announced TWT ensures that the display device is ready to receive DL traffic from the render device (to prevent delays associated with retries as a result of the display device not ready to receive DL traffic), a non-trigger-enabled TWT allows the display device to send pose data frames at a greater frequency (without requiring the overhead of trigger frames from the render device), and an implicit TWT reduces overhead caused by the display device requesting (and the render device providing) the next TWT SP start time. While an example set of characteristics for a TWT is indicated, any suitable set of characteristics may be used.

As used herein, XR activity may refer to any actions performed by one or more devices (such as one or more of a render device or a display device) to provide the XR experience to the user. The XR activity may include measuring the position of the display device by the IMU of the display device, generating the pose frames or packets (also referred to as pose data frames) from the IMU measurements, generating tracking frames, providing pose frames and tracking frames to the render device, rendering and encoding one or more video frames based on the pose frames and tracking frames, packetizing the one or more video frames, providing the packets to the display device, decoding the video frames from the received packets, processing the video frames (such as de-jitter and ATW), and displaying the video frames. XR activity additionally or alternatively may include operations to provide audio, haptic feedback, or other sensory information to the user during the XR experience.

Similar to asynchronous channel control access described above, synchronous channel control access using TWT is to prevent collisions and interference on the wireless medium by aligning the traffic between the render device and the display device to meet the latency and packet loss requirements for the XR experience. UL traffic may be sent by the display device when available (including outside of the TWT windows). In some implementations, though, the UL traffic is transmitted during the TWT windows. As noted above, for an XR experience, UL traffic may include pose frames and tracking frames from the display device. DL traffic may include PPDUs carrying video frame data from the render device. The PPDUs, pose frames, and tracking frames are transmitted during the TWT windows, and data from other devices (or other data from the render device to the AP or other devices) is transmitted outside of the TWT windows. To note, the concepts described herein may be applied to other types of UL traffic and DL traffic (such as an application file not being associated with video) and other types of devices. Some aspects of the disclosure are described in examples with reference to a render device and a display device for an XR experience for clarity in describing the aspects, but the aspects of the disclosure are not limited to the provided examples.

Referring back to FIG. 7, the rendering and encoding of each video frame (710) by the render device may be at a known interval and periodicity associated with the frame rate of the display (720). The TWT windows for the TWT session between the render device and the display device may be setup to have a known interval based on the known interval and periodicity for rendering. For example, the render device may be ready to transmit PPDUs of a next video frame at a known periodicity, and timing of the TWT windows may be based on the periodicity. As noted above, the TWT windows include the time that the wireless medium is allocated for UL and DL data to be transmitted between the render device and the display device. In this manner, when UL traffic is to be transmitted by the display device may be coordinated with when DL traffic is to be transmitted so that both may be transmitted during the TWT windows. The render device may setup the TWT session with the display device based on the rendering of video frames at the rendering device (with the period and length of the TWT windows indicated to the display device). The display device may coordinate transmitting UL traffic based on the indicated period and length of the TWT windows. The length of the TWT windows allows both UL traffic and DL traffic (also referred to as UL data and DL data, respectively) to be transmitted during a same TWT window.

FIG. 11 shows a flowchart illustrating an example process 1100 for synchronous channel access control based on a TWT session according to some implementations. The operations in the example process may be performed by a device (such as the device 154 in FIG. 1B) or a wireless communication device implemented in the device (such as the WCD 615 in FIG. 6B). The device performing the operations may be a render device of an XR experience.

At 1102, the device obtains UL data from a second device over a wireless medium. The UL data may include one or more pose frames or one or more tracking frames from the second device, which may be a display device (such as a HMD).

At 1104, the device provides, to the second device, DL data including PPDUs over the wireless medium. The PPDUs may include video frame data. During a current TWT window, the device may provide one or more of the PPDUs to the second device (1106). One or more pose frames also may be obtained during the current TWT window. In this manner, both UL data and DL data may be transmitted during the current TWT window.

The beginning time of the TWT windows may be adjusted to reduce latency and increase efficiency in using TWT windows. For example, if the TWT window begins an amount of time before either UL data or DL data is transmitted during the TWT window, the second device (such as a display device) is to remain awake and listening for the amount of time of the TWT window not used for transmissions. In addition, if the PPDUs are ready for transmission outside of the TWT windows, the render device must wait until a next TWT window to transmit the PPDUs. If UL data is to be transmitted outside of the TWT windows, the display device must remain in an active power state during times outside of the TWT windows to transmit the UL data. As noted above, the periodicity of rendering video frames is known (with when PPDUs for the video frames being available for transmission being periodic). If the time at which the PPDUs (such as the first PPDU) are available for transmission during each period is known, the beginning of the TWT window may be determined based on when the PPDUs are available each period. In this manner, a beginning of the current TWT window is associated with one of when a first PPDU of the one or more PPDUs is provided to the second device or when the first PPDU is provided from an application layer to a MAC of the device (1108). For example, the beginning of the current TWT window (and the other TWT windows) is synchronized with the time to transmit DL data and UL data to reduce any latency between the beginning of the TWT window and transmission and to reduce any time the render device is to wait between making one or more PPDUs ready for transmission and transmitting the one or more PPDUs.

As noted above, the DL data and the UL data may be associated with video frames rendered for an XR experience. In some implementations, the device depicted in FIG. 11 (such as a render device) renders video frames to be displayed by the second device (such as display device). In this manner, the UL data from the second device includes pose data frames, and the rendering of the video frames is associated with the obtained pose data frames. As noted above, video frames (such as a first video frame) includes a plurality of video slices, rendering of the first video frame is associated with a pose data frame most recently obtained from the second device, and one or more PPDUs to be transmitted to the second device are associated with one or more of the plurality of video slices. For example, a render device splits a video frame into a plurality of slices, and the render device packages each slice into a plurality of PPDUs to be transmitted during the TWT windows. Each TWT window may be used by the render device to transmit a video frame's PPDUs to the display device (with the next TWT window used to transmit the next video frame's PPDUs).

The second device listens for DL data during the TWT windows. If the transmission of DL data and UL data is coordinated so that both are transmitted during the TWT windows, the second device may not need to transmit outside of the TWT windows. The second device (such as a display device) may enter a low power mode (such as powering down or reducing power to one or more components of its wireless communication device) between TWT windows. In this manner, the second device may reduce power consumption. For example, many display devices (such as HMDs) are battery powered to allow a user to move about and not restrict a user's freedom of movement. The display device may place one or more components of its radio frequency (RF) front end into a low power mode between TWT windows to conserve power and extend the amount of time the display device may be in use between charges. Such a low power mode during a TWT session may be referred to as a TWT power save mode.

The render device may determine to continue to transmit to the display device outside of the TWT windows. For example, the render device may determine that one or more PPDUs of a video frame cannot be provided to the display device during the current TWT window. In this manner, the one or more PPDUs may be provided after the current TWT window. In some implementations, the render device may provide an indication to the display device not to enter into a low power mode (TWT power save mode) after the current TWT window. The indication may be included in a power management (PM) field of a packet's MAC header (such as a PM bit of the frame control field being set to 0 to indicate that the display device is not to enter into the low power mode) provided to the display device during the current TWT window (such as the last packet provided to the display device during the window). The display device processes the packet's header and determines that entering the low power mode is to be prevented after the current TWT window. In this manner, the render device may provide, to the display device, a PPDU after the current TWT window and before a next TWT window.

Conversely, the render device may terminate a current TWT window early if no additional PPDUs are to be transmitted during the current TWT window. For example, if all PPDUs of a video frame are provided to the display device before the end of the current TWT window, the render device may indicate to the display device that the current TWT window is being ended early. In some implementations, the end of service period (EOSP) bit of the Quality of Service (QoS) field of the MAC header of a packet may be set to 1 to indicate that the TWT window is ending. The packet may include a null data frame and be used exclusively to indicate the end of the TWT window via the QoS field's EOSP bit (which may be referred to as an EOSP packet). As defined for TWT sessions (such as in the IEEE 802.11ax standard), an EOSP packet can be sent after more than 10 ms of inactivity during the TWT window. In some implementations, the render device is configured to send the EOSP packet after 10 ms of inactivity after the last PPDU.

In some implementations, the TWT window may end before 10 ms of inactivity has elapsed. For example, as noted above, an MSDU may include metadata to indicate the MSDU being the last MSDU for the video frame. In processing the last MSDU, the display device determines that no more PPDUs are to be received from the render device for the video frame, and the display device may enter a low power mode until the next TWT window (effectively ending the TWT window for the display device). In another example, the render device may be configured to send the EOSP packet after less than 10 ms of inactivity (such as immediately after the last PPDU). The render device may determine to send the EOSP packet based on the metadata of the last MSDU when preparing the PPDUs for transmission to the display device.

The low power mode (TWT power save mode) referred to herein may differ from one or more sleep modes defined in the IEEE 802.11 standard (such as pre-802.11ax standards, including 802.11ba, etc.). For example, the low power mode (TWT power save mode) may be associated with a faster sleep to wake (S2W) and wake to sleep (W2S) time than the standard defined sleep mode (referred to as deep sleep) designed for best effort classified traffic based on delivery traffic indication messages (DTIMs) in an AP's beacons. In some implementations, the smallest low power period (including S2W and W2S) for the low power mode may be approximately 10 ms, and the smallest deep sleep period (including S2W and W2S) for deep sleep may be approximately 40 ms (which may be too long for XR activity for video at 60 fps (approximately 16 ms per video frame)). The low power mode may differ from deep sleep by powering down fewer RF front end components, maintaining a carrier signal lock of the wireless medium, or other operations to reduce the amount of time to enter into and exit from the low power mode.

Figure 12:
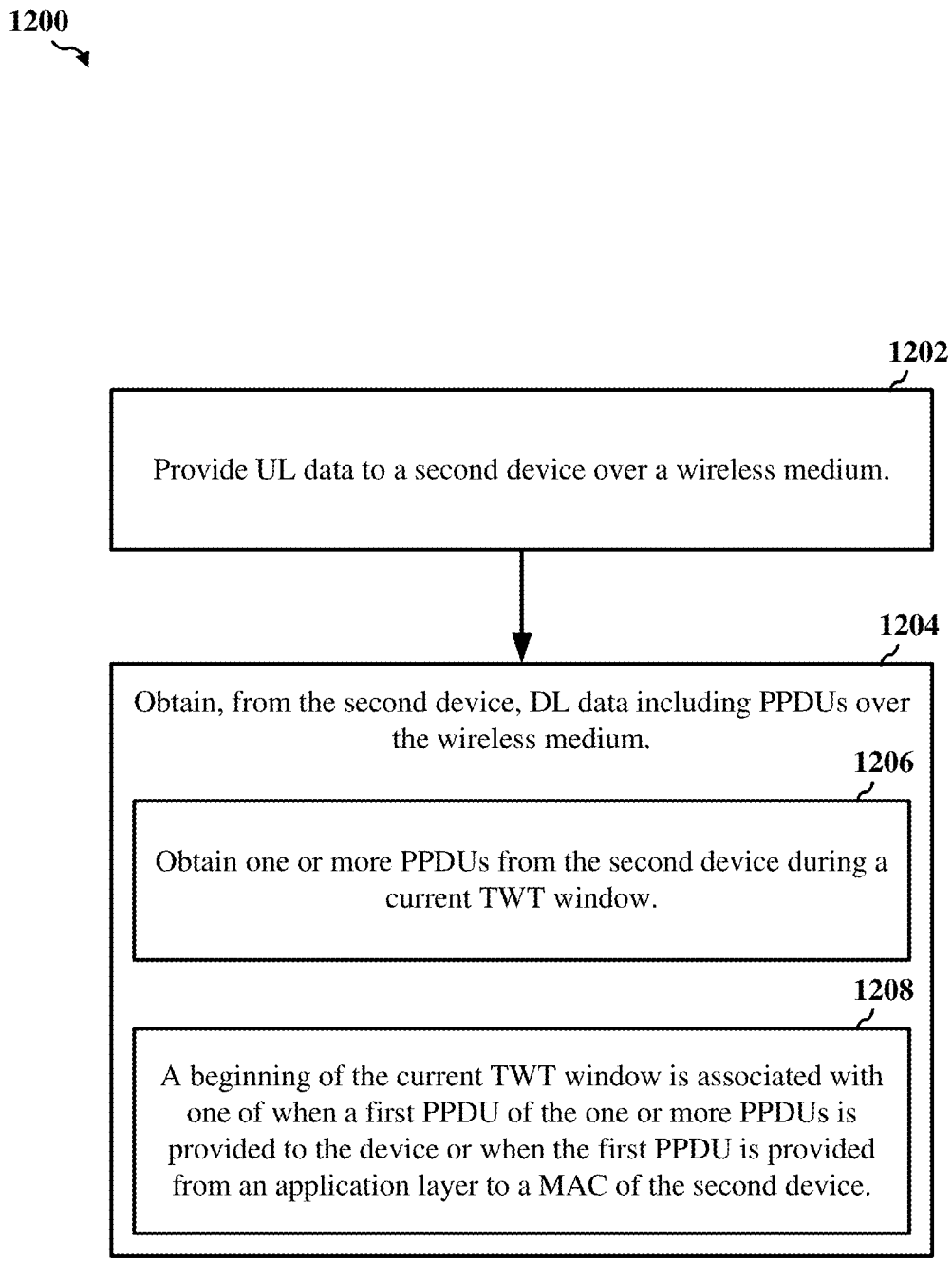
FIG. 12 shows a flowchart illustrating an example process for synchronous channel access control based on a TWT session according to some implementations.

FIG. 11 depicts an example process from the render device perspective. FIG. 12 depicts the example process from the display device perspective.

FIG. 12 shows a flowchart illustrating an example process 1200 for synchronous channel access control based on a TWT session according to some implementations. Operations in the example process may be performed by a device (such as the device 152 in FIG. 1B) or a wireless communication device implemented in the device (such as the WCD 615 in FIG. 6B). The device performing the operations may be a display device of an XR experience.

At 1202, the device provides UL data to a second device over a wireless medium. The second device may be a render device, and the UL data may include one or more of a pose data frame or a tracking frame.

At 1204, the device obtains, from the second device, DL data including PPDUs over the wireless medium. For example, the PPDUs are associated with one or more video frames rendered based on the UL data. The device obtains one or more PPDUs from the second device during a current TWT window (1206), and a beginning of the current TWT window is associated with one of when a first PPDU of the one or more PPDUs is provided to the device or when the first PPDU is provided from an application layer to a MAC of the second device (1208).

As noted above, the beginning of a TWT window is associated with when a first PPDU is to be transmitted. In some implementations, the beginning of the TWT window may coincide with when the first PPDU is to be transmitted. In some implementations, the TWT window may begin before when the first PPDU is to be transmitted. The display device may provide one or more of a tracking frame or one or more pose data frames for each video frame to be rendered. In this manner, the frequency of providing the tracking frames or one or more pose data frames is the same as the frequency of the video frames. For example, the pose data frames may be provided at a first frequency, and the video frames may be rendered at the first frequency. The display device may provide a pose data frame before when the first PPDU of a video frame is ready for transmission. In some implementations, a TWT window begins when the tracking frame or a first of one or more pose data frames is to be transmitted from the display device to the render device. For example, when the TWT window is to begin may be based on a M2R latency for the XR experience.

Figure 13:
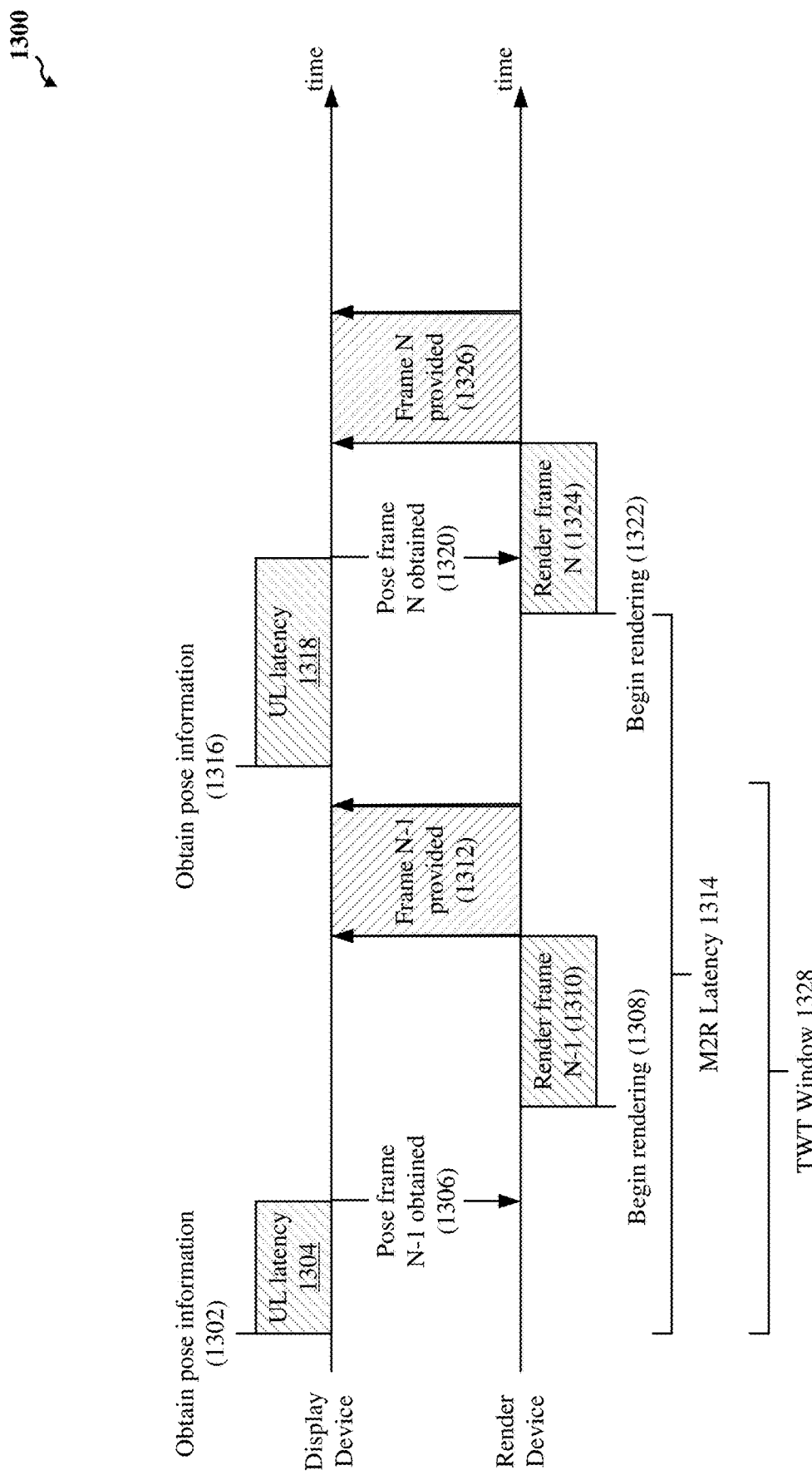
FIG. 13 shows a sequence diagram illustrating example timings of pose data frames and rendering of video frames associated with a motion to render (M2R) latency.

FIG. 13 shows a sequence diagram 1300 illustrating example timings of pose data frames and rendering of video frames associated with a M2R latency. At 1302, the display device obtains pose information. For example, the display device determines to package the current IMU measurement into a pose data frame N−1 (for any integer N greater than 0) and provide the pose data frame N−1 to the render device. UL latency 1304 is the latency between the time of the IMU measurement to the time the render device obtains the pose data frame N−1 (at 1306). UL latency 1304 may vary based on the amount of UL data to transmit and the conditions of the wireless medium. For example, if the wireless medium includes more interference or noise, the UL latency 1304 may be greater as a result of retries in sending the pose frame N−1 or using a lower MCS rate to transmit the pose frame N−1. After obtaining the pose frame N−1 (1306), the render device begins rendering video frame N−1 (1308). Time 1310 indicates the rendering time to render video frame N−1. While not depicted, the rendering time may include time for rendering and encoding of the video frame. The render device provides video frame N−1 to the display device in a plurality of PPDUs. Time 1312 is the time during which the PPDUs are provided from the render device to the display device. While not shown, the PPDUs may be provided before or after encoding of the entire frame is completed. For example, a video slice may be packaged into one or more PPDUs concurrently with another video slice being processed before packaging into one or more PPDUs. In this manner, time 1312 may overlap time 1310.

At 1316, the display device again obtains pose information. For example, the display device determines to package the current IMU measurement at that time into pose data frame N. The pose data frame N is obtained by the render device at time 1320 (with the UL latency 1318 being the latency between time 1316 and time 1320). UL latency 1318 is depicted as being greater than UL latency 1304 to depict that UL latencies may vary.

At 1322, the render device begins rendering video frame N. The video may have a specific frame rate, and the interval between video frame renderings may be fixed based on the frame rate, resolution, encoding, and other video parameters. In this manner, the amount of time between times 1308 and 1322 may be the same as the amount of time between time 1322 and a time to begin rendering video frame N+1. Time 1324 indicates the rendering time to render video frame N. The render device provides video frame N to the display device in a plurality of PPDUs. Time 1326 is the time during which the PPDUs are provided from the render device to the display device. While not shown, times 1312 and 1326 may be variable based on channel conditions, channel size, MCS, use of forward error correction (FEC), number of PPDUs to be transmitted, or other characteristics.

The render device renders a current frame based on the most recent pose frame obtained from the display device. For video frame N, time 1322 is before time 1320 (when pose frame N is obtained). In this manner, the render device does not render video frame N based on pose frame N (since pose frame N is not yet obtained). If the last pose frame obtained is pose frame N−1, the render device renders video frame N based on pose frame N−1. The M2R latency may be a latency between the IMU measurement and rendering a video frame associated with the IMU measurement. Since video frame N is based on pose frame N−1, the M2R latency 1314 is larger than if pose frame N would be received in time. The M2R latency may be determined based on a predefined or known UL latency.

In some implementations, a TWT window 1328 may begin at time 1302 (assuming that time 1302 is when the display device is to transmit the pose frame N−1). If the amount of time between times 1302 and 1316 is fixed (such as the same amount of time as between times 1308 and 1322), the length of the TWT window 1328 may be fixed to include through time 1312. Since time 1312 may vary, the TWT window 1328 may be of a length to accommodate variations in the time 1312 (such as a length to allow transmission of the video frame based on a maximum resolution, minimum MCS, minimum channel size, and so on). As noted above, the render device also may indicate that one or more PPDUs are to be transmitted after the end of a TWT window to transmit PPDUs unable to be transmitted during the TWT window. In the example, the end of the TWT window 1328 may be between the end of time 1312 and time 1316. While not shown, a new TWT window may begin at time 1316. To note, the sequence diagram 1300 (and other sequence diagrams depicted) are not to scale and may vary in operations. For example, the DL of video frame N−1 (1312) can be together with the UL of pose frame N (1320) into one TWT window.

Figure 14:
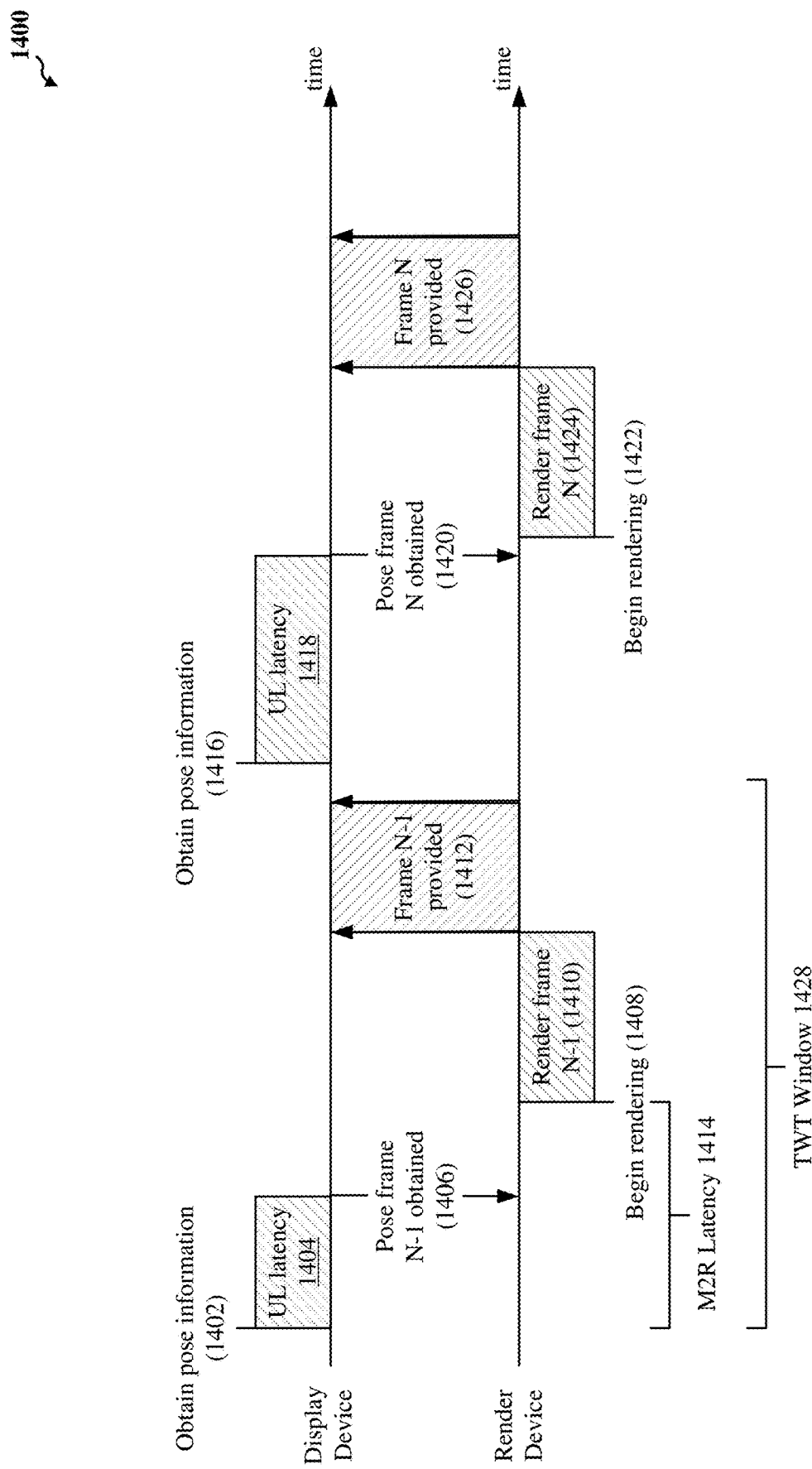
FIG. 14 shows a sequence diagram illustrating example timings of pose data frames and rendering of video frames associated with a M2R latency.

In the example sequence diagram 1300, timing of providing pose frames and rendering video frames is not coordinated, which may cause a video frame to be rendered before receiving a new pose data frame and increase the M2R latency. The render device may coordinate rendering of video frames or the display device may coordinate providing pose frames to the render device so that one or more pose frames are obtained before rendering a new video frame (such as the render device and the display device coordinating so that time 1322 occurs after time 1320). FIG. 14 depicts timings that are coordinated to reduce the M2R latency.

FIG. 14 shows a sequence diagram 1400 illustrating example timings of pose data frames and rendering of video frames associated with a M2R latency. At 1402, the display device obtains pose information. For example, the display device determines to package the current IMU measurement into a pose data frame N−1 (for any integer N greater than 0) and provide the pose data frame N−1 to the render device. UL latency 1404 is the amount of time from the time of the IMU measurement to the time the render device obtains the pose frame N−1 (at 1406). UL latency 1404 may vary based on the amount of information to transmit and the conditions of the wireless medium. For example, if the wireless medium includes more interference or noise, the UL latency 1404 may be greater as a result of retries in sending the pose frame N−1 or using a lower MCS rate to transmit the pose frame N−1. After obtaining the pose frame N−1 (1406), the render device begins rendering video frame N−1 (1408). Time 1410 indicates the rendering time to render video frame N−1. The render device provides video frame N−1 to the display device in a plurality of PPDUs. Time 1412 is the time during which the PPDUs are provided from the render device to the display device.

At 1416, the display device obtains pose information and provides the pose data frame N to the render device. UL latency 1418 is the amount of time from the time of the IMU measurement to the time the render device obtains the pose data frame N (at 1420). UL latency 1418 for pose frame N is greater than UL latency 1404 to depict that UL latencies may vary. At 1422, the display device begins rendering video frame N. Time 1424 indicates the rendering time to render video frame N. The render device provides video frame N to the display device in a plurality of PPDUs. Time 1426 is the time during which the PPDUs are provided from the render device to the display device. TWT window 1428 may be the same as TWT window 1328 in FIG. 13.

The amount of time between times 1408 and 1422 may be the same as the amount of time between 1308 and 1322 in FIG. 13. The difference between FIGS. 13 and 14 may be the timing between providing pose frames by the display device and rendering video frames by the render device. As depicted in FIG. 14, a timing of rendering the video frames is coordinated with a timing of the display device providing the pose frames to the render device. For example, time 1422 is determined so that time 1422 remains after time 1420. In this manner, pose frame N is obtained before rendering video frame N, and pose frame N may be used to render video frame N. In some implementations, the timing may be based on an UL latency for the pose frames (such as a potential UL latency based on the lowest MCS, smallest wireless channel, a level of noise, use of FEC, and other parameters to slow throughput of transmitting the pose data frame to the render device). With rendering being coordinated, the M2R latency 1414 is reduced. For example, the M2R latency 1414 is less than the M2R latency 1314 in FIG. 13.

If rendering and providing the pose frames are coordinated, the beginning of the TWT windows may be based on the M2R latency. For example, the render device may determine a TWT window to begin a first offset before the time to render a video frame. In some implementations, the first offset may be the M2R latency (such as M2R latency 1414 before time 1408 to be the beginning of the TWT window 1428).

As depicted in FIGS. 13 and 14, pose data frames may be obtained or provided and video frames may be rendered at the same frequency. In some implementations, more than one pose data frame may be provided during a TWT window (such as providing a pose data frame in the middle or towards the end of the TWT window), but at least the pose data frames provided at the beginning of the TWT windows may be provided at the first frequency. In this manner, each of the pose data frames obtained at the beginning of the TWT windows may be associated with a rendered video frame. Additional pose data frames may be provided during a TWT window in case there are issues obtaining the first pose data frame during the TWT window (such as based on temporary interference on the wireless medium). For example, if pose frame N is not obtained by the render device in FIG. 14, but the display device provides an intermediate pose frame at the end of the TWT window 1428, the render frame may use the intermediate pose frame (instead of pose frame N-1) to render video frame N. Providing additional pose frames may reduce the latency between when the pose information was obtained and when the video frame is rendered in such instances.

Referring back to the pose frames provided at the beginning of the TWT windows, obtaining the pose frames and rendering the video frames are at the same frequency, and timing between rendering video frames and obtaining pose frames is coordinated to reduce the M2R latency. Obtaining pose information is performed at an application layer of the display device, and rendering video frames is performed at an application layer of the render device. Referring back to FIGS. 6A and 6B, the application processor 630 (in conjunction with the memory 640) may execute an XR application on the render device (such as a VR or AR application on a smartphone). The application processor 635 (in conjunction with the memory 645) may execute an XR application of the display device (such as a VR or AR application on a HMD). At the application layer, the render device renders the video frames or generates audio, haptic feedback, or other information for the XR experience, and the display device obtains IMU measurements (such as from the sensors 675), displays the video, plays the audio, or provides other information to the user for the XR experience. Operations at the application layer are based on an application layer clock of the device. For example, the device may use a first piezoelectric material (such as a crystal) to generate a host clock provided to the application processor for performing application layer operations. In this manner, the application layer clock is used by the device for timing of rendering video frames (by the render device) or for timing of displaying the video frames (by the display device). Such a clock may be referred to as the application layer clock.

As noted above, the WCD 610 or 615 is used to perform operations at the lower layers of the OSI model (such as at the MAC). For example, managing and scheduling pose data frames, tracking frames, or PPDUs for transmission and managing receipt of packets may be at the MAC and managed by the WCD 610 or the WCD 615. Operation of the WCD is based on a second clock (referred to as the WCD clock). The WCD clock is used by the device for timing of wireless communications with a second device. The WCD clock is based on a second piezoelectric material (such as a second crystal) of the device different than for the application layer clock. Since a device may use two different crystals (and thus different logic) to generate the application layer clock and the WCD clock, the application layer clock and the WCD clock may be at different frequencies, resolution, or phases.

To coordinate timing between providing pose frames (and tracking frames) and rendering video frames, the display device and the render device may synchronize the application layer clock and the WCD clock. In this manner, the application layer clock and the WCD clock may have the same frequency and phase. In some implementations, the application layer clock may be synchronized to the WCD clock. In some implementations, the WCD clock may be synchronized to the application layer clock. The clocks of one device also may be synchronized to the clocks of the other device. In this manner, one of the four clocks between the render device and the display device is the reference clock, and the other three clocks are synchronized to the reference clock. The TWT window timings (such as offsets used to determine the beginning of a TWT window) may be determined based on the reference clock. The application layer clock of the display device may drive timing of the TWT windows if the display device's application layer clock is the reference clock, or the application layer clock of the render device may drive timing of the TWT windows if the render device's application layer clock is the reference clock. If the WCD clock is to be used to synchronize the other clocks, a schedule of the TWT windows may be set, and one or more of the render timing or the display timing of video frames may be adjusted based on the set schedule of TWTs.

FIGS. 15A-15C depict different clocks being the reference clock for synchronization. The application layer clock of the display device is depicted as the reference clock in FIG. 15A, the application layer of the render device is depicted as the reference clock in FIG. 15B, and the WCD clock of the render device or the display device is depicted as the reference clock in FIG. 15C.

FIG. 15A shows a block diagram 1500 illustrating an example of synchronizing the clocks of the render device 1502 and the display device 1508. The render device 1502 includes the application layer clock 1504 and the WCD clock 1506, and the display device 1508 includes the application layer clock 1510 and the WCD clock 1512. In the example, the application layer clock 1510 is the reference clock, and the other clocks are synchronized to the application layer clock 1510.

At 1514, the WCD clock 1512 is synchronized to the application layer clock 1510. For example, a time of the application layer clock 1510 may be indicated in the pose information or tracking frames to be provided to the render device 1502. The information is provided from the application layer to the MAC (such as to the WCD) to be scheduled and transmitted to the render device 1502. The WCD may obtain the time from the obtained information from the application layer and synchronize the WCD clock based on the indicated time.

At 1516, the WCD clock 1506 synchronizes to the WCD clock 1512. For example, the WCD of the display device 1508 includes a local timing synchronization function (TSF) timer for synchronizing communications over the wireless medium with the render device 1502. The WCD of the render device 1502 also includes a local TSF timer. The WCD of the display device 1508 periodically provides an indication of its TSF timer value to the WCD of the render device 1502 (such as via the pose data frames or via a beacon frame from the display device 1508 to the render device 1502). Synchronizing the WCD clock 1512 to the application layer clock 1510 causes the TSF timer of the WCD of the display device 1508 to be adjusted. Since an indication of the TSF timer value is periodically provided to the WCD of the render device 1502, the adjusted TSF timer value is indicated to the WCD of the render device 1502. The render device 1502 may adjust its WCD clock based on the adjusted TSF timer values from the display device 1508.

With the WCD clock 1506 of the render device 1502 synchronized to the WCD clock 1512 and the application layer clock 1510 of the display device 1508, the render device 1502 may synchronize the application layer clock 1504 to the WCD clock 1506 (1518). In some implementations, the render device 1502 may be configured to make the TSF timer values available to the application layer (such as via a call from the MAC to the application layer configured for the render device 1502). If the TSF timer is not visible at the application layer, the timing information from the packets obtained from the display device (such as the indicated TSF timer values and the times at which the packets are transmitted) may be used in synchronizing the application layer clock 1504.

FIG. 15B shows a block diagram 1520 illustrating an example of synchronizing the clocks of the render device 1522 and the display device 1528. The render device 1522 includes the application layer clock 1524 and the WCD clock 1526, and the display device 1528 includes the application layer clock 1530 and the WCD clock 1532. In the example, the application layer clock 1524 is the reference clock, and the other clocks are synchronized to the application layer clock 1524.

At 1534, the WCD clock 1526 is synchronized to the application layer clock 1524. For example, a time of the application layer clock 1524 may be indicated in the video frames or other information to be provided to the display device 1528. The information is provided from the application layer to the MAC (such as to the WCD) to be scheduled and transmitted to the display device 1528. The WCD may obtain the time from the obtained information from the application layer and synchronize the WCD clock based on the indicated time.

At 1536, the WCD clock 1532 synchronizes to the WCD clock 1526 (such as based on the local TSF timer values of the WCD of the render device 1522). For example, the WCD of the render device 1522 periodically provides an indication of its TSF timer value or other timing information to the WCD of the render device 1502 (such as via one or more MAC control elements (CEs) of the PPDUs for the video frames), and the local TSF timer of the display device 1528 may be adjusted based on updated timing information after synchronizing the WCD clock 1526 to the application layer clock 1524. With the WCD clock 1532 of the display device 1528 synchronized to the WCD clock 1526 and the application layer clock 1524 of the render device 1522, the display device 1528 may synchronize the application layer clock 1530 to the WCD clock 1532 (1538). Similar to as described above with reference to FIG. 15A, the display device 1528 may be configured to make the TSF timer values available to the application layer (such as via a call from the MAC to the application layer configured for the display device 1528). If the TSF timer is not visible at the application layer, the timing information from the packets obtained from the render device (such as the indicated TSF timer values and the times at which the packets are transmitted) may be used in synchronizing the application layer clock 1530.

FIG. 15C shows a block diagram 1540 illustrating an example of synchronizing the clocks of the render device 1542 and the display device 1548. The render device 1542 includes the application layer clock 1544 and the WCD clock 1546, and the display device 1548 includes the application layer clock 1550 and the WCD clock 1552. In the example, the WCD clock 1546 or 1552 is the reference clock, and the other clocks are synchronized to the WCD clock.

At 1554, the WCD clocks 1546 and 1552 are synchronized to each other. For example, the TSF timers between the devices may be synchronized, with timing information provided between the devices (such as described above with reference to FIGS. 15A and 15B). At 1556, the render device 1542 synchronizes the application layer clock 1544 to the WCD clock 1546 (such as described above with reference to FIG. 15A). At 1558, the display device 1548 synchronizes the application layer clock 1550 to the WCD clock 1552 (such as described above with reference to FIG. 15B).

Referring back to FIG. 15A, if the application layer clock 1510 is the reference clock, the application layer clock 1510 initially may be set by the display device 1508 and not need to be adjusted during operation. Since the application layer clock 1510 is not adjusted during operation and display of the video frames is based on the application layer clock 1510 of the display device 1508, display of the video frames may remain constant during operation (with other clocks 1504, 1506, and 1512 being adjusted to remain synchronized to the application layer clock 1510). The display device 1508 may determine the TWT session schedule between the render device 1502 and the display device 1508. The schedule may include the interval of the TWT windows, the size of the TWT windows, and the start times of the TWT windows. The display device 1508 may align UL traffic to the TWT windows (such as aligning the transmission of pose frames to the beginning of the TWT windows). In this manner, the timing of pose information being packaged and provided to the render device 1502 is based on the TWT schedule that is determined based on the application layer clock 1510. For example, the specific IMU measurements that are to be used to generate pose frames may be based on the TWT schedule that is determined based on the application layer clock 1510.

With the WCD clock 1506 and the application layer clock 1504 synchronized to the application layer clock 1510, the render device 1502 may align DL traffic to the TWT windows (such as aligning the transmission of the PPDUs to a portion of the TWT windows). For example, referring back to FIG. 14, the display device determines the times 1402 and 1416 to be at the beginning of the TWT windows (including TWT window 1428) based on the TWT schedule. The render device may coordinate times 1408 and 1422 (to render video frames N−1 and N) to be a first offset from times 1402 and 1416, respectively (with the first offset associated with the M2R latency). As noted above, M2R latency 1414 may be known. The first offset may be the M2R latency 1414. In this manner, the render device may coordinate time 1410 to be the M2R latency 1414 after time 1402.

In some implementations, the render device may trigger times 1408 and 1422 based on obtaining a pose frame during the TWT window or based on a timeout from the beginning of the TWT window. For example, triggering rendering video frame N−1 (at time 1408) may be based on obtaining pose frame N−1 (at time 1406). In this manner, the difference between times 1406 and 1408 is based on the amount of time needed to trigger rendering the video frame (such as processing the pose frame and providing the pose information by the WCD to the application layer before rendering the video frame at the application layer). As noted above, if the render device fails to obtain the pose frame (such as based on interference on the wireless medium), the render device does not provide an ACK to the display device. The display device may retry to provide the pose frame one or more times (such as up to a maximum number of times or up to a timeout amount of time from the beginning of the TWT window). The timeout may be based on when the render device is to begin rendering the video frame. For example, a timeout time may be an amount of time up to from the beginning of the TWT window to the time when the render device is to begin rendering a video frame (such as time 1402 to 1408). The timeout time may be determined by the render device or may be defined in the TWT session. In this manner, the render device begins counting from the beginning of each TWT window, and the render device triggers rendering the video frame at the first of reaching the timeout time or obtaining the pose frame. If a timeout occurs (with the timeout time being reached before obtaining the pose frame), the render device may use the last obtained pose frame obtained before the TWT window (such as during the last TWT window) to generate the video frame.

In some implementations, the display device may indicate when the render device is to begin rendering a video frame. In this manner, the render device triggers rendering each video frame based on an explicit indication from the display device. For example, a vertical synchronization (Vsync) value at the application layer of the display device may be indicated to the WCD to indicate the time the render device is to render a video frame. The time based on the Vsync may be indicated between the WCDs, and the render device may convert the indicated time to an application layer time to render the video frame.

Referring back to FIG. 15B, if the application layer clock 1524 is the reference clock, the application layer clock 1524 initially may be set by the render device 1522 and not need to be adjusted during operation. Since the application layer clock 1524 is not adjusted during operation and rendering of the video frames is based on the application layer clock 1524 of the render device 1522, rendering of the video frames may remain constant during operation (with other clocks 1526, 1532, and 1530 being adjusted to remain synchronized to the application layer clock 1524). The render device 1522 may determine the TWT session schedule between the render device 1522 and the display device 1528. The schedule may include the interval of the TWT windows, the size of the TWT windows, and the start times of the TWT windows. The render device 1522 may determine a start time of a TWT window to be an offset before the defined render time for a video frame. For example, referring back to FIG. 14, times 1408 and 1422 may be set based on the application layer clock 1530 (FIG. 15B). The render device may determine times 1402 and 1416 (which are the beginning of the TWT windows) to be a first offset (associated with the M2R latency) before the set render times 1408 and 1422. In some implementations, the first offset may be the M2R latency 1414, such as described above. As noted above, the M2R latency (and the first offset) may be determined to account for UL latency.

With the WCD clock 1532 and the application layer clock 1530 synchronized to the application layer clock 1524 (FIG. 15B), the display device 1528 may align UL traffic to the TWT windows. For example, referring back to FIG. 14, the display device may determine the times 1402 and 1416 to be at the beginning of the TWT windows (including TWT window 1428) based on the TWT schedule indicated by the render device. The display device 1528 also may align the display times for the video frames based on the application layer clock 1530. In this manner, the display time of a current video frame is aligned to a time associated with a current TWT window.

Referring back to FIG. 15C, if the WCD clock 1546 or 1552 is the reference clock, the WCD clocks 1546 and 1552 initially may be set and synchronized based on TSF information provided between the render device 1542 and the display device 1548. For example, the render device 1542 may provide timing information to the display device 1548, and the local TSF timers may be synchronized based on the timing information. In this manner, the application layer clock 1544 and the application layer clock 1550 are adjusted based on the respective WCD clock. With a WCD clock as the reference clock, the TWT session schedule may be based on network resource availability (in addition to the latency requirements for XR traffic). For example, the TWT window size, interval, and start times may be based on the wireless medium being shared by concurrent links from the render device to an AP and to the display device. In another example, the TWT window size, interval, and start times may be based on the wireless medium being shared by multiple links between the render device and multiple display devices (such as in a mesh network). The TWT session schedule may be determined either by the render device or the display device, and the render device and the display device may coordinate application layer operations based on the TWT session schedule.

Referring back to FIG. 14, in some implementations, the render device may set times 1408 and 1422 to be a first offset after the beginning of the respective TWT window (such as a first offset equal to the M2R latency 1414 after time 1402 for time 1408). In some implementations, the render device may trigger rendering based on obtaining a pose frame or a timeout occurring (such as described above). The display device may determine the time to display the video frames based on the TWT session schedule.

Over time, the synchronized clocks may drift from one another. The render device or the display device may periodically synchronize the clocks as a result of the drift. For example, the WCD clocks may remain synchronized based on the TSFs, but the application layer clock at the display device or the render device may drift from the respective WCD clock. In some implementations, the device measures and determines if a drift between the application layer clock and the WCD clock is greater than a defined threshold (such as more than 100 µs). If the drift becomes greater than the defined threshold, the device again may synchronize the application layer clock and the WCD clock. Synchronization may be performed as described above with reference to FIGS. 15A-15C and based on which clock is the reference clock. If the device includes the reference clock, the other device also may synchronize its clocks based on the synchronization.

In the above examples, the display device may provide more than one pose frame during a TWT window. For example, a first pose frame may be provided at the beginning of a TWT window. The display device also may provide one or more additional pose frames later in the TWT window. In some implementations, the display device may provide an additional pose frame after a defined time of inactivity on the wireless medium during the TWT window. In some implementations, the display device may provide an additional pose frame towards the end of the TWT window or after the render device indicates that no further PPDUs are to be provided (such as based an indication in an MSDU indicating that the MSDU is the last MSDU for the video frame). Each pose frame may be based on a new IMU measurement. If a pose frame is not obtained by the render device (such as based on interference on the wireless medium), the previous pose information obtained at the render device is less stale than if only one pose frame is provided per TWT window.

In some implementations, the IMU measurements occur independent from packaging the position information as a pose frame to provide to the render device. For example, the IMU may measure the position information at a frequency of 1 kHz (every 1 ms). The display device may use the most recent IMU measurement to generate a pose frame when needed, and the display device may ignore the other IMU measurements for the pose frames. In this example, the latency between the IMU measurement and generating the pose frame is up to 1 ms. In some implementations, the IMU measurements may be based on when the pose frames are to be generated. For example, the IMU measurements may be triggered based on a timing of providing pose frames to the render device.

With synchronous channel access, timing of communications is managed by the render device and the display device to ensure latency requirements are met for the XR traffic (such as to ensure a smooth display of video frames and to ensure a M2R2P latency is met for the XR experience). The render device may handle XR traffic differently than other traffic (such as best effort classified traffic to another device). In this manner, handling of data and communication of such data may be based on the application (such as whether XR related data or not XR related data).

For best effort classified traffic, stations typically provide the traffic at the MSDU level to a first in first out (FIFO) queue of the WCD for transmission. The management of the MSDUs in the queue is without concept of data delivery deadlines or latency requirements, and each MSDU is managed independently from other MSDUs. For an XR application, an application file may require more than one MSDU. In addition, time sensitivity of delivering application data (such as delivering a video frame within a defined amount of time) may require the MSDUs carrying the application data to be delivered within a defined amount of time. If any MSDUs are lost or late in being obtained by the display device, all other MSDUs obtained for the application file may not be processed and may be useless to the display device. For example, if a video slice is packaged into multiple MSDUs by the render device and all of the MSDUs except for one is delivered to the display device, the delivered MSDUs cannot be used to generate the video slice. In some implementations, the render device and the display device are configured to manage XR traffic to ensure all MSDUs of an application file are delivered in time to comply with latency requirements for the XR experience.

Figure 16:
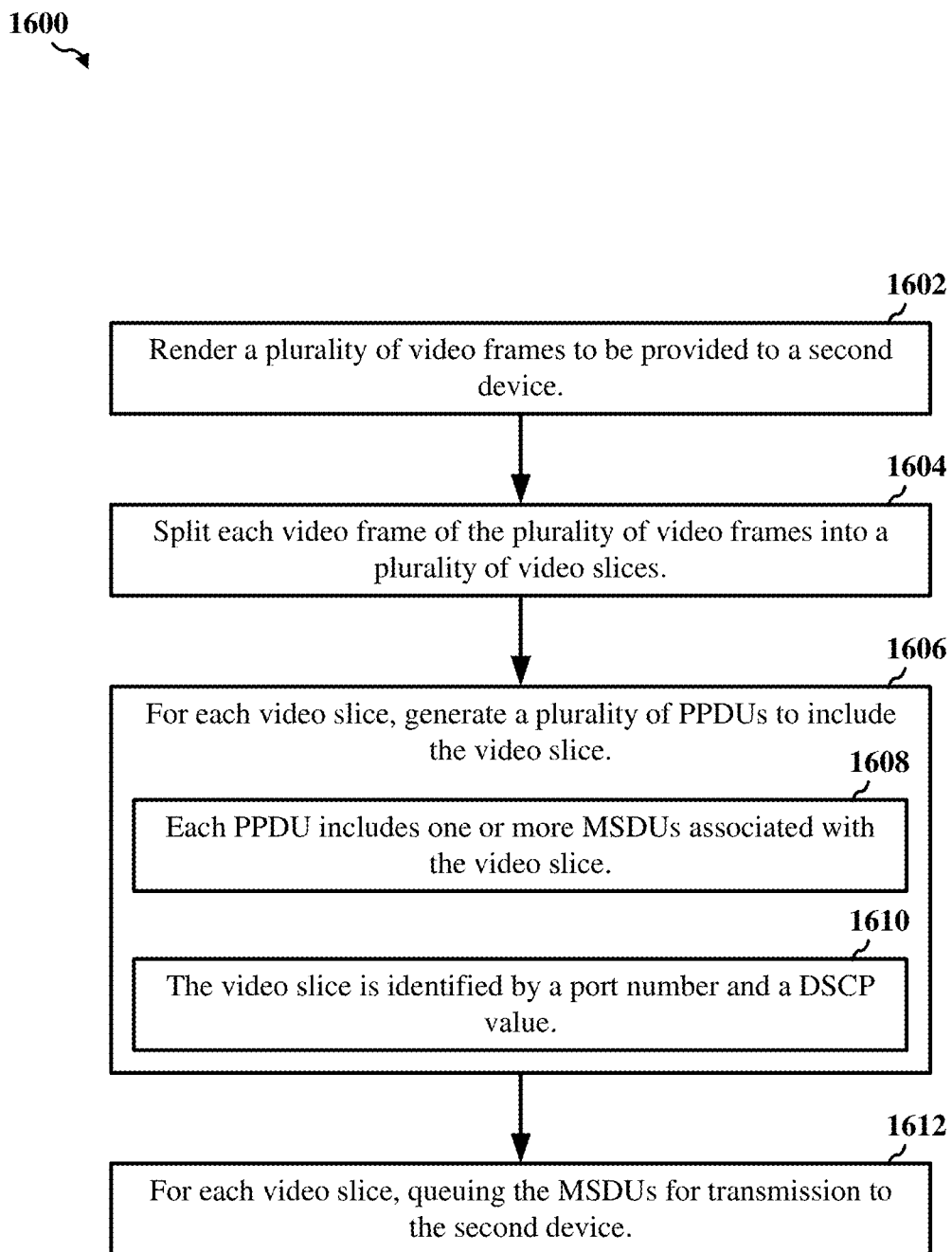
FIG. 16 shows a flowchart illustrating an example process for managing data for transmission according to some implementations.

FIG. 16 shows a flowchart illustrating an example process 1600 for managing data for transmission according to some implementations. The example depicts the data as video frames of a video for an XR experience, but the data may be any suitable data of an application file (which may be for or not for an XR experience). For example, the suitable data may be audio data, haptic data, or other data for an XR experience. In another example, the suitable data may be other data packaged into a plurality of MSDUs to be transmitted to a second device. The device performing the operations in process 1600 may be a render device, and the second device may be a display device.

At 1602, the device renders a plurality of video frames to be provided to a second device.

At 1604, the device splits each video frame of the plurality of video frames into a plurality of video slices. At 1606, the device generates, for each video slice, a plurality of PPDUs to include the video slice. Each PPDU includes one or more MSDUs associated with the video slice (1608). The video slice associated with the one or more MSDUs may be identified by a port number and a DSCP value included in each MSDU (1610). The port number may be the ID of the source port to be used in transmitting the MSDU, and the DSCP value may be a value to indicate specific video frames of the XR experience. In some implementations, the DSCP value is incremented for each successive video frame. At 1612, the device queues, for each video slice, the MSDUs for transmission to the second device. In some implementations, a queue is generated for each video slice.

Process 1600 depicted in FIG. 16 is from the render device perspective. Process 1700 depicted in FIG. 17 may be similar to process 1600 but from the display device perspective.

FIG. 17 shows a flowchart illustrating an example process 1700 for managing data for transmission according to some implementations. The device performing the operations in process 1700 may be a display device, and the second device may be a render device. At 1702, the device obtains, from the second device, one or more PPDUs associated with a video frame. Regarding the one or more PPDUs, the second device renders a plurality of video frames to be provided to the device (1704). The second device splits each video frame of the plurality of video frames into a plurality of video slices (1706). For each video slice, the second device generates a plurality of PPDUs to include the video slice (1708). Each PPDU includes one or more MSDUs associated with the video slice (1710). The video slice associated with the one or more MSDUs may be identified by a port number and a DSCP value included in each MSDU (1712). For each video slice, the second device queues the MSDUs for transmission to the device (1714). The queues may be MSDU queues generated in software for each video slice, and each MSDU queue may be identified by an IP address (such as the target IP address), port number, and DSCP value.

Figure 18:
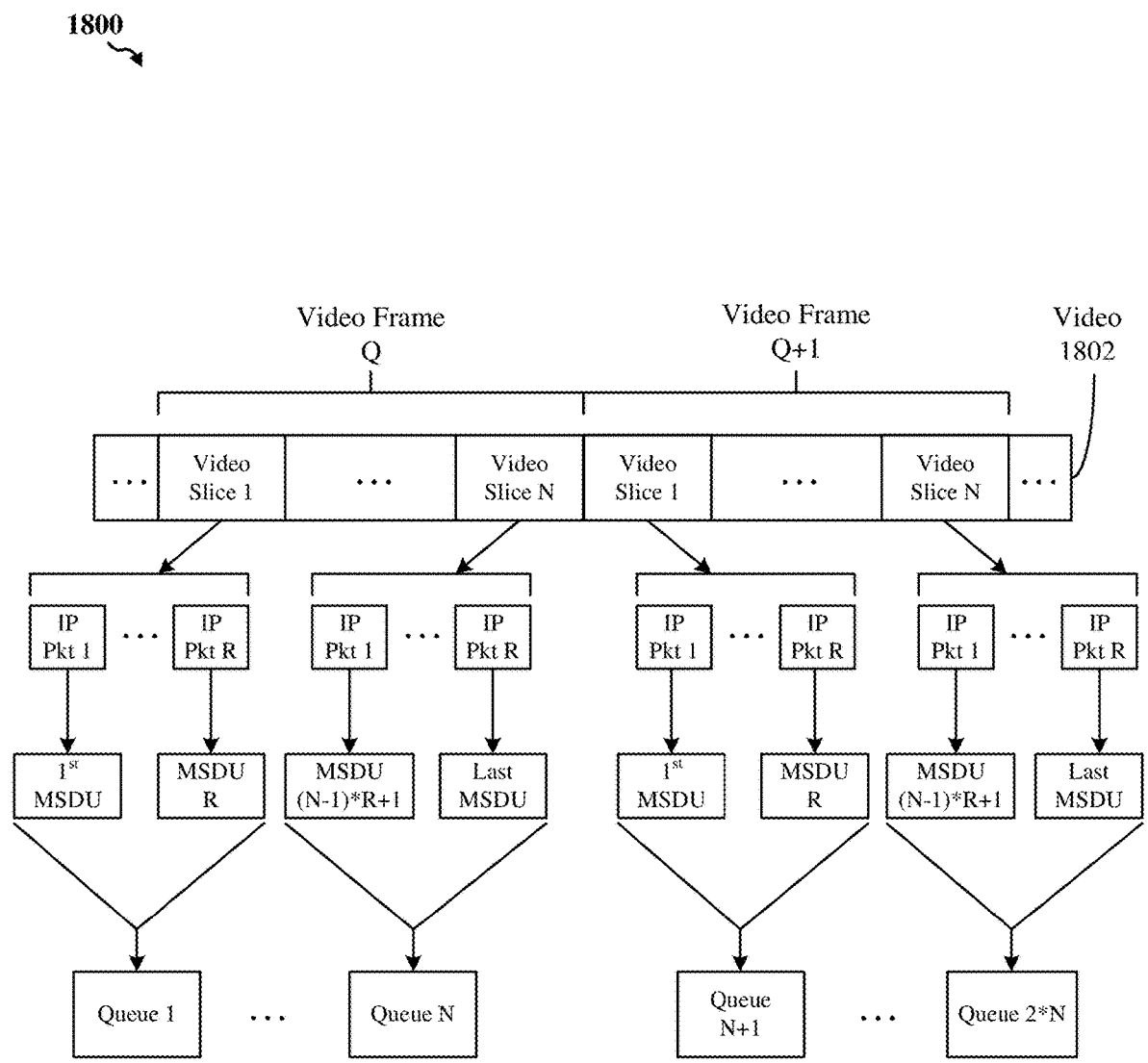
FIG. 18 shows a block diagram illustrating an example of generating queues for one or more video frames.

FIG. 18 shows a block diagram 1800 illustrating an example of generating queues for one or more video frames. The video 1802 includes video frames Q and Q+1 (for integer Q equal to or greater than 1) rendered by the render device. The render device may split each video frame into video slices. For example, video frame Q includes N video slices (for integer N greater than or equal to 1), and video frame Q+1 includes N video slices. The render device packages each video slice into a plurality of IP packets (such as R IP packets for each video slice for integer R greater than or equal to 1), and the render device packages each IP packet into an MSDU. As noted above, the render device may identify the MSDU for IP packet 1 of video slice 1 of video frame Q as the first MSDU for video frame Q, and the render device may identify the MSDU for IP packet R of video slice N of video frame Q as the last MSDU for video frame Q. The render device also may identify the MSDU for IP packet 1 of video slice 1 of video frame Q+1 as the first MSDU for video frame Q+1, and the render device may identify the MSDU for IP packet R of video slice N of video frame Q+1 as the last MSDU for video frame Q+1. The render device creates queue 1 for the MSDUs of video slice 1 of video frame Q, queue N for the MSDUs for video slice N of video frame Q, queue N+1 for the MSDUs for video slice 1 of video frame Q+1, queue 2*N for the MSDUs for video slice N of video frame Q+1, and so on. While each video slice is depicted as being packaged into the same number of IP packets, each video slice may be packaged into any suitable number of IP packets.

Each queue may be an MSDU queue generated in software by the render device (such as by the WCD) and stored in a memory of the render device. For example, the queues may be generated and stored in a memory 508 of a WCD 500 (FIG. 5), which may be implemented in the render device. An MSDU queue may be identified and tracked by the WCD of the render device based on an IP address, a port number, and a DSCP value assigned to the video frame by the render device. All MSDUs in a queue are associated with the same IP address, port, and DSCP value.

The DSCP value may be based on the video frames being for an XR experience. In this manner, the DSCP values may be application based. In some implementations, the DSCP value also may be based on a type of video frame. For example, a reference frame of the video (an i-frame) includes i-slices that may be associated with a different DSCP value than an intermediate frame of the video (a p-frame) including p-slices. The render device may use DSCP values previously reserved, which may be defined at the render device and the display device as being associated with a priority of the specific video slices.

In some implementations, the render device assigns a traffic identifier (TID) for each video slice. The TID may be included in the MPDU MAC header of the PPDUs for the plurality of MSDUs associated with the video slice. The TID is associated with an access category (AC) of the video slice, and the AC may be associated with a priority of the video slice. In this manner, the render device may determine to transmit video slice MSDUs over other data based on the TID indicating that the priority of the video slice is greater than the priority of the other data to be transmitted. In some implementations, the priority of the video slice is based on whether the video slice is an i-slice or a p-slice. For example, an i-slice may be associated with a higher priority than a p-slice for transmission by the render device (which may be indicated by a different TID).

Based on the identifiers of the MSDU queues to specific video slices and frames, the render device may schedule the MSDUs for transmission in a plurality of PPDUs to the display device. For example, the render device may attempt to transmit the MSDUs from the MSDU queue of a first video slice before transmitting the MSDUs from the MSDU queue of a next video slice. The display device may fail to obtain one or more MSDUs from the render device (such as a result of interference on the wireless medium). For example, the display device may not provide a BA for a sent PPDU, or the display device may provide a BA indicating which MPDUs (including one or more MSDUs) were successfully obtained.

The video slices are associated with a latency requirement for displaying video frames at the video device. If one or more MSDUs are not successfully delivered to the display device in an amount of time to allow the display device to display the video frame (such as not receiving a BA indicating one or more MPDUs including the MSDUs within a set amount of time), the render device may move on to providing MSDUs for a different video slice without completing delivery of the previous MSDUs. For example, referring back to FIG. 18 and assuming that video frames Q and Q+1 are p-frames, the render device generates queues 1 through N and attempts to deliver the MSDUs in those queues. As noted above, rendering of the frames is at a defined interval. Render device goes on to generate queues N+1 through 2*N at time after generating queues 1 through N. The render device generating a new queue associated with the same video slice may indicate that the render device is not to attempt to deliver any more MSDUs from the previous queue. For example, video slice 1 of video frame Q and video frame Q+1 may refer to the same area of a video frame (such as the same lines or columns between the video frames). If queue 1 is not empty (with additional MSDUs from queue 1 to be delivered) by the time queue N+1 is generated, the render device may stop attempting to deliver the remaining MSDUs in queue 1 and begin providing the MSDUs in queue N+1. As noted above, the video slice may be identified by a port number, which may be used to determine that queue N+1 is associated with queue 1. The render device may flush queue 1 (with the remaining MSDUs considered stale) so that the MSDUs are no longer scheduled for transmission to the display device. In this manner, a first MSDU queue (generated for a first p-slice) may be flushed after rendering a second p-slice associated with the first p-slice (such as the same video slice of a successive p-frame) and before providing, to the display device, a PPDU including one or more MSDUs associated with the first p-slice (such as a PPDU including one or more MSDUs that are failed to be delivered).

In some implementations, the render device may attempt to continue to deliver MSDUs associated with i-slices after a new corresponding i-slice or a p-slice is generated. For example, an i-slice may be used as a reference frame for the intermediate frames in a video generated by the display device from the obtained PPDUs. Therefore, older i-slices may still be of value to the display device since they may be used as reference for subsequent p-slices (such as to decode successive p-slices). The render device may not flush an MSDU queue associated with a previous i-slice upon rendering a new i-slice or p-slice associated with the previous i-slice. For example, the render device may continue to attempt to deliver MSDUs for the i-slice up until a threshold number of successive i-slices, p-slices, or a combination thereof are rendered (such as until a second successive i-slice is rendered or a number of p-slices up until the next i-slice is rendered). Referring back to FIG. 18 and based on frames Q and Q+1 being i-frames (with one or more p-frames being between the i-frames (not shown)), the render device may render a first i-slice of frame Q, generate a first MSDU queue associated with the first i-slice, render a second i-slice of frame Q+1 associated with the first i-slice (such as the same video slice of the video frames), generate a second MSDU queue associated with the second i-slice, and still provide a PPDU including one or more MSDUs with the first i-slice after generating the second MSDU queue.

As noted above, a PPDU may be attempted to be transmitted a threshold number of times by the render device (such as five times). The PPDU includes one or more MSDUs of an application file (such as a video slice). If the PPDU fails to be delivered after a threshold number of retries, the PPDU is not again attempted to be delivered to the display device. In this manner, the display device does not obtain one or more MSDUs of the video slice, and the display device may be unable to generate the video slice from the MSDUs that are obtained since some of the MSDUs are missing. In some implementations, if a PPDU is failed to be delivered after the threshold number of retries, the render device (such as the WCD) may flush the MSDU queue associated with the video slice.

If a MSDU queue is flushed, the render device may generate a replacement video slice after flushing the MSDU queue. The replacement video slice may be a new video slice based on a most recently obtained pose frame or a copy of the original video slice. After generating the replacement video slice, the render device may generate a replacement MSDU queue associated with the replacement video slice (similar to as depicted in FIG. 18 for other video slices). With the replacement MSDU queue generated, the render device may attempt to transmit the MSDUs from the replacement MSDU queue in one or more PPDUs to the display device. Generating a replacement video slice may be based on whether enough time exists to provide the PPDUs including the replacement video slice to the display device to display the video frame. For example, the render device may determine not to generate a replacement video slice based on the remainder of the TWT window being less than a threshold amount of time. In this manner, the display device may display a video slice from a previous video frame or not display the video slice for the video frame (which may include a black spot at the location of the video slice).

In addition or alternative to an MSDU queue being flushed based on a number of PPDU retries or arrival of a new video slice, the render device may flush an MSDU queue based on an explicit command from the application layer. For example, a user of the render device may indicate that a portion of the XR experience is to be reset or that the XR experience is to be terminated. The scheduled MSDUs are no longer needed to be transmitted. The render device may generate the explicit command to flush one or more MSDU queues at the application layer and provide the command to the WCD. The WCD may flush the one or more MSDU queues based on the command.

In some implementations, the render device indicates to the display device that an MSDU queue is flushed. The indication may be included in a MAC header of a packet or a separate control element from the render device to the display device. In this manner, the display device is made aware of one or more missing MSDUs. The indication may indicate which video slice is associated with the MSDU queue (such as providing the IP address, port number, and DSCP value used to identify the MSDU queue in a MAC header). Based on the indication, the display device may terminate storing and processing MSDUs associated with the indicated video slice. For example, the WCD of the display device may include a reorder (REO) queue to obtain and store the MSDUs until all or a sufficient number of MSDUs are obtained to reconstruct the application file (such as a video slice). The REO queue may obtain one or more MSDUs from the render device. If the display device obtains an indication that a transmit queue associated with the one or more obtained MSDUs (such as an MSDU queue that included the one or more MSDUs at the render device) is flushed, the obtained MSDUs may no longer be used in generating the video slice. In this manner, the display device may flush the REO queue after obtaining the indication.

In some implementations, the display device may flush the REO queue if all (or a sufficient number of) MSDUs associated with an application file (such as a video slice) are not obtained. For example, the REO queue may obtain a portion of MSDUs associated with a video slice, but the REO queue may not obtain a remainder of the MSDUs associated with the video slice before a REO timeout occurs. The display device may flush the REO queue after not obtaining the remainder of the MSDUs before the REO timeout occurs. In one example, an REO timeout amount of time may be a time from when obtaining the first MSDU of the application file to the latest when the last MSDU of the application file is to be obtained. In another example, the REO timeout amount of time may be a time indicating when the video slices of an entire video frame are to be obtained. In some implementations, the REO timeout amount of time may be based on the TWT window size. In some implementations, the REO timeout amount of time is based on the AC of the video slice (such as based on the TID for the video slice). An example REO timeout amount of time is 10 ms, but any suitable amount of time may be used. The amount of time may be counted from the beginning of the TWT window or any other suitable starting point for determining if an REO timeout occurs. If the display device counts up to the REO timeout amount of time before obtaining all MSDUs, the display device may flush the REO queue.

In some implementations, the display device may flush the REO queue periodically. For example, the display device may flush the REO queue between TWT windows. In some implementations, the display device may flush the REO queue based on an explicit command generated at the application layer. For example, the XR experience may be reset or terminated by a user of the display device or otherwise by the XR application layer. In this manner, the display device may generate a command to flush the REO queue, as the obtained MSDUs are no longer needed.

In contrast to requiring obtaining all MSDUs of an application file (such as a video slice) to generate the application file, use of FEC may allow a display device to generate the application file after obtaining only a portion of the MSDUs associated with the application file. For example, each MSDU may include a number of FEC bits at the end of the payload. The FEC bits from the obtained MSDUs may be sufficient to construct the missing MSDUs. Since a portion of the MSDU payloads are reserved as FEC bits, the amount of payload provided in each MSDU is reduced, and the number of MSDUs for a video slice may increase. However, the display device may not need to obtain all MSDUs for the video slice to generate the video slice. In some implementations, FEC may be used or not used based on a link quality between the render device and the display device (such as a reference signal receive power (RSRP) measurement, a reference signal receive quality (RSRQ) measurement, or a signal to noise ratio (SNR)

measurement measured by the display device). For example, FEC may be used by the display device and the render device if interference increases above a threshold (such as indicated by SNR dropping below a threshold) or channel conditions worsening below a threshold (such as indicated by RSRP or RSRQ dropping below a threshold). In some implementations, FEC may not be used if the frame rate, resolution, or other parameters of the video frames would not permit use of FEC while still meeting latency requirements for the video frames. For example, FEC may not be used if the frame rate is greater than a threshold frame rate, the video frame resolution is greater than a threshold resolution, and so on. In some implementations, FEC may or may not be used based on one or more parameters of the display device (such as channel size, MCS used for obtaining the PPDUs, and so on that may affect the throughput to the display device). Use of FEC may be indicated by the display device to the render device in the one or more pose frames or by the render device to the display device in a MAC header of one or more PPDUs.

In some implementations of using FEC for each video slice, the display device may indicate to the render device when enough MSDUs are obtained to reconstruct the video slice. For example, the display device provides a BA to the render device to indicate that a PPDU was obtained from the render device. If the display device determines that the PPDU included MSDUs sufficient to reconstruct the video slice, the display device may indicate in the BA to the render device that a sufficient number of MSDUs are obtained. For example, the aggregated control (A-Control) field of the MAC header of the BA may be configured to indicate that a sufficient number of MSDUs for the video slice are obtained. The render device may process the A-Control field to determine that no further PPDUs including MSDUs for the video slice are to be provided to the display device (with the display device to generate the video slice from the already obtained MSDUs). The render device may flush the associated MSDU queue after obtaining the indication.

Changes in the wireless medium and the XR experience may require changes at the render device or the display device in communicating data to the other device or performing one or more XR operations. For example, as the wireless medium becomes more congested, the display device moves away from the render device, or more interference exists on the wireless medium, the render device and the display device may adjust one or more parameters to reduce the amount of information to be communicated between the devices. Example parameters may be associated with the XR experience (such as video frame rate, frame resolution, color palette, and so on that affects the size of the video or the wireless channel, channel size, MCS, use of FEC, TWT window size, and so on to affect the bit rate between devices and the success in delivering data between the devices for the XR experience). The render device and the display device may be configured to provide feedback regarding data provided to the other device, and the device may be configured to adjust the XR experience based on the feedback. For example, the render device may generate feedback based on transmitting PPDUs to the display device, and the display device may generate feedback based on transmitting pose frames to the render device.

Figure 19:
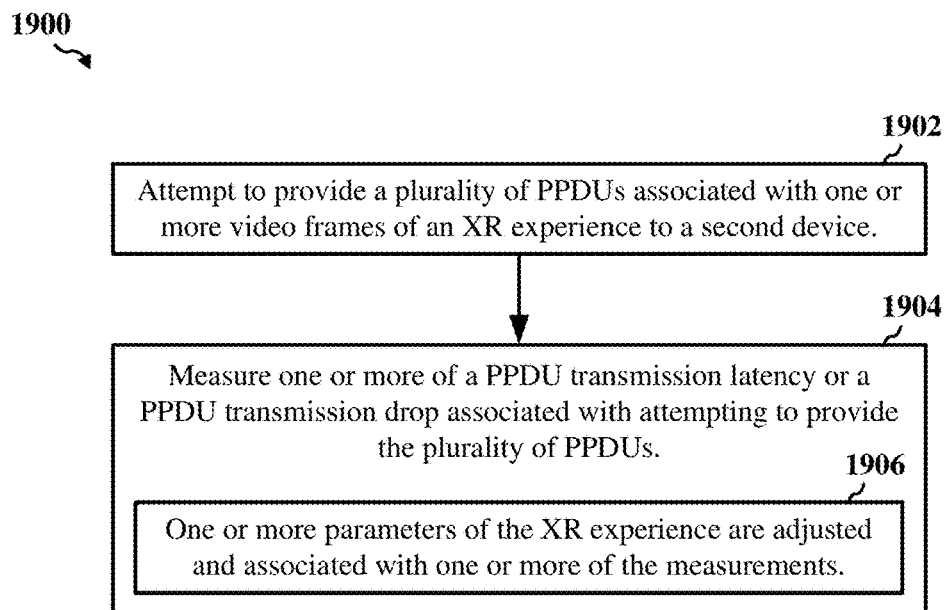
FIG. 19 shows a flowchart illustrating an example process for generating feedback according to some implementations.

FIG. 19 shows a flowchart illustrating an example process 1900 for generating feedback according to some implementations. The device performing the example process 1900 may be a render device, and the second device may be a display device. At 1902, the device attempts to provide a plurality of PPDUs associated with one or more video frames of an XR experience to a second device.

At 1904, the device measures one or more of a PPDU transmission latency or a PPDU transmission drop associated with attempting to provide the plurality of PPDUs. For example, the render device may observe when a BA is not obtained for one or more PPDUs transmitted to the display device. In some implementations, the render device may determine that a PPDU transmission drop occurs when a BA is not obtained for a transmitted PPDU. In some implementations, the render device may determine that a PPDU transmission drop occurs when the render device reaches a maximum number of retries for the PPDU and the render device is to no longer attempt to deliver the PPDU. The render device may count the total number of PPDU transmission drops over time. The time may be over a TWT window, a set number of TWT windows, a set amount of time, or another suitable amount of time. In some implementations, the render device may determine a PPDU transmission drop rate, which may be the number of PPDU transmission drops divided by the total number of PPDUs attempted to be transmitted to the display device.

The render device may determine a PPDU transmission latency based on the BAs obtained for delivered PPDUs to the display device. For example, the render device tracks a time when a PPDU is transmitted to the display device (such as based on the WCD clock of the render device). The render device also tracks a time when the BA associated with the PPDU is obtained from the display device (such as based on the WCD clock of the render device). The render device may determine the PPDU transmission latency for the PPDU to be the difference between the time the PPDU is transmitted and the time the BA is obtained. In some implementations, the render device may determine an average PPDU transmission latency, median PPDU transmission latency, or a distribution of PPDU transmission latency over a number of PPDU transmissions.

The one or more measurements (including the PPDU transmission latency or the PPDU transmission drop) are associated with one or more parameters of the XR experience, and the one or more parameters of the XR experience may be adjusted after the one or more measurements (1906). In some implementations, the PPDU transmission latency and the PPDU transmission drop may indicate if channel conditions are improving (such as based on less interference, the display device moving closer to the render device, and so on) or channel conditions are degrading (such as based on more interference, the display device moving away from the render device, and so on). The measurements also may indicate if throughput to the display device is increasing or decreasing. Based on the measurements, the render device (and the display device) may determine if one or more parameters of the XR experience are to be adjusted to ensure the video (or other data of the XR experience) still meets the latency and packet loss requirements. For example, the render device may reduce the channel size, increase the MCS, or use FEC if the PPDU transmission drop increases. As a result of reducing the channel size, increasing the MCS, or using FEC, the throughput to the display device decreases. If the decreased throughput is less than what is required for the current video, the render device may adjust one or more video parameters (such as decreasing the resolution, the frame rate, and so on). The measurements or the adjustments may be communicated to the display device, and the display device may implement the one or more adjustments.

Process 1900 depicted in FIG. 19 is from the render device perspective of generating feedback. Process 2000 depicted in FIG. 20 may be from the display device perspective of generating feedback.

Figure 20:
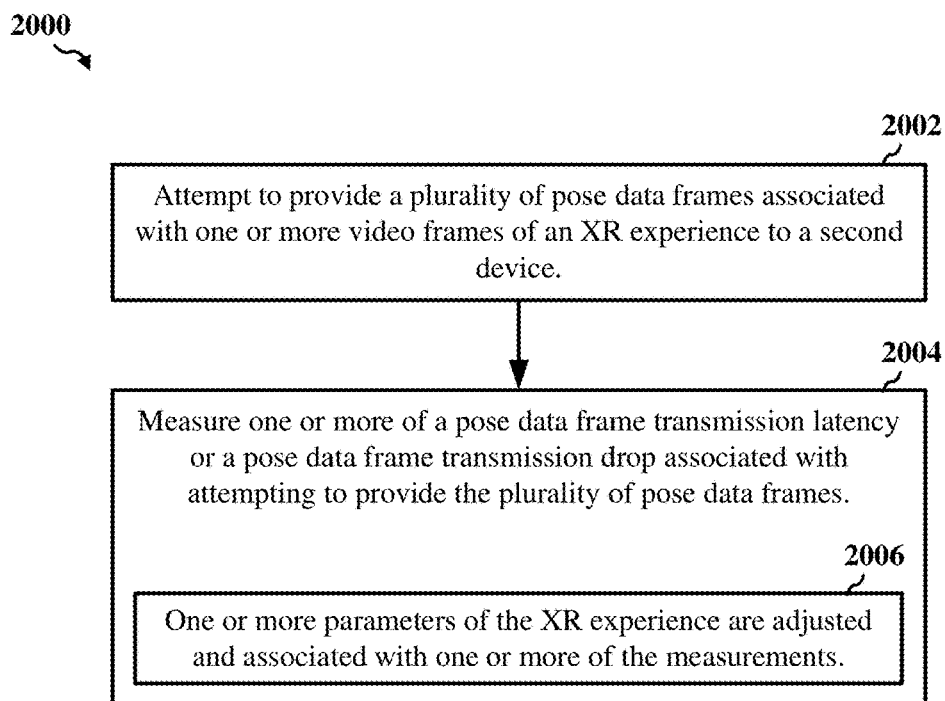
FIG. 20 shows a flowchart illustrating an example process for generating feedback according to some implementations.

FIG. 20 shows a flowchart illustrating an example process 2000 for generating feedback according to some implementations. The device performing the example process 2000 may be a display device, and the second device may be a render device. At 2002, the device attempts to provide a plurality of pose data frames associated with one or more video frames of an XR experience to a second device. In some implementations, the device also attempts to provide tracking frames to the second device.

At 2004, the device measures one or more of a pose data frame transmission latency or a pose data frame transmission drop associated with attempting to provide the plurality of pose data frames. For example, the display device may observe when a BA is not obtained for one or more pose data frames transmitted to the render device. In some implementations, the display device may determine that a pose data frame transmission drop occurs when a BA is not obtained for a transmitted pose data frame. In some implementations, the display device may determine that a pose data frame transmission drop occurs when the display device reaches a maximum number of retries for the pose data frame. The render device may count the total number of pose data frame transmission drops over time. The time may be over a TWT window, a set number of TWT windows, a set amount of time, or another suitable amount of time. In some implementations, the display device may determine a pose data frame transmission drop rate, which may be the number of pose data frame transmission drops divided by the total number of pose data frames attempted to be transmitted to the render device.

The display device may determine a pose data frame transmission latency based on the BAs obtained for delivered pose data frames to the render device. For example, the display device tracks a time when a pose data frame is transmitted to the render device (such as based on the WCD clock of the display device). The display device also tracks a time when the BA associated with the pose data frame is obtained from the render device (such as based on the WCD clock of the display device). The display device may determine the pose data frame transmission latency for the pose data frame to be the difference between the time the pose data frame is transmitted and the time the BA is obtained. In some implementations, the display device may determine an average pose data frame transmission latency, median pose data frame transmission latency, or a distribution of pose data frame transmission latency over a number of pose data frame transmissions.

Similar to as described above with reference to FIG. 19, the one or more measurements (including the pose data frame transmission latency or the pose data frame transmission drop) are associated with one or more parameters of the XR experience, and the one or more parameters of the XR experience may be adjusted after the one or more measurements (2006). In some implementations, the pose data frame transmission latency and the pose data frame transmission drop may indicate if channel conditions are improving (such as based on less interference, the display device moving closer to the render device, and so on) or channel conditions are degrading (such as based on more interference, the display device moving away from the render device, and so on). Based on the measurements, the display device (and the render device) may determine if one or more parameters of the XR experience are to be adjusted to ensure the video (or other data of the XR experience) still meets the latency and packet loss requirements (such as described above). The measurements or the adjustments may be communicated to the render device, and the render device may implement the one or more adjustments.

Referring back to the render device, the render device may obtain one or more pose data frames from the display device (with each of the one or more video frames associated with a pose data frame). The one or more measurements may include measurements based on the obtained pose data frames. In some implementations, the render device may measure a pose data frame delivery latency associated with obtaining the one or more pose data frames. For example, with the start time of TWT windows known and a pose data frame to be delivered at the beginning of a TWT window, the render frame may determine the difference between the start time of the TWT window and the time when the pose data frame is obtained (with the times based on the WCD clock of the render device). In some implementations, the time of the IMU measurement is included in the pose data frame (such as a time indicated by the application layer clock of the display device). Since the WCD clock of the render device and the application layer clock of the display device may be synchronized, the render device may determine a difference between the time of the IMU measurement and the time of obtaining the pose data frame. The render device may determine an average pose data frame delivery latency, median pose data frame delivery latency, or a distribution of the pose data frame delivery latency over a number of pose data frame deliveries (such as over a defined number of TWT windows or defined amount of time).

The one or more measurements by the render device may include a frequency of missing or delayed pose data frames. In some implementations, the render device determines whether one or more pose data frames are missing or delayed. For example, the display device may attempt to provide a pose data frame up to a timeout at the beginning of each TWT window. If the render device does not obtain the pose data frame before the timeout, the render device may determine that the pose data frame is missing or delayed. The render device may count the number of missing or delayed pose data frames over a determined number of TWT windows. If the number increases as successive TWT windows occur, the render device determines that the frequency of missing or delayed pose data frames increases. If the number decreases as successive TWT windows occur, the render device determines that the frequency of missing or delayed pose data frames decreases. In some implementations, the frequency may be the number of pose data frames missing or delayed divided by the determined number of TWT windows used in determining if any pose data frames are missing or delayed.

Referring back to the display device, a REO queue of the display device may obtain one or more MSDUs from the render device. As noted above, each MSDU may be associated with an application file (such as a video slice). The display device may flush the REO queue one or more times to remove one or more MSDUs from the REO queue. For example, the display device may flush the REO queue based on obtaining an indication that a transmit queue at the render device was flushed (such as the MSDU queue of the render device associated with the MSDUs in the REO queue of the display device). In another example, the display device may flush the REO queue periodically (such as between TWT windows). In another example, the display device may flush the REO queue if a timeout occurs (such as all MSDUs or a sufficient number of MSDUs not being received in a defined amount of time to allow construction of the video slice for display). In another example, the display device may flush the REO queue if MSDUs for a successive video slice are obtained before obtaining the remainder of MSDUs for the previous video slice. In another example, the display device may flush the REO queue based on a command from the application layer of the display device. The one or more measurements at the display device may include a REO flush time associated with flushing the REO queue. In some implementations, the display device counts the number of times the REO queue is flushed over a defined amount of time (such as a TWT interval or a number of TWT intervals). The REO flush time may be the average number of flushes per TWT interval, the total number of flushes counted by the display device, or another suitable indication of the number of times the REO queue is flushed by the display device.

The one or more measurements at the display device also may include a video frame delivery latency. For example, for one or more video frames, the display device (such as at the REO queue) obtains a first MSDU associated with a video frame. As noted above, the first MSDU may include metadata to indicate that the MSDU is the first MSDU for the video frame. The display device also obtains a last MSDU associated with the video frame, which may include metadata to indicate that the MSDU is the last MSDU for the video frame. In some implementations, the first MSDU and the last MSDU may be identified by a DSCP value included in the MSDU. The display device may measure a video frame delivery latency associated with obtaining the first MSDU and the last MSDU for the video frame. For example, the display device may determine a time when the first MSDU is obtained and a time when the last MSDU is obtained from the WCD clock of the display device. The display device may determine a difference in time between when the first MSDU is obtained and when the last MSDU is obtained as the video frame delivery latency for the video frame. In some implementations, the display device may determine an average delivery latency, a median delivery latency, or a distribution of delivery latencies for a number of video frame delivery latencies.

The pose data frame or video frame delivery latencies, the frequency of dropped or missing pose data frames, or the flush times increasing may indicate that channel conditions are worsening or that throughput between the devices is somehow being restricted. Conversely, pose data frame or video frame delivery latencies, the frequency of dropped or missing pose data frames, or the flush times decreasing may indicate that channel conditions are improving or that throughput between the devices is increasing.

The one or more measurements at the display device also may include one or more of a jitter buffer underflow or overflow or a missing packet associated with a video frame to be displayed. As noted above, the display device may perform dejittering in processing the video frames before display. Dejittering uses a jitter buffer of video frame information to allow smoothing of the display of video frames. If data in the buffer drops below a lower threshold, the display device may determine a jitter buffer underflow, and if the data in the buffer rises above an upper threshold, the display device may determine a jitter buffer overflow. Underflow (which results from a lack of data) and overflow (which results in too much data such that some data may be leaked from the buffer) may negatively impact dejittering by the display device. In some implementations, the display device may count the total number of overflows or underflows, and average buffer usage, or other metric over a defined amount of time associated with the jitter buffer.

A missing packet associated with a video frame to be displayed may include a missing video slice. The display device may display one or more video frames missing one or more video slices. In some implementations, the one or more measurements includes a count of the number of video frames displayed missing one or more video slices, the number of video slices missing, or another suitable metric of missing packets over a defined amount of time.

For the render device or the display device, the one or more measurements may include a link quality measurement of a link quality between the render device and the display device. For example, the display device or the render device may measure an RSRP, RSRQ, SNR, or other metric indicating a link quality between the devices. Changes in a link quality metric may indicate worsening channel conditions or improving channel conditions.

Based on one or more heuristics for the one or more measurements (such one or more thresholds for the measurements) or based on any suitable machine learning model for the one or more measurements, the render device or the display device may adjust one or more parameters of the XR experience to ensure latency requirements are met for the XR experience. The one or more parameters of the XR experience may include one or more wireless communication parameters between the render device and the display device. Adjusting one or more wireless communication parameters may include one or more of:

adjusting a duty cycle of TWT windows for a TWT power save mode. The duty cycle may be the length of the TWT window compared to the amount of time outside of the TWT window during a TWT window interval;

enabling or disabling the TWT power save mode;

changing a wireless operating channel over which the render device and the display device communicate;

adjusting the wireless operating channel size (such as increasing or decreasing the channel size between 20 MHz, 40 MHz, 80 MHz, 80+80 MHz, and 160 MHz);

adjusting a MCS;

enabling or disabling FEC for providing the PPDUs from the render device to the display device; or adjusting the FEC (such as the code rate of the FEC, which may be associated with the number of bits in the payload to be used for FEC).

In some implementations, the one or more parameters of the XR experience may include one or more video parameters. Adjusting one or more video parameters may include adjusting one or more of a video frame rate, a video resolution (such as a frame resolution), a target encode data rate (also referred to as an encoding bit rate), or a video codec. In some implementations, the render device may adjust a render rate of the video frames based on the video frame rate, the video resolution, the encoding bit rate, or the video codec. In some implementations, the display device may adjust a display rate of the video frames based on the video frame rate. Each of a video resolution, an encode data rate, and a video codec are a tradeoff between video quality and file size. For example, selection of a video codec is based on balancing compression of the video with video quality. The render device may adjust the video resolution, the target encode data rate, or the video codec (such as switching between available codecs for encoding the video) to balance video quality with file size and latency requirements.

In some implementations, adjusting the one or more parameters may include adjusting a functional split of computing tasks between the display device and the render device or a relay STA to the display device and another device communicably coupled to the relay STA. For example, based on the one or more measurements, the display device may determine that some rendering should be performed at the display device (such as when the link to the render device is determined to be bad (such as a link quality being less than a threshold or being indicated as bad). For example, one or more p-frames may be rendered at the display device. In this manner, fewer PPDUs are to be transmitted from the render device to the display device. Similarly, if an AP or another STA is to render the video frames, and the rendered frames are relayed through a relay STA to the display device, the relay STA may determine that rendering one or more video frames is to be performed at the relay STA instead of the other STA or AP based on the one or more measurements.

The display device or the render device may indicate the one or more measurements or the adjustments made to the one or more parameters of the XR experience to the other device. In some implementations, a device may provide an indication of the one or more measurements to the other device in an A-Control field of a header of one or more packets provided to the other device. The one or more packets may be included in an RTS frame or a CTS frame (if RTS/CTS is enabled, such as for asynchronous channel access), a data frame (such as the one or more PPDUs from the render device to the display device or the one or more pose data frames from the display device to the render device), or a BA frame (such as a BA to the render device and associated with obtaining a PPDU or a BA to the display device and associated with obtaining a pose data frame). An example A-Control field may be a variant of the HT control field (HE A-Control field) as defined in the IEEE 802.11ax standard. In an example, the A-Control field may be included in a frame control field of a MAC header of an RTS frame or a CTS frame. In another example, the A-Control field may be included in the non-legacy fields 212 of the example PDU in FIG. 2A. In another example, the A-Control field may be included in the frame control field of the MAC header 412 in the MPDU subframe 406 in FIG. 4. In another example, the A-Control field may be included in the frame control field of the MAC header of the BA frame.

Figure 21:
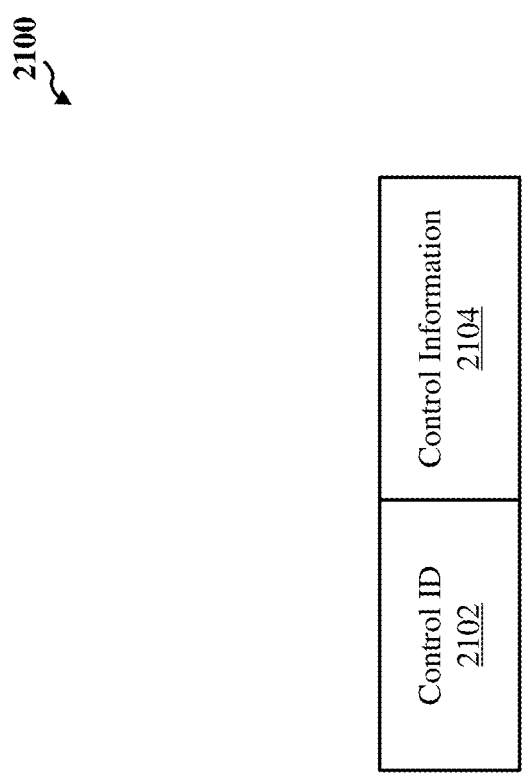
FIG. 21 shows a block diagram of an example control field.

FIG. 21 shows a block diagram of an example control field 2100. The control field 2100 may be a simplified version of the A-Control field included in one or more frames. The actual A-Control field may include additional subfields not shown (such as an end of header (EOH) and so on). The control field includes a control identifier (ID) subfield 2102 and a control information subfield 2104. The control ID in the subfield 2102 indicates what type of control information is included in subfield 2104. For example, based on HE control fields, the subfield 2102 may include different numbers as control IDs for different control information. A control ID of 0 may indicate that subfield 2104 includes an ACK, a control ID of 2 may indicate that subfield 2104 includes a BA, and so on. The IEEE 802.11ax standard reserves some control IDs from use.

In some implementations, the A-Control field (such as subfield 2102) includes a reserved control ID to indicate the one or more measurements from the display device or the render device are included in the A-Control field (such as subfield 2104 being used to include the one or more measurements). The reserved control ID may be defined at both the render device and the display device to allow encoding and decoding the A-Control field. In some implementations, different control IDs may be used for different types of measurements.

In some implementations, the A-Control field (such as subfield 2102) includes a reserved control ID to indicate the one or more adjusted parameters are included in the A-Control field (such as subfield 2104 being used to include an indication of the one or more adjusted parameters). The reserved control ID may be defined at both the render device and the display device to allow encoding and decoding the A-Control field. In some implementations, different control IDs may be used for different types of adjustments.

In indicating the one or more measurements, the A-Control field may include an indication of the link quality (which may be measured by the render device or the display device, as noted above). In some implementations, the link quality may be indicated as good or bad in a binary manner. For example, if a device measures an SNR, the device may compare the SNR to a threshold. If the SNR is less than the threshold, the link quality may be considered bad. If the SNR is greater than the threshold, the link quality may be considered good. The A-Control field (such as the subfield 2104) may include a bit reserved to indicate the link quality (such as 0 for bad and 1 for good). The remaining bits of the subfield may be used to indicate the one or more measurements or the adjustments to the one or more parameters based on the one or more measurements.

In this manner, the display device and the render device may provide feedback to each other and adjust the XR experience as necessary. Providing feedback may be performed for both asynchronous channel access and synchronous channel access. While the feedback and adjustments are described with reference to an XR experience. The operations for measuring and providing feedback described above may be applied to other types of data and other types of applications.

As depicted in FIG. 1B, a device 154 may support concurrent links with a first device 152 (such as a display device) and a second device 158 (such as an AP of the BSS or another STA in a mesh network). In some implementations, link 156 may be in the 5 GHz or 6 GHz frequency spectrum, and link 160 may be in the 5 GHz or 6 GHz frequency spectrum. The device 154 is configured to support concurrent links while still supporting the XR experience (such as prioritizing XR traffic and otherwise managing XR operations to meet latency and other requirements for the XR experience).

The concurrent links may be managed using TWT sessions (such as described above, with the AP or other STA communicating outside of the TWT window for the display device and the render device). For legacy devices that do not support TWT, concurrent links may be supported using multi-link operation (MLO) techniques (such as defined in the IEEE 802.11 standards).

Figure 22:
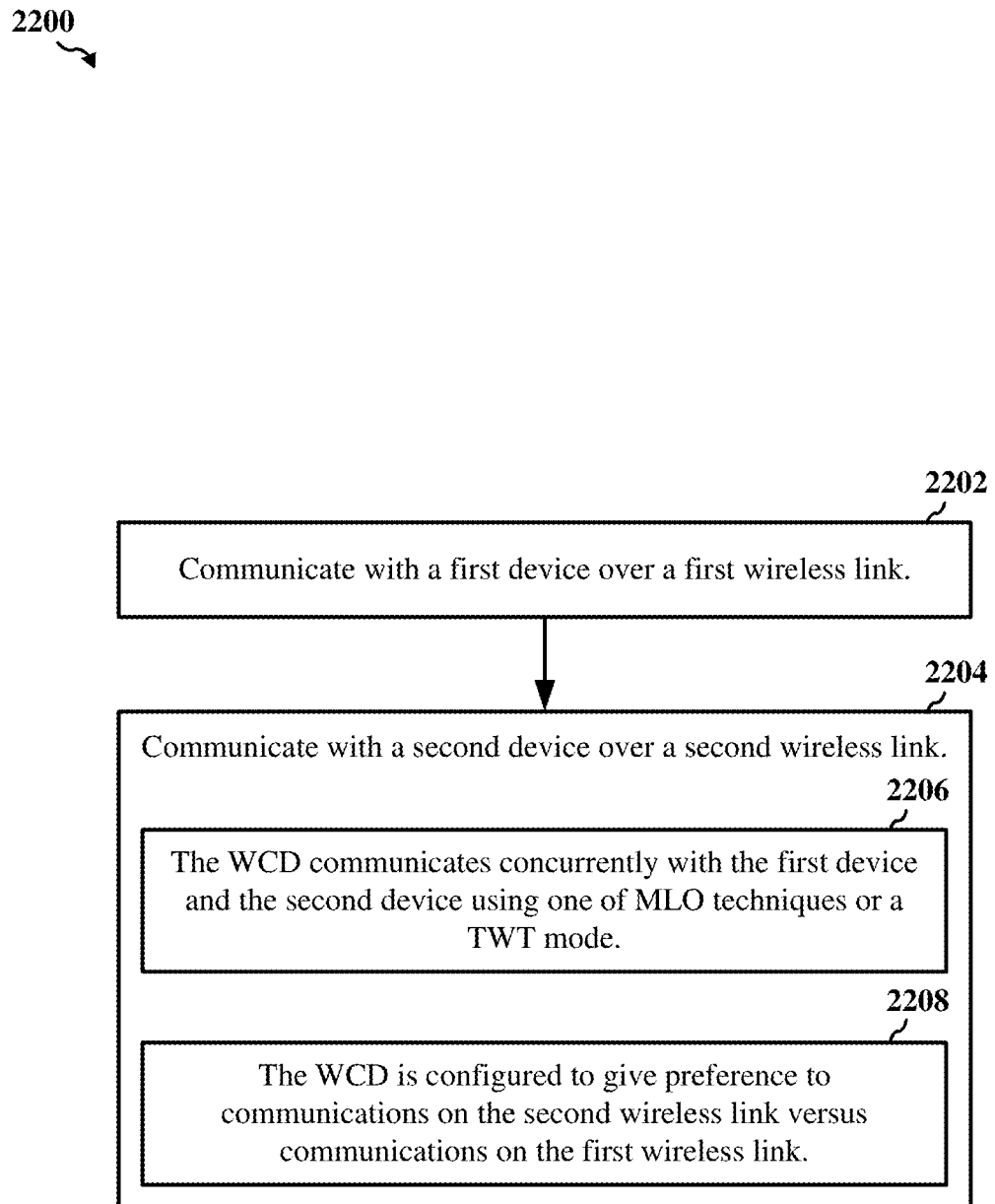
FIG. 22 shows a flowchart illustrating an example process for supporting concurrent wireless links with multiple devices.

FIG. 22 shows a flowchart illustrating an example process 2200 for supporting concurrent wireless links with multiple devices. The example process 2200 may be performed by a WCD (such as WCD included in a render device or another suitable device supporting concurrent wireless links with a first device and a second device). In some implementations, the second device is a display device. In some implementations, the first device may be an AP (in a BSS) or another STA (in a mesh network). The example process 2200 is described below as being performed by a render device or a WCD of a render device for clarity purposes, but the example process 2200 may be performed by any suitable device.

At 2202, the render device (such as the WCD of the render device) communicates with a first device over a first wireless link. For example, the render device communicates with an AP or another STA.

At 2204, the render device communicates with a second device over a second wireless link. For example, the render device may communicate with a display device over a first wireless link configured between the render device and the display device for an XR experience. The WCD communicates concurrently with the first device and the second device using one of MLO techniques or a TWT mode (2206). TWT mode (also referred to as TWT) techniques may include operations described above with reference to synchronous channel access, application based data management, and generating feedback. MLO techniques may be similar to some TWT mode techniques, but may be supported by legacy devices that do not support TWT.

The WCD is configured to give preference to communications on the second wireless link versus communications on the first wireless link (2208). For example, the second wireless link may be between the render device and a display device for an XR experience. XR data to be transmitted between the render device and the display device (such as PPDUs, pose data frames, and tracking frames) are associated with a latency requirement or packet loss requirement associated with the XR experience. In this manner, communications between the render device and the display device may be of more importance than communications between the render device and the other device (such as an AP or render device attempting to transmit best effort classified traffic to the other device). Example operations for the WCD to give preference to communications on the second wireless link versus communication on the first wireless link are described in more detail below.

Concurrently communicating with the first device (such as an AP) and the second device (such as a display device) may include:
- the WCD is to transmit to the second device during reception of one or more packets from the first device (such as to transmit to the display device when receiving from the AP);
- the WCD is to obtain one or more packets from the second device during reception of one or more packets from the first device (such as to receive from the display device when receiving from the AP);
- the WCD is to transmit to the second device during transmission to the first device (such as to transmit to the display device when transmitting to the AP); or
- the WCD is to obtain one or more packets from the second device during transmission to the first device (such as to receive from the display device when transmitting to the AP).

Typical MLO techniques are defined to prevent transmission on a link when reception is on-going on another link. For example, allowing transmission on a wireless link may be based on a clear channel assessment (CCA) of the wireless medium (which includes both wireless links). If the CCA indicates that the wireless medium is occupied (such as when the WCD is receiving from the first device), the WCD prevents transmissions. In this manner, if a WCD is configured for typical MLO, the WCD prevents transmission to the second device over the second wireless link when receiving from the first device over the first wireless link, and the WCD prevents transmission to the first device over the first wireless link when receiving from the second device over the second wireless link. Typical MLO techniques may prevent communications between the render device and the display device that would negatively impact the XR experience (such as not meeting certain latency requirements). If MLO techniques are to be used by a render device for concurrent link support, the WCD of the render device may be configured to enhance the MLO techniques (and other MAC operations) to provide preferential treatment to communications with the display device. For example, the WCD may allow transmission to the display device while receiving from another device (such as an AP or STA). In some implementations, the WCD may be configured to ignore a CCA when the WCD is to transmit to the display device. Example adjustments to the MLO techniques for the different example concurrent communications are described below.

One example concurrent communication includes the WCD receiving one or more packets from the first device and the WCD transmitting to the second device. For example, the render device may be in the process of obtaining one or more packets from an AP or STA. While obtaining the one or more packets, the render device may determine that the render device is to transmit to the display device (such as transmitting one or more PPDUs associated with one or more video frames). The WCD may transmit to the second device before completion of reception of the one or more packets from the first device. The examples described herein refer to the WCD or device managing the concurrent links as a render device, the second device as a display device, and a first device as an AP exclusively for simplicity and clarity in describing aspects of the present disclosure. To note, the examples are not limited to a render device, display device, AP, or any other specific device.

A render device typically would provide a BA to the AP after obtaining the one or more packets over the first wireless link. If transmission over the second wireless link to the display device is still ongoing when the render device is to provide the BA to the AP, a CCA would indicate that the wireless medium is busy, and the render device would prevent providing the BA to the AP. The render device obtains a BA from the display device after transmitting to the display device (such as obtaining a BA from a display device after delivering a PPDU to the display device). Based on typical MLO, if the end of reception from the AP coincides with the end of transmission to the display device, the CCA at the render device would not cause the render device to prevent providing the BA to the AP. However, the BA may be provided to the AP near the same time a BA from the display device is to be obtained. If the BA to the AP and the BA from the display device overlap on the wireless medium, the render device may not successfully obtain the BA from the display device. Not obtaining the BA causes the render device to retry transmitting to the display device (which increases the latency in delivering data to the display device).

In some implementations of enhancing MLO, the render device (such as the WCD) prevents providing a BA to the AP to acknowledge reception of the one or more packets. In this manner, the BA obtained from the display device is not interfered with by a BA to the AP. For example, the render device may determine if the WCD is in a transmit mode for the second wireless link. If the WCD is in a transmit mode for the second wireless link, the render device may prevent providing a BA over the first wireless link. With the render device to prevent transmitting a BA to the AP for the one or more packets, communication of the one or more packets over the first wireless link may be considered to have failed. With the AP not obtaining a BA from the render device, the AP later may retry to transmit the one or more packets to the render device (increasing the latency of delivering the one or more packets from the AP). Increasing the latency on the first wireless link over increasing the latency on the second wireless link may be acceptable based on the latency requirements between the render device and the display device (such as for an XR experience).

Another example concurrent communication includes the render device receiving one or more packets from the AP and the render device receiving one or more packets from the display device. For example, the render device may be receiving from the AP over the first wireless link when pose data frames, tracking frames, or other packets are provided by the display device over the second wireless link. The render device obtains one or more packets from the display device during reception of one or more packets from the AP. The render device provides a BA to the display device after obtaining the one or more packets from the display device. In some implementations, to prevent interference with receiving information from the display device, the render device may prevent providing a BA to the AP to acknowledge reception of the one or more packets from the AP. For example, transmitting on a first one or more antennas over the first wireless link may cause a local interference on a second one or more antennas receiving over the second wireless link. Preventing transmission of the BA to the AP prevents generating the local interference in receiving from the display device.

Another example concurrent communication includes the render device transmitting to the AP and the render device transmitting to the display device. For example, the render device may be transmitting to the AP over the first wireless link when the render device determines to transmit one or more PPDUs to the display device over the second wireless link. If data arrives at the WCD for transmission (such as one or more MSDUs to be included in one or more PPDUs transmitted to the display device) at the same time as an ongoing transmission to the AP, typical MLO techniques would require the render device to determine a CCA (which would indicate that the wireless medium is busy). In this manner, the render device would delay transmitting to the display device (increasing the latency over the second wireless link). One or more enhancements to the MLO techniques may be applied to attempt to avoid or reduce such delay in transmission to the display device.

In one example enhancement to the MLO techniques, the render device synchronizes transmissions to the display device with transmissions to the AP. For example, the start of transmissions to the AP and to the display device may be synchronized. Synchronizing the start of transmissions may be based on a transmission schedule or known transmission period from the render device to the display device. For example, rendering video frames may be at regular intervals, with the MSDUs available for transmission at the regular intervals (which may vary within a tolerance amount of time associated with any latencies, such as UL latencies or rendering latencies). Before the render device begins transmission to the AP, the render device may determine if the current time is within a threshold amount of time that MSDUs are to be transmitted to the display device. If within the threshold amount of time, the render device may delay transmission to the AP to synchronize the transmissions to the AP and to the display device. In some implementations, if a BO is used for obtaining control of the wireless medium or otherwise to transmit to the display device, the render device may reduce the BO associated with the second wireless link to synchronize transmissions over the first wireless link and over the second wireless link.

Transmissions to the display device may be shorter than transmissions to the AP. If the transmission to the display device ends first, a BA may be transmitted by the display device while the render device still is transmitting to the AP (which may affect the render device receiving the BA). In some implementations of synchronizing transmissions, the render device may pad the transmission to the display device to cause an end of transmission to the AP to be synchronized with an end of transmission to the display device. Example padding may include zero padding or adding any suitable tail to the transmission to the display device to synchronize the ends of transmission. The render device may determine the amount of padding to be applied based on the amount of data scheduled to be transmitted to the AP, the amount of data scheduled to be transmitted to the display device, and the measured throughputs over the first wireless link and over the second wireless link. In some implementations, a reduced BO associated with the second wireless link may compensate for the padding so that the latency over the second wireless link is not impacted.

In another example enhancement to the MLO techniques, the render device may prevent transmission to the AP outside of one or more time division multiplexing (TDM) windows. A TWT session may be conceptualized as a form of time division multiplexing of the wireless medium. For example, communications between a render device and a display device may be during the TWT windows, and communications between the render device and another device (such as an AP or a STA) may be outside of the TWT windows. As noted above, some legacy devices do not support TWT. A wireless system including one or more legacy devices may be configured to share the wireless medium using TDM windows. For example, an AP of a BSS including the render device and the display device may configure one or more TDM windows to communicate with the render device. Configuring the TDM windows may include configuring a window length, periodicity, and other parameters for the TDM window. In this manner, transmissions from the render device to the AP are during the one or more TDM windows, and transmissions from the render device to the display device (such as PPDUs transmitted to the display device) are outside of the one or more TDM windows. With TDM windows defined, a maximum delay to transmit to the display device (outside of the TDM windows) is based on a remaining length of a current TDM window.

In another example enhancement to the MLO techniques, the render device may reduce a maximum PPDU duration or a burst duration. The PPDU duration may be based on the PPDU size and throughput. If the maximum PPDU duration is reduced, the maximum amount of time to transmit a PPDU may be reduced. The burst duration may be the amount of time the render device is to transmit PPDUs to the display device. Shortening the burst duration shortens the amount of time that the wireless medium is to be reserved exclusively for transmissions to the display device. Shortening the amount of time that is to be reserved for transmitting a PPDU or a transmission duration to the display device allows the render device to more quickly schedule a new PPDU transmission or a new TXOP associated with the burst duration. In this manner, the potential delay for transmission to the display device may be reduced by reducing the maximum PPDU duration or the burst duration.

In another example enhancement to the MLO techniques, the render device may interrupt transmission to the AP so that the render device no longer is transmitting to the AP. As noted above, one or more MSDUs are ready to be transmitted by the render device to the display device while the render device is transmitting to the AP. The packets to be transmitted to the AP are included in a transmit buffer of the WCD of the render device. To interrupt transmission to the AP, the render device may flush the packets from the transmit buffer associated with the transmission to the AP. With the transmit buffer empty, the transmission to the AP ends. In this manner, when the render device performs CCA for transmitting over the second wireless link, the CCA may indicate that the wireless medium is free for the render device to transmit to the display device over the second wireless link.

In another example enhancement to the MLO techniques, the render device may use CTS to self (CTS-to-Self) frames to extend reservation of a wireless medium for transmitting to the display device. For example, when the render device transmits to the AP, the wireless medium is reserved for the render device (such as described above regarding the CTS/RTS mechanism between the render device and the display device). When the reservation ends, other devices may contend for the wireless medium or be scheduled to transmit over the wireless medium, and the render device may wait for the other devices to finish occupying the wireless medium. In some implementations, when the render device has MSDUs ready for transmission to the display device, the render device determines an amount of time to transmit the MSDUs (such as based on the amount of data in one or more MSDU queues associated with the second wireless link). The render device also determines the remaining amount of time to transmit to the AP (such as based on the amount of data remaining in the transmit buffer associated with the first wireless link). The render device may determine if any time from the reservation will be remaining based on the remaining amount of time to transmit to the AP, and the render device may determine an additional amount of time to the reservation to allow transmitting the MSDUs to the display device during the same reservation. In this manner, transmissions to the AP and transmissions to the display device may occur during the same reservation (which reduces the delay versus requiring a new reservation for transmitting to the display device). To extend the reservation of the wireless medium, the render device may broadcast a CTS-to-Self frame. The CTS-to-Self frame may indicate to pad the time period that the wireless medium is reserved (such as a value to be added to the current NAV of each device obtaining the CTS-to-Self frame). As noted above, the padded time period is of sufficient length to include the transmission to the AP and the transmission to the display device.

Another example concurrent communication includes the render device transmitting to the AP and the render device obtaining one or more packets from the display device. For example, the render device may be transmitting to the AP over the first wireless link when the display device transmits a pose data frame or tracking frame over the second wireless link. If the render device is transmitting over the second wireless link when packets are being transmitted by the display device to the render device, the render device may be unable to obtain the packets from the display device. With the render device not obtaining the packets from the display device, the render device does not provide a BA to the display device, and the display device retransmits the packets to the render device. Based on typical MLO techniques, the display device may continue attempting to transmit the packets until the packets are successfully delivered or a maximum number of retries occurs. As the display device continues retries, the transmission parameters may be adjusted to attempt to increase the likelihood that the packets are delivered. For example, the display device increases the MCS, uses FEC, and lowers the transmission rate. The transmission rate may continue to be lowered, and the lowered transmission rate would cause issues in meeting latency requirements for the XR experience.

The MLO techniques may be enhanced to avoid or reduce the transmission delay or prevent adjusting the transmission parameters at the display device that may negatively impact a communication latency between the display device and the render device. In one example enhancement to the MLO techniques, one or more TDM windows may be used to prevent packets being transmitted by the display device during the TDM windows. The TDM windows reserve the wireless medium for communications between the render device and the AP (such as described above). For example, transmission to the AP is during the one or more TDM windows, and reception from the display device is outside of the one or more TDM windows. In this manner, the render device is prevented from obtaining the one or more packets from the display device during the one or more TDM windows.

In another example enhancement to the MLO techniques, the render device may reduce the maximum PPDU duration or the burst duration. As noted above, reducing the maximum PPDU duration or the burst duration reduces the amount of time the render device transmits to the AP. In this manner, the amount of time that the display device is to retry transmitting to the render device is reduced (which reduces the delay associated with the display device transmitting to the render device).

In another example enhancement to the MLO techniques, the render device may indicate to the display device that the wireless medium is to be busy for an amount of time associated with transmitting to the AP. For example, the render device may provide a frame to the display device indicating a NAV value to reserve the wireless medium for the duration of transmitting to the AP. In some implementations, the NAV value may be included in a PPDU transmitted from the render device to the display device. In this manner, the display device sets its NAV to the indicated NAV value to prevent transmitting to the render device during the indicated duration.

While use of TDM windows and other MLO techniques are described with reference to legacy devices that do not support TWT, the described techniques may be implemented in any device (including devices supporting TWT). In addition or to the alternative, the techniques may be applied outside of MLO, and the techniques are not limited to a specific concurrent link support implementation.

In addition or alternative to using MLO techniques for supporting concurrent links, a render device may use TWT to support concurrent links. In some implementations, the render device (or the display device) may configure a first TWT session with the display device for communications with the display device over the second wireless link, and the render device may configure a second TWT session with the AP for communications with the AP over the first wireless link. The first TWT session includes a first plurality of TWT windows, and the first plurality of TWT windows is associated with XR activity at the render device (such as obtaining one or more pose data frames or tracking frames from the display device, rendering one or more video frames, and providing the one or more video frames via one or more PPDUs to the display device). The second TWT session includes a second plurality of TWT windows interspersed between the first plurality of TWT windows and not overlapping with the first plurality of TWT windows. For example, the TWT windows may alternate (such as a TWT window from the first plurality, a TWT window from the second plurality, a TWT window from first plurality, and so on). In this manner, the render device communicates with the display device during the first plurality of TWT windows, and the render device communicates with the AP during the second plurality of TWT windows.

The first TWT session is configured by the render device or the display device to meet any latency or packet loss requirements associated with an XR experience. After the first TWT session is established, the render device may initiate configuration of the second TWT session with the AP, with the second TWT session to include TWT windows outside of the TWT windows of the first TWT session. With the second TWT session configured based on the first TWT session, the first TWT session may be considered the primary TWT session, and the second TWT session may be considered a secondary TWT session. As noted above, the AP may be an IEEE 802.11ax enabled AP to support TWT (including the second TWT session with the render device).

As noted above regarding feedback and adjustments, the first TWT session may be adjusted (such as adjusting TWT window lengths, interval, and so on). The render device or the display device may adjust the first TWT session without reference to the second TWT session. In this manner, the first TWT session may be adjusted that would cause conflict with the second TWT session (such as overlapping TWT windows from the two TWT sessions). After the first TWT session is adjusted, the render device may initiate an adjustment of the second TWT session with the AP to avoid overlapping TWT windows. In this manner, the second TWT session is adjusted based on adjustments to the first TWT session.

In configuring the TWT sessions or adjusting the TWT sessions, the render device may act as a STA to the AP and may act as an SAP to the display device. In this manner, the render device may be conceptualized as having a STA-associated MAC and an SAP-associated MAC supported by the WCD of the render device. The SAP-associated MAC is used in configuring and adjusting the first TWT session with the display device, and the STA-associated MAC is used in configuring and adjusting the second TWT session with the AP. With the first TWT session being the primary TWT session, after configuring or adjusting the first TWT session, information or changes regarding the first TWT session are communicated from the SAP-associated MAC to the STA-associated MAC. In response to obtaining the information or changes to the first TWT session at the STA-associated MAC, the render device may negotiate with the AP to configure or adjust the second TWT session. In some implementations, the AP may have its own TWT requirements (such as based on supporting other devices in the BSS). The render device may configure the second TWT session with the AP to ensure the AP's requirements are met. The render device also may configure the first TWT session before configuring the second TWT session to support the AP's requirements while also meeting any latency and packet loss requirements associated with the XR experience.

In some implementations, the TWT windows of the second TWT session are scheduled to take into account a S2 W duration of the WCD for the STA-associated MAC. For example, the TWT windows of the second TWT session are scheduled so that the S2 W duration does not overlap with XR activity (such as receiving from and transmitting to the display device as described above).

Figure 23:
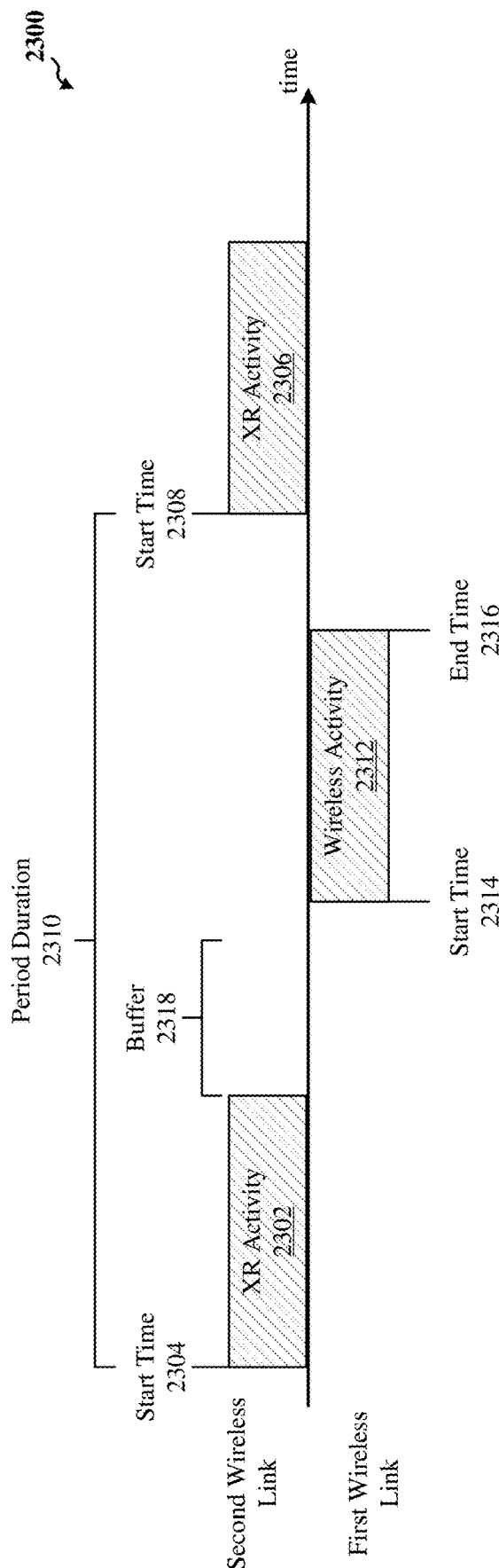
FIG. 23 shows a sequence diagram illustrating example timings of XR activity and wireless activity with an AP.

FIG. 23 shows a sequence diagram 2300 illustrating example timings of XR activity and wireless activity with an AP (referred to as wireless activity). A first XR activity 2302 (such as from receiving a pose data frame to providing a current video frame over the second wireless link) has a start time 2304, and a second XR activity 2306 (such as from receiving a next pose data frame to providing a next video frame over the second wireless link) has a start time 2308. In some implementations, the XR activity 2302 corresponds to a first TWT window of a first TWT session, and the XR activity 2306 corresponds to a second TWT window of the first TWT session. The XR activity is periodic (such as based on the display rate or render rate of the video), and a period duration 2310 of the periodic activity is a difference between start times 2308 and 2304. Wireless activity 2312 (associated with communications between the render device and the AP over the first wireless link) is to be scheduled outside of the XR activities 2302 and 2306 (such as between TWT windows corresponding to the XR activities 2302 and 2306). The wireless activity 2312 has a start time 2314 and an end time 2316 to be scheduled. The wireless activity 2312 may correspond to a first TWT window of a second TWT session. The start time 2314 may be more than a buffer 2318 after the XR activity 2302. For example, as noted above, one or more PPDUs may be transmitted to the display device after a TWT window or when PPDUs are delivered to the display device may vary depending on channel conditions or other latencies. In this manner, the duration of the XR activity 2302 may vary. The buffer 2318 may be for a defined amount of time to account for variations in the duration of the XR activities (including XR activity 2302). As depicted, start time 2314 is after buffer 2318.

Start time 2314 also may be scheduled to account for a S2 W duration at the render device to ensure reception and transmission with the display device (or the AP) is not affected by one or more WCD components coming out of a low power mode. Assuming a generic XR activity start time is x, the period duration is $P_R$, the XR activity duration (such as the length of the XR activity 2302) is AR, the buffer duration is z, a generic wireless activity start time is y, a TWT wake interval (such as the interval of the TWT windows during which time the WCD is to remain in an active mode) is $P_W$, and the duration of the wireless activity (the difference between end time 2316 and start time 2314) is $A_W$, the wireless activity is scheduled not to overlap with the XR activity for any cycle of the wireless activity ($n_W$, assuming the wireless activity is cyclic) and any cycle of the XR activity ($n_R$), which is mathematically depicted in equations (1)-(3) below:

$$P_W = \frac{(x + z - y) + n_R P_R + A_R}{n_W} \quad (1)$$

$$A_W \leq P_R - A_R \quad (2)$$

$$P_W \geq A_R + A_W \quad (3)$$

In this manner, start time 2304 may be $x + n_R P_R$ for any cycle of XR activity, start time 2308 may be $x + (n_R+1)P_R$, the end of XR activity 2302 may be $x + n_R P_R + A_R$, and the end of XR activity 2306 may be $x + (n_R+1)P_R + A_R$. Start time 2314 may be $y + n_W P_W$, and end time 2316 may be $y + n_W P_W + A_W$. $P_W$ may be configured to be one or more multiples of $P_R$. If TWT is used for communications between the render device and the display device, $P_R$ is a constant value across all cycles of XR activity (assuming no adjustments are made to the XR activity, such as based on feedback).

The render device may use TDM windows that are not defined in a TWT session. For example, as noted above, one or more MLO techniques may include the use of TDM windows. In some implementations, $P_R$ may vary between different cycles of XR activity (such as resulting from delays in transmission or reception resulting from concurrent communications). The render device may schedule wireless activity for such TDM windows similar to as above with reference to equations (1)-(3), but regarding a varying $P_R$. For example, the render device may attempt to determine a common multiple of possible $P_R$ that may occur based on possible delays or variations in the XR activity. In this manner, the wireless activity 2312 is ensured not to overlap with any of the XR activities (including XR activities 2302 and 2306).

Referring back to use of TWT for concurrent link support, the application layer clock and the WCD clock of a device may have different fidelities. For example, the application layer clock may be able to indicate a value with more fidelity (also referred to as granularity) than the WCD clock. The difference in fidelity also may be caused by $P_R$ being indicated in a different manner than $P_W$. For example, $P_R$ may be indicated as a time every number of cycles (such as 50 ms per 3 cycles) of XR activity). However, $P_W$ (which is to equal $P_R$) may be determined per cycle of wireless activity. For example, if $P_R$ is 50 ms per 3 cycles (which would be 50/3 ms per cycle) and $P_W$ is to equal $P_R$, the render device may approximate $P_W$ based on a fidelity of the WCD clock (such as 1 μs being the minimum unit of time). In this example, $P_W$ would be restricted to being indicated as 16.666 ms or 16.667 ms, which is an approximation of 50/3 ms. As a result of the WCD clock fidelity limiting the indication of $P_W$, the period duration of wireless activity 2312 differs from the period duration 2310 of XR activity (such as up to 1 μs per cycle in the example). In the example of $P_W$ being determined to be 16.666 ms and $P_R$ being 50/3 ms, the wireless activity shifts 3.88 ms every 194 seconds with reference to the XR activity. In some implementations, the buffer is configured to account for an amount of drift in the wireless activity over time resulting from the approximation error in measuring $P_W$. If the buffer 2318 is 3.88 ms, the wireless activity may begin to overlap the previous XR activity after 194 seconds.

In some implementations, drift between XR activity and wireless activity may occur based on a difference in resonance frequencies associated with an application layer clock and a WCD clock of a device. As noted above, different crystals may be used for the application layer clock and the WCD clock. The crystals may have different resonance frequencies upon which the clocks are based. In addition, the crystals may be affected differently by environmental conditions (such as temperature or moisture) that varies the resonance frequencies. The device may assume that the resonance frequencies are the same, but the wireless activity may drift over time with reference to the XR activity based on a difference in resonance frequencies. In an example of a difference in resonance frequency being 20 cycles per million cycles of the crystals between the application layer clock and the WCD clock (with the crystal associated with the WCD clock having a higher resonance frequency), the wireless activity may drift 3.88 ms every 194 seconds. If the buffer 2318 is 3.88 ms, the wireless activity may begin to overlap the previous XR activity after 194 seconds.

One or both of the TWT sessions may be adjusted based on the drift. For example, the second TWT session periodically may be adjusted to prevent TWT windows from the second TWT session overlapping with TWT windows from the first TWT session. In some implementations, the render device may measure a drift between the first plurality of TWT windows from the first TWT session and the second plurality of TWT windows from the second TWT session. As noted above, determining the first TWT session may be based on the application layer clock of the render device. The second TWT session may be based on a WCD clock of the render device. The render device may adjust a timing of one or more of the first plurality of TWT windows or the second plurality of TWT windows. For example, the render device may initiate adjusting the second TWT session to prevent overlap of the second plurality of TWT windows with the first plurality of TWT windows.

The adjustment of the second TWT session may be at a defined interval of time based on a measured drift. For example, if the drift is based on an approximation of $P_W$, the render device may determine a defined interval to adjust the second TWT session based on the approximation error and the size of the buffer. In the above example of $P_W$ being approximated to be 16.666 ms, $P_R$ being 50/3 ms, and the buffer being 3.88 ms, the render device may determine the defined interval to be less than 194 seconds. In the above example of a difference in resonance frequency being 20 cycles per million cycles and the buffer being 3.88 ms, the render device may determine the defined interval to be less than 194 ms. In some implementations, the defined interval may be based on both types of drift (such as being based on the feature causing the most drift between the two).

In addition or to the alternative of adjusting the second TWT session based on a determined time interval associated with a drift, the render device may attempt to determine if XR activity and wireless activity begin to overlap. For example, the render device may provide a schedule or the WCD otherwise may estimate when XR activity is to occur (such as the interval at when transmitting or receiving over the second wireless link), and the WCD periodically may determine if the wireless activity is to overlap with estimated XR activity. The TWT windows of the second TWT session with the AP may be moved forward or delayed based on the determination to prevent overlap with TWT windows of the first TWT session.

As noted above, aspects of the present disclosure include a wireless system for giving preference to communications between two devices over other devices while still sharing the wireless medium with the other devices. Preference may be given for communications between a render device and a display device of an XR experience to meet latency and packet loss requirements. In some implementations, preference may be given via asynchronous channel control operations. In some implementations, preference may be given via synchronous channel control operations. Sharing the wireless medium may be through the use of TWT sessions or MLO techniques (such as for concurrent link support). Aspects of the present disclosure also include generating and providing feedback associated with an XR experience between the render device and the display device. Communications between the devices (such as the render device and the display device or the render device and the AP) may be adjusted based on the feedback to ensure meeting latency and packet loss requirements for the XR experience. In this manner, an overall system (such as a BSS or mesh network) including one or more render devices and one or more display devices) may be configured to support an XR experience.

Implementation examples are described in the following numbered clauses:

1. A method performed by a wireless communication device for an extended reality (XR) experience, including:

obtaining control of a wireless medium, where:
control of the wireless medium is associated with a first priority of transmitting, over the wireless medium, a first physical layer protocol data unit (PPDU) of an application file from the wireless communication device to a second device; and
the first priority is different than a second priority of transmitting data from the second device to the wireless communication device over the wireless medium;
providing the first PPDU to the second device; and
providing one or more subsequent PPDUs of the application file to the second device, where providing the one or more subsequent PPDUs is associated with a third priority of transmitting the one or more subsequent PPDUs over the wireless medium.

2. The method of clause 1, where:
the first priority is associated with a first set of enhanced distributed channel access (EDCA) parameters;
the second priority is associated with a second set of EDCA parameters; and
the third priority is associated with a third set of EDCA parameters.

3. The method of one or more of clauses 1-2, where EDCA parameters include one or more of:
an arbitration interframe spacing number (AIFSN);
a minimum contention window (CWmin); or
a maximum contention window (CWmax).

4. The method of one or more of clauses 1-2, where:
the first priority is associated with a first backoff counter value, where the first backoff counter value is used by a backoff counter of the wireless communication device to contend for the wireless medium for the first PPDU;
the second priority is associated with a second backoff counter value greater than the first backoff counter value; and
the third priority is associated with a third backoff counter value greater than the second backoff counter value, where the third backoff counter value is used by the backoff counter of the wireless communication device to contend for the wireless medium for the one or more subsequent PPDUs.

5. The method of one or more of clauses 1-2 or 4, where the first backoff counter value is zero during a first transmit opportunity (TXOP).

6. The method of one or more of clauses 1-2, where:
the wireless communication device and the second device are included in a first basic service set (BSS);
the wireless communication device and the second device are within range of a device in an other BSS (OBSS);
the OBSS device contends for the wireless medium to transmit high importance classified data associated with a fourth priority; and
the wireless communication device or the second device obtains control of the wireless medium based on the first priority or the second priority.

7. The method of one or more of clauses 1-2 or 6, where:
the wireless communication device contends for the wireless medium to transmit one or more subsequent PPDUs associated with the third priority;
the second device prevents contending for the wireless medium; and
the OBSS device obtains control of the wireless medium based on the fourth priority.

8. The method of one or more of clauses 1-2, further including:
providing a first request to send (RTS) frame to obtain control of the wireless medium, where the first RTS frame includes an indication of a network allocation vector (NAV) to maintain control of the wireless medium for a first time period, where the first time period is greater than a first transmit opportunity (TXOP) during which the first PPDU is provided;
obtaining a first clear to send (CTS) frame from the second device after providing the first RTS frame; and
providing a second RTS frame after the first TXOP and before an end of the first time period, where:
the second RTS frame includes an indication of the NAV to extend the first time period to cover a plurality of TXOPs; and
providing the first PPDU is after obtaining the first CTS frame and during the first TXOP.

9. The method of one or more of clauses 1-2 or 8, where the first TXOP is shortened by the wireless communication device before providing PPDUs associated with the application file to the second device.

10. The method of one or more of clauses 1-2 or 8, further including obtaining the data from the second device after the first TXOP and before providing the second RTS frame.

11. The method of one or more of clauses 1-2 or 8, further including:
providing a last PPDU of the application file to the second device, where:
the last PPDU includes a last media access control layer (MAC) service data unit (MSDU) of the application file; and
the last MSDU includes metadata identifying the last MSDU of the application file;
preventing providing another RTS frame to extend the first time period after providing the last MSDU to the second device; and
releasing control of the wireless medium at the end of the first time period.

12. The method of one or more of clauses 1-2, 8, or 11, further including providing a contention free (CF) end beacon after providing the last MSDU to release control of the wireless medium.

13. The method of one or more of clauses 1-2, 8, or 11, further including obtaining control of the wireless medium to provide one or more PPDUs of a second application file to the second device, where:
a first MSDU of the second application file includes metadata identifying the first MSDU of the second application file;
the first MSDU is associated with the first set of EDCA parameters; and
obtaining control of the wireless medium is associated with the first set of EDCA parameters.

14. The method of one or more of clauses 1-2, 8, 11, or 13, where the wireless communication device enables RTS/CTS signaling for the first PPDU for each application file.

15. The method of one or more of clauses 1-14, where:
the wireless communication device is included in a software enabled access point (SAP);
the second device includes a head mounted display (HMD); and
the application file is associated with a video frame to be displayed by the HMD.

16. A wireless communication device configured for an extended reality (XR) experience, including:
a processing system; and
an interface configured to:
obtain control of a wireless medium, where:
control of the wireless medium is associated with a first priority of transmitting, over the wireless medium, a first physical layer protocol data unit (PPDU) of an application file from the wireless communication device to a second device; and
the first priority is different than a second priority of transmitting data from the second device to the wireless communication device over the wireless medium;
provide the first PPDU to the second device; and
provide one or more subsequent PPDUs of the application file to the second device, where providing the one or more subsequent PPDUs is associated with a third priority of transmitting the one or more subsequent PPDUs over the wireless medium.

17. The wireless communication device of clause 16, where:
the first priority is associated with a first set of enhanced distributed channel access (EDCA) parameters;
the second priority is associated with a second set of EDCA parameters; and
the third priority is associated with a third set of EDCA parameters.

18. The wireless communication device of one or more of clauses 16-17, where EDCA parameters include one or more of:
an arbitration interframe spacing number (AIFSN);
a minimum contention window (CWmin); or
a maximum contention window (CWmax).

19. The wireless communication device of one or more of clauses 16-17, where:
the first priority is associated with a first backoff counter value, where the first backoff counter value is used by a backoff counter of the wireless communication device to contend for the wireless medium for the first PPDU;
the second priority is associated with a second backoff counter value greater than the first backoff counter value; and
the third priority is associated with a third backoff counter value greater than the second backoff counter value, where the third backoff counter value is used by the backoff counter of the wireless communication device to contend for the wireless medium for the one or more subsequent PPDUs.

20. The wireless communication device of one or more of clauses 16-17 or 19, where the first backoff counter value is zero during a first transmit opportunity (TXOP).

21. The wireless communication device of one or more of clauses 16-17, where:
the wireless communication device and the second device are included in a first basic service set (BSS);
the wireless communication device and the second device are within range of a device in an other BSS (OBSS);
the OBSS device contends for the wireless medium to transmit high importance classified data associated with a fourth priority; and
the wireless communication device or the second device obtains control of the wireless medium based on the first priority or the second priority.

22. The wireless communication device of one or more of clauses 16-17 or 21, where:
the wireless communication device contends for the wireless medium to transmit one or more subsequent PPDUs associated with the third priority;
the second device prevents contending for the wireless medium; and
the OBSS device obtains control of the wireless medium based on the fourth priority.

23. The wireless communication device of one or more of clauses 16-17, where the interface is further configured to:
provide a first request to send (RTS) frame to obtain control of the wireless medium, where the first RTS frame includes an indication of a network allocation vector (NAV) to maintain control of the wireless medium for a first time period, where the first time period is greater than a first transmit opportunity (TXOP) during which the first PPDU is provided;
obtain a first clear to send (CTS) frame from the second device after providing the first RTS frame; and
provide a second RTS frame after the first TXOP and before an end of the first time period, where:
the second RTS frame includes an indication of the NAV to extend the first time period to cover a plurality of TXOPs; and
providing the first PPDU is after obtaining the first CTS frame and during the first TXOP.

24. The wireless communication device of one or more of clauses 16-17 or 23, where the first TXOP is shortened by the wireless communication device before providing PPDUs associated with the application file to the second device.

25. The wireless communication device of clause 23, where the interface is further configured to obtain the data from the second device after the first TXOP and before providing the second RTS frame.

26. The wireless communication device of one or more of clauses 16-17 or 23, where the interface is further configured to:
provide a last PPDU of the application file to the second device, where:
the last PPDU includes a last media access control layer (MAC) service data unit (MSDU) of the application file; and
the last MSDU includes metadata identifying the last MSDU of the application file;
prevent providing another RTS frame to extend the first time period after providing the last MSDU to the second device; and
release control of the wireless medium at the end of the first time period.

27. The wireless communication device of one or more of clauses 16-17, 23, or 26, where the interface is further configured to provide a contention free (CF) end beacon after providing the last MSDU to release control of the wireless medium.

28. The wireless communication device of one or more of clauses 16-17, 23, or 26, where the interface is further configured to obtain control of the wireless medium to provide one or more PPDUs of a second application file to the second device, where:

a first MSDU of the second application file includes metadata identifying the first MSDU of the second application file;
the first MSDU is associated with the first set of EDCA parameters; and
obtaining control of the wireless medium is associated with the first set of EDCA parameters.

29. The wireless communication device of one or more of clauses 16-17, 23, 26, or 28, where the wireless communication device enables RTS/CTS signaling for the first PPDU for each application file.

30. The wireless communication device of one or more of clauses 16-29, where:
the wireless communication device is included in a software enabled access point (SAP);
the second device includes a head mounted display (HMD); and
the application file is associated with a video frame to be displayed by the HMD.

31. A method performed by a wireless communication device, including:
obtaining a first physical layer protocol data unit (PPDU) of an application file from a second device over a wireless medium, where:
the second device obtains control of the wireless medium;
control of the wireless medium is associated with a first priority of transmitting the first PPDU over the wireless medium; and
the first priority is different than a second priority of transmitting data from the wireless communication device to the second device over the wireless medium; and
obtaining one or more subsequent PPDUs of the application file from the AP, where obtaining the one or more subsequent PPDUs is associated with a third priority of transmitting the one or more subsequent PPDUs over the wireless medium.

32. The method of clause 31, where:
the first priority is associated with a first set of enhanced distributed channel access (EDCA) parameters;
the second priority is associated with a second set of EDCA parameters; and
the third priority is associated with a third set of EDCA parameters.

33. The method of one or more of clauses 31-32, where EDCA parameters include one or more of:
an arbitration interframe spacing number (AIFSN);
a minimum contention window (CWmin); or
a maximum contention window (CWmax).

34. The method of one or more of clauses 31-32, where:
the first priority is associated with a first backoff counter value;
the second priority is associated with a second backoff counter value greater than the first backoff counter value, where the second backoff counter value is used by a backoff counter of the wireless communication device in determining when to provide the data to the AP; and
the third priority is associated with a third backoff counter value greater than the second backoff counter value.

35. The method of one or more of clauses 31-32 or 34, where the first backoff counter value is zero during a first transmit opportunity (TXOP).

36. The method of one or more of clauses 31-32, where:
the wireless communication device and the second device are included in a first basic service set (BSS);
the wireless communication device and the second device are within range of a device in an other BSS (OBSS);
the OBSS device contends for the wireless medium to transmit high importance classified data associated with a fourth priority; and
the wireless communication device or the second device obtains control of the wireless medium based on the first priority or the second priority.

37. The method of one or more of clauses 31-32 or 36, where:
the second device contends for the wireless medium to transmit one or more subsequent PPDUs associated with the third priority;
the wireless communication device prevents contending for the wireless medium; and
the OBSS device obtains control of the wireless medium based on the fourth priority.

38. The method of one or more of clauses 31-32, further including:
obtaining a first request to send (RTS) frame from the AP, where the first RTS frame includes an indication of a network allocation vector (NAV) to maintain control of the wireless medium for a first time period, where the first time period is greater than a first transmit opportunity (TXOP) during which the first PPDU is obtained from the AP;
providing a first clear to send (CTS) frame to the second device after obtaining the first RTS frame; and
obtaining, from the AP, a second RTS frame after the first TXOP and before an end of the first time period, where:
the second RTS frame includes an indication of the NAV to extend the first time period to cover a plurality of TXOPs; and
obtaining the first PPDU is after providing the first CTS frame and during the first TXOP.

39. The method of one or more of clauses 31-32 or 38, where the first TXOP is shortened by the second device before the second device provides PPDUs associated with the application file to the wireless communication device.

40. The method of one or more of clauses 31-32 or 38, further including providing the data to the second device after the first TXOP and before obtaining the second RTS frame.

41. The method of one or more of clauses 31-32 or 38, further including:
obtaining a last PPDU of the application file from the AP, where:
the last PPDU includes a last media access control layer (MAC) service data unit (MSDU) of the application file;
the last MSDU includes metadata identifying the last MSDU of the application file;
the second device prevents providing another RTS frame to extend the first time period after providing the last MSDU to the wireless communication device; and
the second device releases control of the wireless medium at the end of the first time period.

42. The method of one or more of clauses 31-32, 28, or 41, further including obtaining a contention free (CF) end beacon from the second device after obtaining the last MSDU, where the CF end beacon is used to release control of the wireless medium.

43. The method of one or more of clauses 31-32, 38, or 41, where:
the second device obtains control of the wireless medium to provide one or more PPDUs of a second application file to the wireless communication device;
a first MSDU of the second application file includes metadata identifying the first MSDU of the second application file;
the first MSDU is associated with the first set of EDCA parameters; and
obtaining control of the wireless medium by the second device is associated with the first set of EDCA parameters.

44. The method of one or more of clauses 31-43, where:
the second device includes a software enabled AP (SAP);
the wireless communication device is included in a head mounted display (HMD); and
the application file is associated with a video frame to be displayed by the HMD.

45. A wireless communication device configured for an extended reality (XR) experience, including:
a processing system; and
an interface configured to:
obtain a first physical layer protocol data unit (PPDU) of an application file from a second device over a wireless medium, where:
the second device obtains control of the wireless medium;
control of the wireless medium is associated with a first priority of transmitting the first PPDU over the wireless medium; and
the first priority is different than a second priority of transmitting data from the wireless communication device to the second device over the wireless medium; and
obtain one or more subsequent PPDUs of the application file from the AP, where obtaining the one or more subsequent PPDUs is associated with a third priority of transmitting the one or more subsequent PPDUs over the wireless medium.

46. The wireless communication device of clause 45, where:
the first priority is associated with a first set of enhanced distributed channel access (EDCA) parameters;
the second priority is associated with a second set of EDCA parameters; and
the third priority is associated with a third set of EDCA parameters.

47. The wireless communication device of one or more of clauses 45-46, where EDCA parameters include one or more of:
an arbitration interframe spacing number (AIFSN);
a minimum contention window (CWmin); or
a maximum contention window (CWmax).

48. The wireless communication device of one or more of clauses 45-46, where:
the first priority is associated with a first backoff counter value;
the second priority is associated with a second backoff counter value greater than the first backoff counter value, where the second backoff counter value is used by a backoff counter of the wireless communication device in determining when to provide the data to the AP; and
the third priority is associated with a third backoff counter value greater than the second backoff counter value.

49. The wireless communication device of one or more of clauses 45-46 or 48, where the first backoff counter value is zero during a first transmit opportunity (TXOP).

50. The wireless communication device of one or more of clauses 45-46, where:
the wireless communication device and the second device are included in a first basic service set (BSS);
the wireless communication device and the second device are within range of a device in an other BSS (OBSS);
the OBSS device contends for the wireless medium to transmit high importance classified data associated with a fourth priority; and
the wireless communication device or the second device obtains control of the wireless medium based on the first priority or the second priority.

51. The wireless communication device of one or more of clauses 45-46 or 50, where:
the second device contends for the wireless medium to transmit one or more subsequent PPDUs associated with the third priority;
the wireless communication device prevents contending for the wireless medium; and
the OBSS device obtains control of the wireless medium based on the fourth priority.

52. The wireless communication device of one or more of clauses 45-46, where the interface is further configured to:
obtain a first request to send (RTS) frame from the AP, where the first RTS frame includes an indication of a network allocation vector (NAV) to maintain control of the wireless medium for a first time period, where the first time period is greater than a first transmit opportunity (TXOP) during which the first PPDU is obtained from the AP;
provide a first clear to send (CTS) frame to the second device after obtaining the first RTS frame; and
obtain, from the AP, a second RTS frame after the first TXOP and before an end of the first time period, where:
the second RTS frame includes an indication of the NAV to extend the first time period to cover a plurality of TXOPs; and
obtaining the first PPDU is after providing the first CTS frame and during the first TXOP.

53. The wireless communication device of one or more of clauses 45-46 or 52, where the first TXOP is shortened by the second device before the second device provides PPDUs associated with the application file to the wireless communication device.

54. The wireless communication device of one or more of clauses 45-46 or 52, where the interface is further configured to provide the data to the second device after the first TXOP and before obtaining the second RTS frame.

55. The wireless communication device of one or more of clauses 45-46 or 52, where the interface is further configured to:
obtain a last PPDU of the application file from the AP, where:

the last PPDU includes a last media access control layer (MAC) service data unit (MSDU) of the application file;
the last MSDU includes metadata identifying the last MSDU of the application file;
the second device prevents providing another RTS frame to extend the first time period after providing the last MSDU to the wireless communication device; and
the second device releases control of the wireless medium at the end of the first time period.

56. The wireless communication device of one or more of clauses 45-46, 52, or 55, where the interface is further configured to obtain a contention free (CF) end beacon from the second device after obtaining the last MSDU, where the CF end beacon is used to release control of the wireless medium.

57. The wireless communication device of one or more of clauses 45-46, 52, or 55, where:
the second device obtains control of the wireless medium to provide one or more PPDUs of a second application file to the wireless communication device;
a first MSDU of the second application file includes metadata identifying the first MSDU of the second application file;
the first MSDU is associated with the first set of EDCA parameters; and
obtaining control of the wireless medium by the second device is associated with the first set of EDCA parameters.

58. The wireless communication device of one or more of clauses 45-57, where:
the second device includes a software enabled AP (SAP);
the wireless communication device is included in a head mounted display (HMD); and
the application file is associated with a video frame to be displayed by the HMD.

59. A method performed by a device for an extended reality (XR) experience, including:
obtaining, from a second device, uplink (UL) data over a wireless medium; and
providing, to the second device, downlink (DL) data including physical layer protocol data units (PPDUs) over the wireless medium, where:
one or more PPDUs are provided to the second device during a current target wake time (TWT) window; and
a beginning of the current TWT window is associated with one of:
when a first PPDU of the one or more PPDUs is provided to the second device; or
when the first PPDU is provided from an application layer to a media access control layer (MAC) of the device.

60. The method of clause 59, further including rendering video frames to be displayed by the second device, where:
the device includes a render device;
the second device includes a display device;
the UL data includes pose data frames; and
the rendering of the video frames is associated with the obtained pose data frames, where:
a first video frame of the video frames includes a plurality of slices;
rendering of the first video frame is associated with a first pose data frame most recently obtained from the second device; and
one or more PPDUs are associated with one or more of the plurality of slices.

61. The method of one or more of clauses 59-60, further including:
providing, to the second device, a packet including a MAC header including a power management (PM) field indicating that the second device is not to enter into a low power mode after the current TWT window; and
providing, to the second device, a PPDU associated with a video slice of the first video frame after the current TWT window and before a next TWT window.

62. The method of one or more of clauses 59-60, where the beginning of the current TWT window is further associated with a motion to render (M2R) latency for the first video frame.

63. The method of one or more of clauses 59-60 or 62, further including synchronizing an application layer clock and a wireless communication device (WCD) clock of the device, where:
the application layer clock is used by the device for timing of rendering the video frames; and
the WCD clock is used by the device for timing of wireless communications with the second device.

64. The method of one or more of clauses 59-60, 62, or 63, where:
the pose data frames are obtained at a first frequency; and
the video frames are rendered at the first frequency, where each obtained pose data frame is associated with a rendered video frame.

65. The method of one or more of clauses 59-60, 62, or 63, where synchronizing the application layer clock and the WCD clock of the device includes synchronizing the WCD clock to the application layer clock.

66. The method of one or more of clauses 59-60, 62, 63, or 65, where synchronizing the WCD clock to the application layer clock includes:
aligning the beginning of the current TWT window to a first time before a render time to begin rendering the first video frame, where the first time precedes the render time by a first offset and where the first offset is associated with the M2R latency.

67. The method of one or more of clauses 59-60, 62, 63, 65, or 66, further including obtaining the first pose data frame during the beginning of the current TWT window.

68. The method of one or more of clauses 59-60, 62, 63, or 65-67, further including:
obtaining an additional pose data frame during the current TWT window; and
rendering at least a portion of a second video frame during a next TWT window, where:
the second video frame is associated with the additional pose data frame; and
the additional pose data frame is the most recently obtained pose data frame before rendering the second video frame.

69. The method of one or more of clauses 59-60, 62, or 63, where synchronizing the application layer clock and the WCD clock of the device includes synchronizing the application layer clock to the WCD clock, where synchronizing the application layer clock to the WCD clock is associated with a timing synchronization function (TSF) at the MAC of the device.

70. The method of one or more of clauses 59-60, 62, 63, or 69, where synchronizing the application layer clock to the WCD clock includes:
    aligning a render time to begin rendering the first video frame to a first time after the beginning of the current TWT window, where the first time succeeds the beginning of the current TWT window by a first offset and where the first offset is associated with the M2R latency.

71. The method of one or more of clauses 59-60, 62, or 63, further including periodically synchronizing the application layer clock and the WCD clock of the device, where synchronizing the application layer clock and the WCD clock is associated with a drift between the application layer clock and the WCD clock being greater than a drift threshold since a last synchronization between the application layer clock and the WCD clock.

72. The method of one or more of clauses 59-71, where:
    the device includes a software enabled AP (SAP); and
    the second device includes a head mounted display (HMD) to display the video frames.

73. A device configured for an extended reality (XR) experience, including:
    a processing system; and
    an interface configured to:
        obtain, from a second device, uplink (UL) data over a wireless medium; and
        provide, to the second device, downlink (DL) data including physical layer protocol data units (PPDUs) over the wireless medium, where:
            one or more PPDUs are provided to the second device during a current target wake time (TWT) window; and
            a beginning of the current TWT window is associated with one of:
                when a first PPDU of the one or more PPDUs is provided to the second device; or
                when the first PPDU is provided from an application layer to a media access control layer (MAC) of the device.

74. The device of clause 73, where the processing system is configured to render video frames to be displayed by the second device, where:
    the device includes a render device;
    the second device includes a display device;
    the UL data includes pose data frames; and
    the rendering of the video frames is associated with the obtained pose data frames, where:
        a first video frame of the video frames includes a plurality of slices;
        rendering of the first video frame is associated with a first pose data frame most recently obtained from the second device; and
        one or more PPDUs are associated with one or more of the plurality of slices.

75. The device of one or more of clauses 73-74, where the interface is further configured to:
    provide, to the second device, a packet including a MAC header including a power management (PM) field indicating that the second device is not to enter into a low power mode after the current TWT window; and
    provide, to the second device, a PPDU associated with a video slice of the first video frame after the current TWT window and before a next TWT window.

76. The device of one or more of clauses 73-74, where the beginning of the current TWT window is further associated with a motion to render (M2R) latency for the first video frame.

77. The device of one or more of clauses 73-74 or 76, where the device is configured to synchronize an application layer clock and a wireless communication device (WCD) clock of the device, where:
    the application layer clock is used by the device for timing of rendering the video frames; and
    the WCD clock is used by the device for timing of wireless communications with the second device.

78. The device of one or more of clauses 73-74, 76, or 77, where:
    the pose data frames are obtained at a first frequency; and
    the video frames are rendered at the first frequency, where each obtained pose data frame is associated with a rendered video frame.

79. The device of one or more of clauses 73-74, 76, or 77, where synchronizing the application layer clock and the WCD clock of the device includes synchronizing the WCD clock to the application layer clock.

80. The device of one or more of clauses 73-74, 76, 77, or 79, where synchronizing the WCD clock to the application layer clock includes:
    aligning the beginning of the current TWT window to a first time before a render time to begin rendering the first video frame, where the first time precedes the render time by a first offset and where the first offset is associated with the M2R latency.

81. The device of one or more of clauses 73-74, 76, 77, 79, or 80, where the interface is further configured to obtain the first pose data frame during the beginning of the current TWT window.

82. The device of one or more of clauses 73-74, 76, 77, or 79-81, where:
    the interface is further configured to obtain an additional pose data frame during the current TWT window; and
    the processing system is further configured to render at least a portion of a second video frame during a next TWT window, where:
        the second video frame is associated with the additional pose data frame; and
        the additional pose data frame is the most recently obtained pose data frame before rendering the second video frame.

83. The device of one or more of clauses 73-74, 76, or 77, where synchronizing the application layer clock and the WCD clock of the device includes synchronizing the application layer clock to the WCD clock, where synchronizing the application layer clock to the WCD clock is associated with a timing synchronization function (TSF) at the MAC of the device.

84. The device of one or more of clauses 73-74, 76, 77, or 83, where synchronizing the application layer clock to the WCD clock includes:
    aligning a render time to begin rendering the first video frame to a first time after the beginning of the current TWT window, where the first time succeeds the beginning of the current TWT window by a first offset and where the first offset is associated with the M2R latency.

85. The device of one or more of clauses 73-74, 76, or 77, where the device is configured to periodically synchronize the application layer clock and the WCD clock of the device, where synchronizing the application layer clock and the WCD clock is associated with a drift between the application layer clock and the WCD clock being greater than a drift threshold since a last synchronization between the application layer clock and the WCD clock.

86. The device of one or more of clauses 73-85, where: the device includes a software enabled AP (SAP); and the second device includes a head mounted display (HMD) to display the video frames.

87. A method performed by a device for an extended reality (XR) experience, including:
providing uplink (UL) data to a second device over a wireless medium; and
obtaining, from the second device, downlink (DL) data including physical layer protocol data units (PPDUs) over the wireless medium, where:
one or more PPDUs are obtained from the second device during a current target wake time (TWT) window; and
a beginning of the current TWT window is associated with one of:
when a first PPDU of the one or more PPDUs is provided by the second device; or
when the first PPDU is provided from an application layer to a media access control layer (MAC) of the second device.

88. The method of clause 87, where the second device is to render video frames to be displayed by the device, where:
the second device includes a render device;
the device includes a display device;
the UL data includes pose data frames; and
the rendering of the video frames is associated with the provided pose data frames, where:
a first video frame of the video frames includes a plurality of slices;
rendering of the first video frame is associated with a first pose data frame most recently obtained by the second device; and
one or more PPDUs are associated with one or more of the plurality of slices.

89. The method of one or more of clauses 87-88, further including:
obtaining, from the second device, a packet including a MAC header including a power management (PM) field indicating that the second device is not to enter into a low power mode after the current TWT window; and
obtaining, from the second device, a PPDU associated with a video slice of the first video frame after the current TWT window and before a next TWT window.

90. The method of one or more of clauses 87-88, where the beginning of the current TWT window is further associated with a motion to render (M2R) latency for the first video frame.

91. The method of one or more of clauses 87-88 or 90, further including synchronizing an application layer clock and a WCD clock of the device, where:
the application layer clock is used by the device for timing of displaying the video frames; and
the WCD clock is used by the device for timing of wireless communications with the second device.

92. The method of one or more of clauses 87-88, 90, or 91, where:
the pose data frames are provided at a first frequency; and
the video frames are rendered by the second device at the first frequency, where each pose data frame obtained by the second device is associated with a rendered video frame.

93. The method of one or more of clauses 87-88, 90, or 91, where synchronizing the application layer clock and the WCD clock of the device includes synchronizing the WCD clock to the application layer clock.

94. The method of one or more of clauses 87-88, 90, 91, or 93, where synchronizing the WCD clock to the application layer clock includes:
aligning the beginning of the current TWT window to a first time the first pose data is provided to the second device, where:
the first time precedes a render time that the second device is to begin rendering the first video frame;
the first time precedes the render time by a first offset; and
the first offset is associated with the M2R latency.

95. The method of one or more of clauses 87-88, 90, 91, or 93, where the second device begins to render the first video frame upon one of:
obtaining the first pose data frame during the beginning of the current TWT window; or
a timeout from the beginning of the current TWT window occurring before obtaining a pose data frame.

96. The method of one or more of clauses 87-88, 90, 91, or 93, further including indicating, to the second device, a time of the beginning of the current TWT window, where:
the indication of the time is associated with a timing synchronization function (TSF) at the MAC of the device after the WCD clock is synchronized to the application layer clock;
a WCD clock of the second device is synchronized to the WCD clock of the device, where synchronization of the WCD clocks are associated with the TSF of the device and a TSF at a MAC of the second device; and
an application layer clock of the second device is synchronized to the WCD clock of the AP, where synchronization of the application layer clock of the second device to the WCD clock of the second device is associated with the TSF of the second device.

97. The method of one or more of clauses 87-88, 90, or 91, where synchronizing the application layer clock and the WCD clock of the device includes synchronizing the application layer clock to the WCD clock, where synchronizing the application layer clock to the WCD clock is associated with a timing synchronization function (TSF) at the MAC of the device.

98. The method of one or more of clauses 87-88, 90, 91, or 97, where synchronizing the application layer clock to the WCD clock includes:
aligning a display time to a time associated with the current TWT window.

99. The method of one or more of clauses 87-88, 90, or 91, further including periodically synchronizing the application layer clock and the WCD clock of the device, where synchronizing the application layer clock and the WCD clock is associated with a drift between the application layer clock and the WCD clock being greater than a drift threshold since a last synchronization between the application layer clock and the WCD clock.

100. The method of one or more of clauses 87-99, where:
the second device includes a software enabled AP (SAP); and
the device includes a head mounted display (HMD) to display the video frames.

101. A device configured for an extended reality (XR) experience, including:
a processing system; and
an interface configured to:
provide uplink (UL) data to a second device over a wireless medium; and
obtain, from the second device, downlink (DL) data including physical layer protocol data units (PPDUs) over the wireless medium, where:
one or more PPDUs are obtained from the second device during a current target wake time (TWT) window; and
a beginning of the current TWT window is associated with one of:
when a first PPDU of the one or more PPDUs is provided by the second device; or
when the first PPDU is provided from an application layer to a media access control layer (MAC) of the second device.

102. The device of clause 101, where the second device is to render video frames to be displayed by the device, where:
the second device includes a render device;
the device includes a display device;
the UL data includes pose data frames; and
the rendering of the video frames is associated with the provided pose data frames, where:
a first video frame of the video frames includes a plurality of slices;
rendering of the first video frame is associated with a first pose data frame most recently obtained by the second device; and
one or more PPDUs are associated with one or more of the plurality of slices.

103. The device of one or more of clauses 101-102, where the interface is further configured to:
obtain, from the second device, a packet including a MAC header including a power management (PM) field indicating that the second device is not to enter into a low power mode after the current TWT window; and
obtain, from the second device, a PPDU associated with a video slice of the first video frame after the current TWT window and before a next TWT window.

104. The device of one or more of clauses 101-102, where the beginning of the current TWT window is further associated with a motion to render (M2R) latency for the first video frame.

105. The device of one or more of clauses 101-102 or 104, where the device is configured to synchronize an application layer clock and a WCD clock of the device, where:
the application layer clock is used by the device for timing of displaying the video frames; and
the WCD clock is used by the device for timing of wireless communications with the second device.

106. The device of one or more of clauses 101-102, 104, or 105, where:
the pose data frames are provided at a first frequency; and
the video frames are rendered by the second device at the first frequency, where each pose data frame obtained by the second device is associated with a rendered video frame.

107. The device of one or more of clauses 101-102, 104, or 105, where synchronizing the application layer clock and the WCD clock of the device includes synchronizing the WCD clock to the application layer clock.

108. The device of one or more of clauses 101-102, 104, 105, or 107, where synchronizing the WCD clock to the application layer clock includes:
aligning the beginning of the current TWT window to a first time the first pose data is provided to the second device, where:
the first time precedes a render time that the second device is to begin rendering the first video frame;
the first time precedes the render time by a first offset; and
the first offset is associated with the M2R latency.

109. The device of one or more of clauses 101-102, 104, 105, or 107, where the second device begins to render the first video frame upon one of:
obtaining the first pose data frame during the beginning of the current TWT window; or
a timeout from the beginning of the current TWT window occurring before obtaining a pose data frame.

110. The device of one or more of clauses 101-102, 104, 105, or 107, where the interface is further configured to indicate, to the second device, a time of the beginning of the current TWT window, where:
the indication of the time is associated with a timing synchronization function (TSF) at the MAC of the device after the WCD clock is synchronized to the application layer clock;
a WCD clock of the second device is synchronized to the WCD clock of the device, where synchronization of the WCD clocks are associated with the TSF of the device and a TSF at a MAC of the second device; and
an application layer clock of the second device is synchronized to the WCD clock of the second device, where synchronization of the application layer clock of the second device to the WCD clock of the second device is associated with the TSF of the second device.

111. The device of one or more of clauses 101-102, 104, or 105, where synchronizing the application layer clock and the WCD clock of the device includes synchronizing the application layer clock to the WCD clock, where synchronizing the application layer clock to the WCD clock is associated with a timing synchronization function (TSF) at the MAC of the device.

112. The device of one or more of clauses 101-102, 104, 105, or 111, where synchronizing the application layer clock to the WCD clock includes:
aligning a display time to a time associated with the current TWT window.

113. The device of one or more of clauses 101-102, 104, or 105, where the device is configured to periodically synchronize the application layer clock and the WCD clock of the device, where synchronizing the application layer clock and the WCD clock is associated with a drift between the application layer clock and the WCD clock being greater than a drift threshold since a last synchronization between the application layer clock and the WCD clock.

114. The device of one or more of clauses 101-113, where:
the second device includes a software enabled AP (SAP); and
the device includes a head mounted display (HMD) to display the video frames.

115. A method performed by a device, including:
rendering a plurality of video frames to be provided to a second device;
splitting each video frame of the plurality of video frames into a plurality of video slices; and
for each video slice of the plurality of video slices:
generating a plurality of PPDUs to include the video slice, where:
each PPDU includes one or more media access control layer (MAC) service data units (MSDUs) associated with the video slice; and
the video slice is identified by a port number and a differentiated services field codepoint (DSCP) value included in each MSDU of the plurality of PPDU; and
queuing the MSDUs for transmission to the second device.

116. The method of clause 115, where queuing the MSDUs includes generating a MSDU queue in software for each video slice, where each MSDU queue is identified by an internet protocol (IP) address, port number, and DSCP value.

117. The method of one or more of clauses 115-116, where each video slice is associated with a traffic identifier (TID) that is associated with an access category (AC) of the video slice.

118. The method of one or more of clauses 115-117, where the AC of the video slice is associated with a priority of the video slice.

119. The method of one or more of clauses 115-118, where the priority of the video slice depends on whether the video slice is a i-slice or a p-slice.

120. The method of one or more of clauses 115-119, further including:
rendering a first p-slice;
generating a first MSDU queue associated with the first p-slice;
rendering a second p-slice after rendering the first p-slice; and
flushing the first MSDU queue after rendering the second p-slice and before providing, to the second device, a PPDU including one or more MSDUs associated with the first p-slice.

121. The method of one or more of clauses 115-119, further including:
rendering a first i-slice;
generating a first MSDU queue associated with the first i-slice;
rendering a second i-slice or p-slice after rendering the first i-slice;
generating a second MSDU queue associated with the second i-slice; and
providing, to the second device, a PPDU including one or more MSDUs associated with the first i-slice after generating the second MSDU queue.

122. The method of one or more of clauses 115-119, where for a PPDU associated with a video slice:
the PPDU is attempted to be transmitted to the second device up to a threshold number of times; and
the device flushes a MSDU queue associated with the video slice after unsuccessfully attempting to transmit the PPDU to the second device the threshold number of times.

123. The method of one or more of clauses 115-119 or 122, further including:
generating a replacement video slice after flushing the MSDU queue; and
generating a replacement MSDU queue associated with the replacement video slice.

124. The method of one or more of clauses 115-119 or 122, further including indicating, to the second device, that the MSDU queue is flushed.

125. The method of clause 115, further including using forward error correction (FEC) for transmitting one or more PPDUs to the second device.

126. The method of one or more of clauses 115 or 125, where use of FEC for transmitting one or more PPDUs to the second device is associated with one or more of:
a link quality between the device and the second device;
one or more parameters of the second device; or
one or more parameters of the plurality of video frames.

127. The method of one or more of clauses 115-126, where:
the device includes a software enabled access point (SAP); and
the second device includes a head mounted display (HMD).

128. A device configured for an extended reality (XR) experience, including:
an interface; and
a processing system configured to:
render a plurality of video frames to be provided to a second device;
split each video frame of the plurality of video frames into a plurality of video slices; and
for each video slice of the plurality of video slices:
generate a plurality of PPDUs to include the video slice, where:
each PPDU includes one or more media access control layer (MAC) service data units (MSDUs) associated with the video slice; and
the video slice is identified by a port number and a differentiated services field codepoint (DSCP) value included in each MSDU of the PPDU; and queue the MSDUs for transmission to the second device.

129. The device of clause 128, where queuing the MSDUs includes generating a MSDU queue in software for each video slice, where each MSDU queue is identified by an internet protocol (IP) address, port number, and DSCP value.

130. The device of one or more of clauses 128-129, where each video slice is associated with a traffic identifier (TID) that is associated with an access category (AC) of the video slice.

131. The device of one or more of clauses 128-130, where the AC of the video slice is associated with a priority of the video slice.

132. The device of one or more of clauses 128-131, where the priority of the video slice depends on whether the video slice is a i-slice or a p-slice.

133. The device of one or more of clauses 128-132, where the processing system is further configured to:
   render a first p-slice;
   generate a first MSDU queue associated with the first p-slice;
   render a second p-slice after rendering the first p-slice; and
   flush the first MSDU queue after rendering the second p-slice and before providing, to the second device, a PPDU including one or more MSDUs associated with the first p-slice.
134. The device of one or more of clauses 128-132, where:
   the processing system is further configured to:
      render a first i-slice;
      generate a first MSDU queue associated with the first i-slice;
      render a second i-slice or p-slice after rendering the first i-slice; and
      generate a second MSDU queue associated with the second i-slice; and
   the interface is configured to provide, to the second device, a PPDU including one or more MSDUs associated with the first i-slice after generating the second MSDU queue.
135. The device of one or more of clauses 128-132, where for a PPDU associated with a video slice:
   the interface is configured to attempt to transmit the PPDU to the second device up to a threshold number of times; and
   the processing system is further configured to flush a MSDU queue associated with the video slice after unsuccessfully attempting to transmit the PPDU to the second device the threshold number of times.
136. The device of one or more of clauses 128-132 or 135, where the processing system is further configured to:
   generate a replacement video slice after flushing the MSDU queue; and
   generate a replacement MSDU queue associated with the replacement video slice.
137. The device of one or more of clauses 128-132 or 135, where the interface is further configured to indicate, to the second device, that the MSDU queue is flushed.
138. The device of clause 128, where the device is configured to use forward error correction (FEC) for transmitting one or more PPDUs to the second device.
139. The device of one or more of clauses 128 or 138, where use of FEC for transmitting one or more PPDUs to the second device is associated with one or more of:
   a link quality between the device and the second device;
   one or more parameters of the second device; or
   one or more parameters of the plurality of video frames.
140. The device of one or more of clauses 128-139, where:
   the device includes a software enabled access point (SAP); and
   the second device includes a head mounted display (HMD).
141. A method performed by a device, including:
   obtaining, from a second device, one or more physical layer (PHY) protocol data units (PPDUs) associated with a video frame, where:
      the second device renders a plurality of video frames to be provided to the device;
      the second device splits each video frame of the plurality of video frames into a plurality of video slices; and
      for each video slice of the plurality of video slices:
         the second device generates a plurality of PPDUs to include the video slice, where:
            each PPDU includes one or more media access control layer (MAC) service data units (MSDUs) associated with the video slice; and
            the video slice is identified by a port number and a differentiated services field codepoint (DSCP) value included in each MSDU of the plurality of PPDUs; and
         the second device queues the MSDUs for transmission to the device.
142. The method of clause 141, where queuing the MSDUs includes generating a MSDU queue in software for each video slice, where each MSDU queue is identified by an internet protocol (IP) address, port number, and DSCP value.
143. The method of one or more of clauses 141-142, where each video slice is associated with a traffic identifier (TID) that is associated with an access category (AC) of the video slice.
144. The method of one or more of clauses 141-143, further including:
   obtaining, at a reorder (REO) queue of the device, a portion of MSDUs associated with a video slice; and
   flushing the REO queue after not obtaining a remainder of the MSDUs associated with the video slice before a REO timeout occurs.
145. The method of one or more of clauses 141-144, where the REO timeout is associated with the AC of the video slice.
146. The method of one or more of clauses 141-143, further including:
   obtaining, at a reorder (REO) queue of the device, one or more MSDUs from the second device;
   obtaining an indication that a transmit queue associated with the one or more MSDUs is flushed by the second device; and
   flushing the REO queue after obtaining the indication.
147. The method of clause 141, further including using forward error correction (FEC) for obtaining one or more PPDUs from the second device.
148. The method of one or more of clauses 141 or 147, where use of FEC for obtaining one or more PPDUs from the second device is associated with one or more of:
   a link quality between the device and the second device;
   one or more parameters of the second device; or
   one or more parameters of the plurality of video frames.
149. The method of one or more of clauses 141-148, where:
   the second device includes a software enabled access point (SAP); and
   the device includes a head mounted display (HMD).
150. A device configured for an extended reality (XR) experience, including:
   a processing system; and
   an interface configured to:
      obtain, from a second device, one or more physical layer (PHY) protocol data units (PPDUs) associated with a video frame, where:
         the second device renders a plurality of video frames to be provided to the device;

the second device splits each video frame of the plurality of video frames into a plurality of video slices; and for each video slice of the plurality of video slices:
the second device generates a plurality of PPDUs to include the video slice, where:
each PPDU includes one or more media access control layer (MAC) service data units (MSDUs) associated with the video slice; and
the video slice is identified by a port number and a differentiated services field codepoint (DSCP) value included in each MSDU of the plurality of PPDUs; and
the second device queues the MSDUs for transmission to the device.

151. The device of clause 150, where queuing the MSDUs includes generating a MSDU queue in software for each video slice, where each MSDU queue is identified by an internet protocol (IP) address, port number, and DSCP value.

152. The device of one or more of clauses 150-151, where each video slice is associated with a traffic identifier (TID) that is associated with an access category (AC) of the video slice.

153. The device of one or more of clauses 150-152, where:
the interface is further configured to obtain, at a reorder (REO) queue of the device, a portion of MSDUs associated with a video slice; and
the processing system is configured to flush the REO queue after not obtaining a remainder of the MSDUs associated with the video slice before a REO timeout occurs.

154. The device of one or more of clauses 150-153, where the REO timeout is associated with the AC of the video slice.

155. The device of one or more of clauses 150-152, where:
the interface is further configured to:
obtain, at a reorder (REO) queue of the device, one or more MSDUs from the second device; and
obtain an indication that a transmit queue associated with the one or more MSDUs is flushed by the second device; and
the processing system is configured to flush the REO queue after obtaining the indication.

156. The device of clause 150, where the device is configured to use forward error correction (FEC) for obtaining one or more PPDUs from the second device.

157. The device of one or more of clauses 150 or 156, where use of FEC for obtaining one or more PPDUs from the second device is associated with one or more of:
a link quality between the device and the second device;
one or more parameters of the second device; or
one or more parameters of the plurality of video frames.

158. The device of one or more of clauses 150-157, where:
the second device includes a software enabled access point (SAP); and
the device includes a head mounted display (HMD).

159. A method performed by a device, including:
attempting to provide a plurality of PPDUs associated with one or more video frames of an extended reality (XR) experience to a second device; and measuring one or more of:
a PPDU transmission latency associated with attempting to provide the plurality of PPDUs; or
a PPDU transmission drop associated with attempting to provide the plurality of PPDUs,
where one or more parameters of the XR experience are adjusted and associated with one or more of the measurements.

160. The method of clause 159, further including:
obtaining one or more pose data frames from the second device, where each of the one or more video frames is associated with a pose data frame of the one or more pose data frames; and
measuring a pose data frame delivery latency associated with obtaining the one or more pose data frames.

161. The method of one or more of clauses 159-160, further including measuring a frequency of missing or delayed pose data frames associated with obtaining the one or more pose data frames.

162. The method of one or more of clauses 159-161, further including providing an indication of the one or more measurements to the second device in an aggregated control (A-Control) field of a header of one or more packets provided to the second device.

163. The method of one or more of clauses 159-162, where the A-Control field includes a reserved control identifier (ID) for the indication of the one or more measurements.

164. The method of one or more of clauses 159-162, where:
the one or more measurements include a link quality measurement of a link quality between the device and the second device; and
the A-Control field includes an indication of the link quality.

165. The method of one or more of clauses 159-162 or 164, where the A-Control field includes a bit reserved to indicate the link quality.

166. The method of one or more of clauses 159-162, where the one or more packets are included in one or more of:
a request to send (RTS) or clear to send (CTS) frame;
a data frame; or
a block acknowledgement (BA) frame.

167. The method of one or more of clauses 159-162, where adjusting the one or more parameters of the XR experience includes adjusting one or more wireless communication parameters between the device and the second device, where adjusting the one or more wireless communication parameters includes one or more of:
adjusting a duty cycle of target wake time (TWT) windows of a TWT power save mode associated with the device and the second device;
enabling or disabling the TWT power save mode;
changing a wireless operating channel over which the device and the second device communicate;
adjusting the wireless operating channel size;
adjusting a modulation and coding scheme (MCS);
enabling or disabling forward error correction (FEC) for providing at least a portion of the one or more PPDUs to the second device; or
adjusting the FEC for providing at least the portion of the one or more PPDUs to the second device.

168. The method of one or more of clauses 159-161, where an indication of the adjusted one or more parameters is communicated between the device and the second device, where the indication is included in an aggregated control (A-Control) field of a header of one or more packets communicated between the device and the second device.

169. The method of one or more of clauses 159-161 or 168, where the A-Control field includes a reserved control identifier (ID) for the indication.

170. The method of one or more of clauses 159-161 or 168, where the one or more packets are included in one or more of:
a request to send (RTS) or clear to send (CTS) frame;
a data frame; or
a block acknowledgement (BA) frame.

171. The method of one or more of clauses 159-170, where adjusting the one or more parameters of the XR experience includes adjusting one or more video parameters, where the video parameters include one or more of:
a video frame rate;
a video resolution;
a target encode data rate; or
a video codec.

172. The method of one or more of clauses 159-171, where:
the device includes a software enabled access point (SAP); and
the second device includes a head mounted display (HMD).

173. A device configured for an extended reality (XR) experience, including:
an interface configured to attempt to provide a plurality of PPDUs associated with one or more video frames of the XR experience to a second device; and
a processing system configured to measure one or more of:
a PPDU transmission latency associated with attempting to provide the plurality of PPDUs; or
a PPDU transmission drop associated with attempting to provide the plurality of PPDUs,
where one or more parameters of the XR experience are adjusted and associated with one or more of the measurements.

174. The device of clause 173, where:
the interface is further configured to obtain one or more pose data frames from the second device, where each of the one or more video frames is associated with a pose data frame of the one or more pose data frames; and
the processing system is further configured to measure a pose data frame delivery latency associated with obtaining the one or more pose data frames.

175. The device of one or more of clauses 173-174, where the processing system is further configured to measure a frequency of missing or delayed pose data frames associated with obtaining the one or more pose data frames.

176. The device of one or more of clauses 173-175, where the interface is further configured to provide an indication of the one or more measurements to the second device in an aggregated control (A-Control) field of a header of one or more packets provided to the second device.

177. The device of one or more of clauses 173-176, where the A-Control field includes a reserved control identifier (ID) for the indication of the one or more measurements.

178. The device of one or more of clauses 173-176, where:
the one or more measurements include a link quality measurement of a link quality between the device and the second device; and
the A-Control field includes an indication of the link quality.

179. The device of one or more of clauses 173-176 or 178, where the A-Control field includes a bit reserved to indicate the link quality.

180. The device of one or more of clauses 173-176, where the one or more packets are included in one or more of:
a request to send (RTS) or clear to send (CTS) frame;
a data frame; or
a block acknowledgement (BA) frame.

181. The device of one or more of clauses 173-176, where adjusting the one or more parameters of the XR experience includes adjusting one or more wireless communication parameters between the device and the second device, where adjusting the one or more wireless communication parameters includes one or more of:
adjusting a duty cycle of target wake time (TWT) windows of a TWT power save mode associated with the device and the second device;
enabling or disabling the TWT power save mode;
changing a wireless operating channel over which the device and the second device communicate;
adjusting the wireless operating channel size;
adjusting a modulation and coding scheme (MCS);
enabling or disabling forward error correction (FEC) for providing at least a portion of the one or more PPDUs to the second device; or
adjusting the FEC for providing at least the portion of the one or more PPDUs to the second device.

182. The device of one or more of clauses 173-175, where an indication of the adjusted one or more parameters is communicated between the device and the second device, where the indication is included in an aggregated control (A-Control) field of a header of one or more packets communicated between the device and the second device.

183. The device of one or more of clauses 173-175 or 182, where the A-Control field includes a reserved control identifier (ID) for the indication.

184. The device of one or more of clauses 173-175 or 182, where the one or more packets are included in one or more of:
a request to send (RTS) or clear to send (CTS) frame;
a data frame; or
a block acknowledgement (BA) frame.

185. The device of one or more of clauses 173-184, where adjusting the one or more parameters of the XR experience includes adjusting one or more video parameters, where the video parameters include one or more of:
a video frame rate;
a video resolution;
a target encode data rate; or
a video codec.

186. The device of one or more of clauses 173-185, where:
the device includes a software enabled access point (SAP); and
the second device includes a head mounted display (HMD).

187. A method performed by a device, including:
attempting to provide a plurality of pose data frames associated with one or more video frames of an extended reality (XR) experience to a second device; and
measuring one or more of:
a pose data frame transmission latency associated with attempting to provide the plurality of pose data frames; or
a pose data frame transmission drop associated with attempting to provide the plurality of pose data frames,
where one or more parameters of the XR experience are adjusted and associated with one or more of the measurements.

188. The method of clause 187, further including:
obtaining, at a reorder (REO) queue of the device, one or more media access control layer (MAC) service data units (MSDUs) from the second device, where each MSDU is associated with a video slice of the one or more video frames;
flushing the REO queue one or more times to remove one or more MSDUs from the REO queue; and
measuring a REO flush time associated with flushing the REO queue.

189. The method of one or more of clauses 187-188, further including: for one or more video frames:
obtaining a first MSDU associated with a video frame; and
obtaining a last MSDU associated with the video frame; and
measuring a video frame delivery latency associated with obtaining the first MSDU and the last MSDU for one or more video frames.

190. The method of one or more of clauses 187-189, where the first MSDU and the last MSDU are identified by a differentiated services field codepoint (DSCP) value.

191. The method of one or more of clauses 187-190, further including providing an indication of the one or more measurements to the second device in an aggregated control (A-Control) field of a header of one or more packets provided to the second device.

192. The method of one or more of clauses 187-191, where the A-Control field includes a reserved control identifier (ID) for the indication of the one or more measurements.

193. The method of one or more of clauses 187-191, where:
the one or more measurements include a link quality measurement of a link quality between the device and the second device; and
the A-Control field includes an indication of the link quality.

194. The method of one or more of clauses 187-191 or 193, where the A-Control field includes a bit reserved to indicate the link quality.

195. The method of one or more of clauses 187-191, where the one or more packets are included in one or more of:
a request to send (RTS) or clear to send (CTS) frame;
a data frame; or
a block acknowledgement (BA) frame.

196. The method of one or more of clauses 187-191, where adjusting the one or more parameters of the XR experience includes adjusting one or more wireless communication parameters between the device and the second device, where adjusting the one or more wireless communication parameters includes one or more of:
adjusting a duty cycle of target wake time (TWT) windows of a TWT power save mode associated with the device and the second device;
enabling or disabling the TWT power save mode;
changing a wireless operating channel over which the device and the second device communicate;
adjusting the wireless operating channel size;
adjusting a modulation and coding scheme (MCS);
enabling or disabling forward error correction (FEC) for providing at least a portion of the one or more PPDUs to the second device; or
adjusting the FEC for providing at least the portion of the one or more PPDUs to the second device.

197. The method of one or more of clauses 187-190, where an indication of the adjusted one or more parameters is communicated between the device and the second device, where the indication is included in an aggregated control (A-Control) field of a header of one or more packets communicated between the device and the second device.

198. The method of one or more of clauses 187-190 or 197, where the A-Control field includes a reserved control identifier (ID) for the indication.

199. The method of one or more of clauses 187-190 or 197, where the one or more packets are included in one or more of:
a request to send (RTS) or clear to send (CTS) frame;
a data frame; or
a block acknowledgement (BA) frame.

200. The method of one or more of clauses 187-199, further including measuring one or more of:
a jitter buffer underflow or overflow; or
a missing packet associated with a video frame to be displayed.

201. The method of one or more of clauses 187-200, where:
the second device includes a software enabled access point (SAP); and
the device includes a head mounted display (HMD).

202. A device configured for an extended reality (XR) experience, including:
an interface configured to attempt to provide a plurality of pose data frames associated with one or more video frames of the XR experience to a second device; and
a processing system configured to measure one or more of:
a pose data frame transmission latency associated with attempting to provide the plurality of pose data frames; or
a pose data frame transmission drop associated with attempting to provide the plurality of pose data frames,
where one or more parameters of the XR experience are adjusted and associated with one or more of the measurements.

203. The device of clause 202, where:
the interface is further configured to obtain, at a reorder (REO) queue of the device, one or more media access control layer (MAC) service data units (MSDUs) from the second device, where each MSDU is associated with a video slice of the one or more video frames; and
the processing system is further configured to:
flush the REO queue one or more times to remove one or more MSDUs from the REO queue; and measure a REO flush time associated with flushing the REO queue.

204. The device of one or more of clauses 202-203, where:
the interface is further configured to, for one or more video frames:
obtain a first MSDU associated with a video frame; and
obtain a last MSDU associated with the video frame; and
the processing system is further configured to measure a video frame delivery latency associated with obtaining the first MSDU and the last MSDU for one or more video frames.

205. The device of one or more of clauses 202-204, where the first MSDU and the last MSDU are identified by a differentiated services field codepoint (DSCP) value.

206. The device of one or more of clauses 202-205, where the interface is further configured to provide an indication of the one or more measurements to the second device in an aggregated control (A-Control) field of a header of one or more packets provided to the second device.

207. The device of one or more of clauses 202-206, where the A-Control field includes a reserved control identifier (ID) for the indication of the one or more measurements.

208. The device of one or more of clauses 202-206, where:
the one or more measurements include a link quality measurement of a link quality between the device and the second device; and
the A-Control field includes an indication of the link quality.

209. The device of one or more of clauses 202-206 or 208, where the A-Control field includes a bit reserved to indicate the link quality.

210. The device of one or more of clauses 202-206, where the one or more packets are included in one or more of:
a request to send (RTS) or clear to send (CTS) frame;
a data frame; or
a block acknowledgement (BA) frame.

211. The device of one or more of clauses 202-206, where adjusting the one or more parameters of the XR experience includes adjusting one or more wireless communication parameters between the device and the second device, where adjusting the one or more wireless communication parameters includes one or more of:
adjusting a duty cycle of target wake time (TWT) windows of a TWT power save mode associated with the device and the second device;
enabling or disabling the TWT power save mode;
changing a wireless operating channel over which the device and the second device communicate;
adjusting the wireless operating channel size;
adjusting a modulation and coding scheme (MCS);
enabling or disabling forward error correction (FEC) for providing at least a portion of the one or more PPDUs to the second device; or
adjusting the FEC for providing at least the portion of the one or more PPDUs to the second device.

212. The device of one or more of clauses 202-205, where an indication of the adjusted one or more parameters is communicated between the device and the second device, where the indication is included in an aggregated control (A-Control) field of a header of one or more packets communicated between the device and the second device.

213. The device of one or more of clauses 202-205 or 212, where the A-Control field includes a reserved control identifier (ID) for the indication.

214. The device of one or more of clauses 202-205 or 212, where the one or more packets are included in one or more of:
a request to send (RTS) or clear to send (CTS) frame;
a data frame; or
a block acknowledgement (BA) frame.

215. The device of one or more of clauses 202-214, where the processing system is further configured to measure one or more of:
a jitter buffer underflow or overflow; or
a missing packet associated with a video frame to be displayed.

216. The device of one or more of clauses 202-215, where:
the second device includes a software enabled access point (SAP); and
the device includes a head mounted display (HMD).

217. A method performed by a wireless communication device, including:
communicating with a first device over a first wireless link; and
communicating with a second device over a second wireless link, where:
the wireless communication device communicates concurrently with the first device and the second device using one of multi-link operation (MLO) techniques or a target wake time (TWT) mode; and
the wireless communication device is configured to give preference to communications on the second wireless link versus communications on the first wireless link.

218. The method of clause 217, where concurrently communicating with the first device and the second device includes:
for when the wireless communication device is to transmit to the second device during reception of one or more packets from the first device:
transmitting to the second device before the completion of reception of the one or more packets from the first device;
obtaining a block acknowledgement (BA) from the second device after transmitting to the second device; and
preventing the wireless communication device from providing a BA to the first device to acknowledge the reception of the one or more packets.

219. The method of clause 217, where concurrently communicating with the first device and the second device includes:
for when the wireless communication device is to obtain one or more packets from the second device during reception of one or more packets from the first device:
obtaining the one or more packets from the second device during reception of the one or more packets from the first device;
providing a block acknowledgement (BA) to the second device after obtaining the one or more packets from the second device; and preventing the wireless communication device from providing a BA to the first device to acknowledge the reception of the one or more packets from the first device.

220. The method of clause 217, where concurrently communicating with the first device and the second device includes:
for when the wireless communication device is to transmit to the second device during transmission to the first device, performing one or more of:
synchronizing the transmission to the second device with the transmission to the first device;
preventing transmission to the first device outside of one or more time division multiplexing (TDM) windows, where:
transmission to the first device is during the one or more TDM windows; and
transmission to the second device is outside of the one or more TDM windows;
reducing one or more of a maximum physical layer (PHY) protocol data unit (PPDU) duration or a burst duration;
flushing packets from a transmit buffer associated with the transmission to the first device; or
broadcasting a clear to send (CTS) to self (CTS-to-Self) frame to pad a time period for reserving a wireless medium, where:
the wireless medium includes the first wireless link and the second wireless link; and
the time period is of sufficient length for the transmission to the first device and the transmission to the second device.

221. The method of one or more of clauses 217 or 220, where synchronizing the transmission to the second device with the transmission to the first device includes:
synchronizing a start of the transmission to the first device with a start of the transmission to the second device; and
padding the transmission to the second device to cause an end of the transmission to the first device to be synchronized with an end of the transmission to the second device, where a backoff associated with the second wireless link is reduced when the transmission to the first device and the transmission to the second device are synchronized.

222. The method of one or more of clauses 217 or 220, where for when preventing transmission to the first device during a time division multiplexing window associated with transmission to the second device, the first device is prevented from supporting a target wake time (TWT) mode.

223. The method of clause 217, where concurrently communicating with the first device and the second device includes:
for when the wireless communication device is to obtain one or more packets from the second device during transmission to the first device, performing one or more of:
preventing obtaining the one or more packets from the second device during one or more time division multiplexing (TDM) windows, where:
transmission to the first device is during the one or more TDM windows; and
reception from the second device is outside of the one or more TDM windows;
reducing one or more of a maximum physical layer (PHY) protocol data unit (PPDU) duration or a burst duration; or
before transmitting to the first device, providing a frame to the second device indicating a network allocation vector (NAV) value to reserve a wireless medium for the duration of transmitting to the first device, where the wireless medium includes the first wireless link and the second wireless link.

224. The method of clause 217, where the communications on the second wireless link are associated with an extended reality (XR) experience.

225. The method of one or more of clauses 217 or 224, where concurrently communicating with the first device and the second device includes:
configuring a first target wake time (TWT) session for communications on the second wireless link, where:
the first TWT session is associated with a first plurality of TWT windows on the second wireless link;
the first plurality of TWT windows is associated with XR activity at the wireless communication device; and
the XR activity includes obtaining one or more pose data frames from the second device, rendering one or more video frames, and providing the one or more video frames via one or more physical layer (PHY) protocol data units (PPDUs) to the second device;
configuring a second TWT session for communications on the first wireless link, where:
the second TWT session is associated with a second plurality of TWT windows interspersed between the first plurality of TWT windows;
the second plurality of TWT windows is associated with wireless activity between the first device and the wireless communication device; and
the first plurality of TWT windows does not overlap with the second plurality of TWT windows;
communicating with the second device during the first plurality of TWT windows; and
communicating with the first device during the second plurality of TWT windows.

226. The method of one or more of clauses 217, 224, or 225, further including:
measuring a drift between the first plurality of TWT windows and the second plurality of TWT windows, where:
the first TWT session is associated with an application layer clock associated with the wireless communication device; and
the second TWT session is associated with a wireless communication device (WCD) clock at a media access control layer (MAC); and
adjusting a timing of one or more of the first plurality of TWT windows or the second plurality of TWT windows to reduce the drift.

227. The method of one or more of clauses 217 or 224-226, where the drift is associated with a difference between a fidelity of the application layer clock and a fidelity of the WCD clock.

228. The method of one or more of clauses 217 or 224-226, where the drift is associated with a difference between a resonance frequency of the application layer clock and a resonance frequency of the WCD clock.

229. The method of one or more of clauses 217-228, where:

the first device is an access point (AP); and
the wireless communication device is included in a relay station (STA) between the AP and the second device.

230. The method of one or more of clauses 217-229, where:
one or more of the AP or the relay STA is a render device; and
the second device includes a head mounted display (HMD).

231. A wireless communication device, including:
a processing system; and
an interface configured to:
communicate with a first device over a first wireless link; and
communicate with a second device over a second wireless link, where:
the wireless communication device communicates concurrently with the first device and the second device using one of multi-link operation (MLO) techniques or a target wake time (TWT) mode; and
the wireless communication device is configured to give preference to communications on the second wireless link versus communications on the first wireless link.

232. The wireless communication device of clause 231, where concurrently communicating with the first device and the second device includes:
for when the wireless communication device is to transmit to the second device during reception of one or more packets from the first device:
transmitting to the second device before the completion of reception of the one or more packets from the first device;
obtaining a block acknowledgement (BA) from the second device after transmitting to the second device; and
preventing the wireless communication device from providing a BA to the first device to acknowledge the reception of the one or more packets.

233. The wireless communication device of clause 231, where concurrently communicating with the first device and the second device includes:
for when the wireless communication device is to obtain one or more packets from the second device during reception of one or more packets from the first device:
obtaining the one or more packets from the second device during reception of the one or more packets from the first device;
providing a block acknowledgement (BA) to the second device after obtaining the one or more packets from the second device; and
preventing the wireless communication device from providing a BA to the first device to acknowledge the reception of the one or more packets from the first device.

234. The wireless communication device of clause 231, where concurrently communicating with the first device and the second device includes:
for when the wireless communication device is to transmit to the second device during transmission to the first device, performing one or more of:
synchronizing the transmission to the second device with the transmission to the first device;
preventing transmission to the first device outside of one or more time division multiplexing (TDM) windows, where:
transmission to the first device is during the one or more TDM windows; and
transmission to the second device is outside of the one or more TDM windows;
reducing one or more of a maximum physical layer (PHY) protocol data unit (PPDU) duration or a burst duration;
flushing packets from a transmit buffer associated with the transmission to the first device; or
broadcasting a clear to send (CTS) to self (CTS-to-Self) frame to pad a time period for reserving a wireless medium, where:
the wireless medium includes the first wireless link and the second wireless link; and
the time period is of sufficient length for the transmission to the first device and the transmission to the second device.

235. The wireless communication device of one or more of clauses 231 or 234, where synchronizing the transmission to the second device with the transmission to the first device includes:
synchronizing a start of the transmission to the first device with a start of the transmission to the second device; and
padding the transmission to the second device to cause an end of the transmission to the first device to be synchronized with an end of the transmission to the second device, where a backoff associated with the second wireless link is reduced when the transmission to the first device and the transmission to the second device are synchronized.

236. The wireless communication device of one or more of clauses 231 or 234, where for when preventing transmission to the first device during a time division multiplexing window associated with transmission to the second device, the first device is prevented from supporting a target wake time (TWT) mode.

237. The wireless communication device of clause 231, where concurrently communicating with the first device and the second device includes:
for when the wireless communication device is to obtain one or more packets from the second device during transmission to the first device, performing one or more of:
preventing obtaining the one or more packets from the second device during one or more time division multiplexing (TDM) windows, where:
transmission to the first device is during the one or more TDM windows; and
reception from the second device is outside of the one or more TDM windows;
reducing one or more of a maximum physical layer (PHY) protocol data unit (PPDU) duration or a burst duration; or
before transmitting to the first device, providing a frame to the second device indicating a network allocation vector (NAV) value to reserve a wireless medium for the duration of transmitting to the first device, where the wireless medium includes the first wireless link and the second wireless link.

238. The wireless communication device of clause 231, where the communications on the second wireless link are associated with an extended reality (XR) experience.

239. The wireless communication device of one or more of clauses 231 or 238, where concurrently communicating with the first device and the second device includes:
configuring a first target wake time (TWT) session for communications on the second wireless link, where:
the first TWT session is associated with a first plurality of TWT windows on the second wireless link;
the first plurality of TWT windows is associated with XR activity at the wireless communication device; and
the XR activity includes obtaining one or more pose data frames from the second device, rendering one or more video frames, and providing the one or more video frames via one or more physical layer (PHY) protocol data units (PPDUs) to the second device;
configuring a second TWT session for communications on the first wireless link, where:
the second TWT session is associated with a second plurality of TWT windows interspersed between the first plurality of TWT windows;
the second plurality of TWT windows is associated with wireless activity between the first device and the wireless communication device; and
the first plurality of TWT windows does not overlap with the second plurality of TWT windows;
communicating with the second device during the first plurality of TWT windows; and
communicating with the first device during the second plurality of TWT windows.

240. The wireless communication device of one or more of clauses 231, 238, or 239, where the processing system is configured to:
measure a drift between the first plurality of TWT windows and the second plurality of TWT windows, where:
the first TWT session is associated with an application layer clock associated with the wireless communication device; and
the second TWT session is associated with a wireless communication device (WCD) clock at a media access control layer (MAC); and
adjust a timing of one or more of the first plurality of TWT windows or the second plurality of TWT windows to reduce the drift.

241. The wireless communication device of one or more of clauses 231 or 238-240, where the drift is associated with a difference between a fidelity of the application layer clock and a fidelity of the WCD clock.

242. The wireless communication device of one or more of clauses 231 or 238-240, where the drift is associated with a difference between a resonance frequency of the application layer clock and a resonance frequency of the WCD clock.

243. The wireless communication device of one or more of clauses 231-242, where:
the first device is an access point (AP); and
the wireless communication device is included in a relay station (STA) between the AP and the second device.

244. The wireless communication device of one or more of clauses 231-243, where:
one or more of the AP or the relay STA is a render device; and
the second device includes a head mounted display (HMD).

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A method performed by a wireless communication device for an extended reality (XR) experience, comprising:

obtaining control of a wireless medium, wherein:
the control of the wireless medium is associated with a first priority of transmitting, over the wireless medium, a first physical layer protocol data unit (PPDU) of an application file from the wireless communication device to a second device; and
the first priority is different than a second priority of transmitting data from the second device to the wireless communication device over the wireless medium;
providing the first PPDU to the second device;
providing one or more subsequent PPDUs of the application file to the second device, wherein providing the one or more subsequent PPDUs is associated with a third priority of transmitting the one or more subsequent PPDUs over the wireless medium, wherein the first priority is associated with a first set of enhanced distributed channel access (EDCA) parameters, the second priority is associated with a second set of EDCA parameters, and the third priority is associated with a third set of EDCA parameters;
providing a first request to send (RTS) frame to obtain the control of the wireless medium, wherein the first RTS frame includes an indication of a network allocation vector NAV) to maintain the control of the wireless medium for a first time period, wherein the first time period is greater than a first transmit opportunity (TXOP) during which the first PPDU is provided;
obtaining a first clear to send (CTS) frame from the second device after providing the first RTS frame; and
providing a second RTS frame after the first TXOP and before an end of the first time period, wherein:
the second RTS frame includes an indication of the NAV to extend the first time period to cover a plurality of TXOPs; and
providing the first PPDU is after obtaining the first CTS frame and during the first TXOP.

2. The method of claim 1, wherein:
the first priority is associated with a first backoff counter value, wherein the first backoff counter value is used by a backoff counter of the wireless communication device to contend for the wireless medium for the first PPDU;
the second priority is associated with a second backoff counter value greater than the first backoff counter value; and
the third priority is associated with a third backoff counter value greater than the second backoff counter value, wherein the third backoff counter value is used by the backoff counter of the wireless communication device to contend for the wireless medium for the one or more subsequent PPDUs.

3. The method of claim 1, further comprising:
providing a last PPDU of the application file to the second device, wherein:
the last PPDU includes a last media access control layer (MAC) service data unit (MSDU) of the application file; and
the last MSDU includes metadata identifying the last MSDU of the application file;
preventing providing another RTS frame to extend the first time period after providing the last MSDU to the second device; and
releasing control of the wireless medium at the end of the first time period.

4. The method of claim 3, further comprising providing a contention free (CF) end frame after providing the last MSDU to release control of the wireless medium.

5. The method of claim 3, further comprising obtaining control of the wireless medium to provide one or more PPDUs of a second application file to the second device, wherein:
a first MSDU of the second application file includes metadata identifying the first MSDU of the second application file;
the first MSDU is associated with the first set of EDCA parameters; and
obtaining control of the wireless medium is associated with the first set of EDCA parameters.

6. The method of claim 5, wherein the wireless communication device enables RTS/CTS signaling for the first PPDU for each application file.

7. The method of claim 1, wherein EDCA parameters include one or more of:
an arbitration interframe spacing number (AIFSN);
a minimum contention window (CWmin); or
a maximum contention window (CWmax).

8. The method of claim 1, wherein:
the wireless communication device is included in a software enabled access point (SAP);
the second device includes a head mounted display (HMD); and
the application file is associated with a video frame to be displayed by the HMD.

9. A wireless communication device configured for an extended reality (XR) experience, comprising:
a processing system; and
an interface configured to:
obtain control of a wireless medium, wherein:
the control of the wireless medium is associated with a first priority of transmitting, over the wireless medium, a first physical layer protocol data unit (PPDU) of an application file from the wireless communication device to a second device; and
the first priority is different than a second priority of transmitting data from the second device to the wireless communication device over the wireless medium;
provide the first PPDU to the second device;
provide one or more subsequent PPDUs of the application file to the second device, wherein providing the one or more subsequent PPDUs is associated with a third priority of transmitting the one or more subsequent PPDUs over the wireless medium, wherein the first priority is associated with a first set of enhanced distributed channel access (EDCA) parameters, the second priority is associated with a second set of EDCA parameters, and the third priority is associated with a third set of EDCA parameters;
provide a first request to send (RTS) frame to obtain the control of the wireless medium, wherein the first RTS frame includes an indication of a network allocation vector (NAV) to maintain the control of the wireless medium for a first time period, wherein the first time period is greater than a first transmit opportunity (TXOP) during which the first PPDU is provided;
obtain a first clear to send (CTS) frame from the second device after providing the first RTS frame; and
provide a second RTS frame after the first TXOP and before an end of the first time period, wherein:
the second RTS frame includes an indication of the NAV to extend the first time period to cover a plurality of TXOPs; and providing the first PPDU is after obtaining the first CTS frame and during the first TXOP.

10. The wireless communication device of claim 9, wherein:
the first priority is associated with a first backoff counter value, wherein the first backoff counter value is used by a backoff counter of the wireless communication device to contend for the wireless medium for the first PPDU;
the second priority is associated with a second backoff counter value greater than the first backoff counter value; and
the third priority is associated with a third backoff counter value greater than the second backoff counter value, wherein the third backoff counter value is used by the backoff counter of the wireless communication device to contend for the wireless medium for the one or more subsequent PPDUs.

11. The wireless communication device of claim 9, wherein the interface is further configured to:
provide a last PPDU of the application file to the second device, wherein:
the last PPDU includes a last media access control layer (MAC) service data unit (MSDU) of the application file; and
the last MSDU includes metadata identifying the last MSDU of the application file;
prevent providing another RTS frame to extend the first time period after providing the last MSDU to the second device; and
release control of the wireless medium at the end of the first time period.

12. The wireless communication device of claim 11, wherein the interface is further configured to provide a contention free (CF) end beacon after providing the last MSDU to release control of the wireless medium.

13. The wireless communication device of claim 11, wherein the interface is further configured to obtain control of the wireless medium to provide one or more PPDUs of a second application file to the second device, wherein:
a first MSDU of the second application file includes metadata identifying the first MSDU of the second application file;
the first MSDU is associated with the first set of EDCA parameters; and
obtaining control of the wireless medium is associated with the first set of EDCA parameters.

14. The wireless communication device of claim 13, wherein the wireless communication device enables RTS/CTS signaling for the first PPDU for each application file.

15. The wireless communication device of claim 9, wherein:
the wireless communication device is included in a software enabled access point (SAP);
the second device includes a head mounted display (HMD); and
the application file is associated with a video frame to be displayed by the HMD.

16. The wireless communication device of claim 9, wherein:
the wireless communication device and the second device are included in a first basic service set (BSS);
the wireless communication device and the second device are within range of a device in an other BSS (OBSS);
the OBSS device contends for the wireless medium to transmit high importance classified data associated with a fourth priority; and
the wireless communication device or the second device obtains control of the wireless medium based on the first priority or the second priority.

17. The wireless communication device of claim 16, wherein:
the wireless communication device contends for the wireless medium to transmit one or more subsequent PPDUs associated with the third priority;
the second device prevents contending for the wireless medium; and
the OBSS device obtains control of the wireless medium based on the fourth priority.

18. A method performed by a wireless communication device, comprising:
obtaining a first physical layer protocol data unit (PPDU) of an application file from a second device over a wireless medium, wherein:
the second device obtains control of the wireless medium;
the control of the wireless medium is associated with a first priority of transmitting the first PPDU over the wireless medium; and
the first priority is different than a second priority of transmitting data from the wireless communication device to the second device over the wireless medium; and
obtaining one or more subsequent PPDUs of the application file from the second device, wherein obtaining the one or more subsequent PPDUs is associated with a third priority of transmitting the one or more subsequent PPDUs over the wireless medium, wherein the first priority is associated with a first set of enhanced distributed channel access (EDCA) parameters, the second priority is associated with a second set of EDCA parameters, and the third priority is associated with a third set of EDCA parameters;
obtaining a first request to send (RTS) frame from the second device, wherein the first RTS frame includes an indication of a network allocation vector (NAV) to maintain the control of the wireless medium for a first time period, wherein the first time period is greater than a first transmit opportunity (TXOP) during which the first PPDU is obtained from the second device;
providing a first clear to send (CTS) frame to the second device after obtaining the first RTS frame; and
obtaining, from the second device, a second RTS frame after the first TXOP and before an end of the first time period, wherein:
the second RTS frame includes an indication of the NAV to extend the first time period to cover a plurality of TXOPs; and
obtaining the first PPDU is after providing the first CTS frame and during the first TXOP.

19. The method of claim 18, wherein:
the first priority is associated with a first backoff counter value;
the second priority is associated with a second backoff counter value greater than the first backoff counter value, wherein the second backoff counter value is used by a backoff counter of the wireless communication device in determining when to provide the data to the second device; and
the third priority is associated with a third backoff counter value greater than the second backoff counter value.

20. The method of claim 18, further comprising:
obtaining a last PPDU of the application file from the second device, wherein:

the last PPDU includes a last media access control layer (MAC) service data unit (MSDU) of the application file;

the last MSDU includes metadata identifying the last MSDU of the application file;

the second device prevents providing another RTS frame to extend the first time period after providing the last MSDU to the wireless communication device; and the second device releases control of the wireless medium at the end of the first time period.

21. The method of claim 20, wherein:

the second device obtains control of the wireless medium to provide one or more PPDUs of a second application file to the wireless communication device;

a first MSDU of the second application file includes metadata identifying the first MSDU of the second application file;

the first MSDU is associated with the first set of EDCA parameters; and obtaining control of the wireless medium by the second device is associated with the first set of EDCA parameters.

22. The method of claim 18, wherein:

the wireless communication device and the second device are included in a first basic service set (BSS);

the wireless communication device and the second device are within range of a device in an other BSS (OBSS);

the OBSS device contends for the wireless medium to transmit high importance classified data associated with a fourth priority; and the wireless communication device or the second device obtains control of the wireless medium based on the first priority or the second priority.

23. The method of claim 18, further comprising providing the data to the second device after the first TXOP and before obtaining the second RTS frame.

24. A wireless communication device configured for an extended reality (XR) experience, comprising:

a processing system; and an interface configured to:

obtain a first physical layer protocol data unit (PPDU) of an application file from a second device over a wireless medium, wherein:

the second device obtains control of the wireless medium;

the control of the wireless medium is associated with a first priority of transmitting the first PPDU over the wireless medium; and the first priority is different than a second priority of transmitting data from the wireless communication device to the second device over the wireless medium;

obtain one or more subsequent PPDUs of the application file from the second device, wherein obtaining the one or more subsequent PPDUs is associated with a third priority of transmitting the one or more subsequent PPDUs over the wireless medium, wherein the first priority is associated with a first set of enhanced distributed channel access (EDCA) parameters, the second priority is associated with a second set of EDCA parameters, and the third priority is associated with a third set of EDCA parameters;

obtain a first request to send (RTS) frame from the second device, wherein the first RTS frame includes an indication of a network allocation vector (NAV) to maintain the control of the wireless medium for a first time period, wherein the first time period is greater than a first transmit opportunity (TXOP) during which the first PPDU is obtained from the second device;

provide a first clear to send (CTS) frame to the second device after obtaining the first RTS frame; and obtain, from the second device, a second RTS frame after the first TXOP and before an end of the first time period, wherein:

the second RTS frame includes an indication of the NAV to extend the first time period to cover a plurality of TXOPs; and obtaining the first PPDU is after providing the first CTS frame and during the first TXOP.

25. The wireless communication device of claim 24, wherein:

the first priority is associated with a first backoff counter value;

the second priority is associated with a second backoff counter value greater than the first backoff counter value, wherein the second backoff counter value is used by a backoff counter of the wireless communication device in determining when to provide the data to the second device; and the third priority is associated with a third backoff counter value greater than the second backoff counter value.

26. The wireless communication device of claim 24, wherein the interface is further configured to:

obtain a last PPDU of the application file from the second device, wherein:

the last PPDU includes a last media access control layer (MAC) service data unit (MSDU) of the application file;

the last MSDU includes metadata identifying the last MSDU of the application file;

the second device prevents providing another RTS frame to extend the first time period after providing the last MSDU to the wireless communication device; and the second device releases control of the wireless medium at the end of the first time period.

27. The wireless communication device of claim 26, wherein:

the second device obtains control of the wireless medium to provide one or more PPDUs of a second application file to the wireless communication device;

a first MSDU of the second application file includes metadata identifying the first MSDU of the second application file;

the first MSDU is associated with the first set of EDCA parameters; and obtaining control of the wireless medium by the second device is associated with the first set of EDCA parameters.

28. The wireless communication device of claim 24, wherein:

the second device includes a software enabled AP (SAP);

the wireless communication device is included in a head mounted display (HMD); and the application file is associated with a video frame to be displayed by the HMD.

29. The wireless communication device of claim 24, wherein the first TXOP is shortened by the second device before the second device provides PPDUs associated with the application file to the wireless communication device.

30. The wireless communication device of claim 24, wherein the interface is further configured to provide the data to the second device after the first TXOP and before obtaining the second RTS frame.

* * * * *